(12) United States Patent
Uda et al.

(10) Patent No.: US 8,903,032 B2
(45) Date of Patent: Dec. 2, 2014

(54) STRUCTURE FOR SUPPRESSING FLOW VIBRATION OF INSTRUMENTATION GUIDE TUBE

(75) Inventors: Nobuki Uda, Hyogo (JP); Shigeyuki Watanabe, Tokyo (JP); Kazuo Hirota, Hyogo (JP); Hideyuki Sakata, Hyogo (JP); Hideyuki Morita, Hyogo (JP); Makoto Nakajima, Hyogo (JP); Chikara Kurimura, Tokyo (JP); Toshio Ichikawa, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 826 days.

(21) Appl. No.: 12/527,484

(22) PCT Filed: Feb. 22, 2008

(86) PCT No.: PCT/JP2008/053089
§ 371 (c)(1),
(2), (4) Date: Aug. 17, 2009

(87) PCT Pub. No.: WO2008/108187
PCT Pub. Date: Sep. 12, 2008

(65) Prior Publication Data
US 2010/0091929 A1   Apr. 15, 2010

(30) Foreign Application Priority Data

Feb. 28, 2007 (JP) ................................ 2007-048298
Jan. 11, 2008 (JP) ................................ 2008-004937

(51) Int. Cl.
*G21C 7/06* (2006.01)
*G21C 17/10* (2006.01)
(Continued)

(52) U.S. Cl.
CPC ............. *G21C 17/10* (2013.01); *G21C 17/08* (2013.01);
(Continued)

(58) Field of Classification Search
CPC ........ G21C 15/00; G21C 15/02; G21C 15/24; G21C 15/243; G21C 15/257; G21C 15/26; G21C 19/16; G21C 17/08; G21C 17/10

USPC .......... 376/207, 210, 234, 242, 277, 292, 352
See application file for complete search history.

(56) References Cited

U.S. PATENT DOCUMENTS 5,120,491 A   6/1992 Brown et al.
5,282,232 A * 1/1994 Chevereau et al. ........... 376/353
(Continued)

FOREIGN PATENT DOCUMENTS

CN    1040699 A    3/1990
EP    0 352 476 A2   1/1990
(Continued)

OTHER PUBLICATIONS

Korean Notice of Allowance dated Apr. 19, 2011, issued in corresponding Korean Patent Application No. 10-2009-7017352.
(Continued)

*Primary Examiner* — Jack W Keith
*Assistant Examiner* — Marshall O'Connor
(74) *Attorney, Agent, or Firm* — Westerman, Hattori, Daniels & Adrian, LLP

(57) ABSTRACT

An upper hole 37A and a lower hole 37B are provided at two positions, namely, upper and lower portions, of a side surface of a guide tube 27, and a thimble tube 22 is pressed against an inner circumferential surface of the guide tube 27, by a differential pressure between coolant inside and outside the upper hole 37A and the lower hole 37B. It is preferable that an upper pressure adjustment hole and a lower pressure adjustment hole are provided at two positions, namely, upper and lower portions, of a side surface of an upper core support column 21, and a coolant flowing into the guide tube from an upper end of the guide tube flows out to the outside from inside the guide tube through a gap between the thimble tube and the upper hole, and also flows out to the outside from inside the upper core support column through the upper pressure adjustment hole, and a coolant flowing into the guide tube from a lower end of the guide tube flows out to the outside from inside the guide tube through a gap between the thimble tube and the lower hole, and also flows out to the outside from inside the upper core support column through the lower pressure adjustment hole.

5 Claims, 46 Drawing Sheets

(51) Int. Cl.
*G21C 17/08* (2006.01)
*G21C 3/322* (2006.01)

(52) U.S. Cl.
CPC .... *G21Y 2002/207* (2013.01); *G21Y 2002/303* (2013.01); *G21Y 2004/30* (2013.01); *G21C 3/322* (2013.01)
USPC ............ 376/234; 376/207; 376/210; 376/219

(56) References Cited

U.S. PATENT DOCUMENTS

| | | | |
|---|---|---|---|
| 5,303,276 A | | 4/1994 | DeMario et al. |
| 2007/0019774 A1 | * | 1/2007 | Yonemoto et al. ............ 376/254 |

FOREIGN PATENT DOCUMENTS

| | | |
|---|---|---|
| GB | 2 265 686 A | 10/1993 |
| JP | 02201193 A | 8/1990 |
| JP | 06-000798 U2 | 1/1994 |
| JP | 07-041493 U | 7/1995 |
| JP | 8-62378 A | 3/1996 |
| JP | 2521331 B2 | 8/1996 |
| JP | 09080188 A | 3/1997 |
| JP | 2000-187093 A | 7/2000 |
| KR | 10-0812871 B1 | 3/2008 |
| TW | 260792 | 10/1995 |
| TW | 454206 | 9/2001 |

OTHER PUBLICATIONS

Chinese Office Action dated Sep. 15, 2011, issued in corresponding Chinese Patent Application No. 200880005834.4.
Taiwanese Office Action dated Sep. 16, 2011, issued in corresponding Taiwanese Patent Application No. 097106881.
International Search Report of PCT/JP2008/053089, Mailing Date of Mar. 25, 2008.
Decision of a Patent Grant dated Sep. 7, 2010, issued in corresponding Japanese Patent Application No. 2008-004937.
Extended European Search Report dated Sep. 20, 2012, issued in corresponding application No. 08711857.6.
Official Communication under Rule 71(3) EPC (Advanced Notice of Allowance) of Application No. 08 711 857.6 dated Jul. 16, 2013. (162 pages).

* cited by examiner (a)

(b)

(a)

(b)

(c)

(a)

(b)

(c)

Q1-Q1

Q2-Q2

Q3-Q3

Q1-Q1

Q2-Q2

Q3-Q3

R1-R1

R2-R2

R3-R3

S1-S1

S2-S2

S3-S3

T1-T1

301A(301B)

301Atr(301Btr)

300A(300B)

300Atr(300Btr)

U1-U1

US 8,903,032 B2

STRUCTURE FOR SUPPRESSING FLOW VIBRATION OF INSTRUMENTATION GUIDE TUBE

TECHNICAL FIELD

The present invention relates to a structure for suppressing flow vibration of an instrumentation guide tube inserted into a core.

BACKGROUND ART

To provide a detector such as a neutron detector in a core of a pressurized water reactor (PWR), the detector is guided into the core by an instrumentation guide tube inserted into the core. As a method for inserting the instrumentation guide tube into the core, a bottom insertion method in which an instrumentation guide tube is inserted from bottom to top of a reactor vessel has been employed. At present, a top insertion method in which an instrumentation guide tube is inserted from top to bottom of a reactor vessel has been studied.

FIG. 51 is a schematic of an inserted state of an instrumentation guide tube, when the top insertion method is employed. As shown in FIG. 51, after inserted into a reactor vessel (not shown) from the top of the reactor vessel, an instrumentation guide tube 1 is sequentially inserted through a hollow upper core support column 4 interposed between an upper core support plate 2 and an upper core plate 3 in the reactor vessel, and an opening portion 3a of the upper core plate 3 from top to bottom, and a lower end 1a is inserted into a core 5. A neutron detector 8 is guided from top to bottom by the instrumentation guide tube 1, with a cable 9 connected to the neutron detector 8, and inserted into the core 5.

Patent Document 1: Japanese Examined Utility Model Application Publication No. H06-00798
Patent Document 2: Japanese Patent No. 2521331
Patent Document 3: Japanese Patent Application Laid-open No. H2-201193
Patent Document 4: Japanese Patent Application Laid-open No. H9-80188

DISCLOSURE OF INVENTION

Problem to be Solved by the Invention

However, in the top insertion method as shown in FIG. 51, when coolant water (light water) flowing out from the core 5 flows into an upper plenum 7 through the opening portion 3a of the upper core plate 3 and a leg unit 6 of the upper core support column 4, as shown by the arrows Y1, flow vibration is excited on the instrumentation guide tube 1, as shown by the arrow Y2, by the flow of the coolant. Accordingly, it is feared that the instrumentation guide tube 1 repeatedly hits structures such as the upper core support column 4 and the core 5, and is worn out.

The present invention has been made in view of the above circumstances and intended to provide a structure for suppressing flow vibration of an instrumentation guide tube that can suppress flow vibration of the instrumentation guide tube and prevent the instrumentation guide tube from being worn out.

Means for Solving Problem

To solve above objects, According to a first invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, a lower hole is provided at least at a lower portion of a side surface of the guide tube, and the instrumentation guide tube is pressed against an inner circumferential surface of the guide tube, by a differential pressure between coolant inside and outside the lower hole.

According to a second invention, in the structure for suppressing flow vibration of an instrumentation guide tube of the first invention, a pressure adjustment hole is provided at a side surface of the upper core support column, and the coolant flowing into the guide tube from a lower end of the guide tube flows out to outside from inside the guide tube through a gap between the instrumentation guide tube and the lower hole, and then flows out to outside from inside the upper core support column through the pressure adjustment hole.

According to a third invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, an upper hole and a lower hole are provided at two portion of an upper portion and a lower portion of a side surface of the guide tube, and the instrumentation guide tube is pressed against an inner circumferential surface of the guide tube, by a differential pressure between coolant inside and outside the upper hole and the lower hole.

According to a fourth invention, in the structure for suppressing flow vibration of an instrumentation guide tube of the third invention, an upper pressure adjustment hole and a lower pressure adjustment hole are provided at two positions, namely, an upper portion and a lower portion, of a side surface of the upper core support column, and the coolant flowing into the guide tube from an upper end of the guide tube flows out to outside from inside the guide tube through a gap between the instrumentation guide tube and the upper hole, and also flows out to outside from inside the upper core support column through the upper pressure adjustment hole, and the coolant flowing into the guide tube from a lower end of the guide tube flows out to outside from the inside of the guide tube through a gap between the instrumentation guide tube and the lower hole, and also flows out to outside from inside the upper core support column through the lower pressure adjustment hole.

According to a fifth invention, in the structure for suppressing flow vibration of an instrumentation guide tube of the second invention, the pressure adjustment hole is a hole for a plug detachably provided at the side surface of the upper core support column.

According to a sixth invention, in the structure for suppressing flow vibration of an instrumentation guide tube of the fourth invention, the upper pressure adjustment hole and the lower pressure adjustment hole are holes for a plug detachably provided at the side surface of the upper core support column.

According to a seventh invention, in the structure for suppressing flow vibration of an instrumentation guide tube of the second invention, a pressure introduction hole is provided at the side surface of the guide tube at a position above the lower hole, and a part of the coolant flowing into the guide tube from the lower end of the guide tube flows out to outside from inside the guide tube through the pressure introduction hole, and also flows out to outside from inside the upper core support column through the pressure adjustment hole.

According to a eighth invention, in the structure for suppressing flow vibration of an instrumentation guide tube of the fourth invention, a first pressure introduction hole of an upper side and a second pressure introduction hole of a lower side are provided at the side surface of the guide tube, at a position between the upper hole and the lower hole, a part of the coolant flowing into the guide tube from the upper end of the guide tube flows out to outside from inside the guide tube through the first pressure introduction hole, and also flows out to outside from inside the upper core support column through the upper pressure adjustment hole, and a part of the coolant flowing into the guide tube from the lower end of the guide tube flows out to outside from inside the guide tube through the second pressure introduction hole, and also flows out to outside from inside the upper core support column through the lower pressure adjustment hole.

According to a ninth invention, in the structure for suppressing flow vibration of an instrumentation guide tube of the eighth invention, a restricting unit is provided at an inner circumferential surface of the guide tube, at a position between the first pressure introduction hole and the second pressure introduction hole.

According to a tenth invention, in the structure for suppressing flow vibration of an instrumentation guide tube of the second invention, a cover that guides the coolant flowing out from the pressure adjustment hole downwards is provided at the side surface of the upper core support column.

According to a eleventh invention, in the structure for suppressing flow vibration of an instrumentation guide tube of the fourth invention, a cover that guides the coolant flowing out from the lower pressure adjustment hole downwards is provided at the side surface of the upper core support column.

According to a twelfth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, and an inner circumferential surface of the head nozzle through which the instrumentation guide tube is inserted has a shape of an inverted truncated cone.

According to a thirteenth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, and an outer circumferential surface of the head nozzle through which the instrumentation guide tube is inserted has a shape of an inverted truncated cone, and a lower end of the outer circumferential surface and a lower end of an inner circumferential surface communicate with each other.

According to a fourteenth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, a hole is provided at a side surface of the head nozzle, and the instrumentation guide tube is pressed against an inner circumferential surface of the head nozzle, by a differential pressure between coolant inside and outside the hole.

According to a fifteenth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, a rectifying plate is provided at the opening portion of the upper core plate, and a part of coolant water flows upward towards the head nozzle, by rectifying the part of the coolant that passes through the opening portion of the upper core plate, using the rectifying plate.

According to a sixteenth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, an extension tube is provided at a lower end of the head nozzle, a hole is provided at a side surface of the extension tube, and the instrumentation guide tube is pressed against an inner circumferential surface of the extension tube, by a differential pressure between coolant inside and outside the hole.

According to a seventeenth invention, in the structure for suppressing flow vibration of an instrumentation guide tube of the eighth invention, the guide tube is divided into two, namely, a first guide tube unit of an upper side and a second guide tube unit of a lower side, at a position between the first pressure introduction hole and the second pressure introduction hole, and a lower end of the first guide tube unit and an upper end of the second guide tube unit are separated from each other.

According to a eighteenth invention, a structure for suppressing flow vibration of an instrumentation guide tube includes: a guide tube provided inside a hollow upper core support column interposed between an upper core support plate and an upper core plate in a reactor vessel; and a head nozzle provided at a lower end of the upper core support column. The instrumentation guide tube has a lower end sequentially inserted through the guide tube, the head nozzle, and an opening portion of the upper core plate from top to bottom is inserted into a core, the instrumentation guide tube has a corrugated shape, and each curve in the instrumentation guide tube in the corrugated shape comes into contact with an inner circumferential surface of the guide tube.

According to a nineteenth invention, in the structure for suppressing flow vibration of an instrumentation guide tube of the first invention, the lower hole is provided at the side surface of the guide tube in plurality in a circumferential direction, a pressure adjustment hole is provided at a side surface of the upper core support column, the instrumentation guide tube is pressed against the inner circumferential surface of the guide tube, by a differential pressure between the coolant inside and outside any one lower hole among the lower holes, and the coolant flowing into the guide tube from a lower end of the guide tube flows out to outside from inside the guide tube through a lower hole other than the one lower hole among the lower holes, and also flows out to outside from inside the upper core support column through the pressure adjustment hole.

According to a twentieth invention, in the structure for suppressing flow vibration of an instrumentation guide tube of the third invention, the upper hole and the lower hole are provided at the side surface of the guide tube in plurality in a circumferential direction, an upper pressure adjustment hole and a lower pressure adjustment hole are provided at two positions, namely, an upper portion and a lower portion, of a side surface of the upper core support column, the instrumentation guide tube is pressed against the inner circumferential surface of the guide tube, by a differential pressure between the coolant inside and outside any one upper hole and lower hole among the upper holes and the lower holes, and the coolant flowing into the guide tube from an upper end of the guide tube flows out to outside from inside the guide tube through an upper hole other than the one upper hole among the upper holes, and also flows out to outside from inside the upper core support column through the upper pressure adjustment hole, and the coolant flowing into the guide tube from a lower end of the guide tube flows out to outside from inside the guide tube through a lower hole other than the one lower hole among the lower holes, and also flows out to outside from inside the upper core support column through the lower pressure adjustment hole.

According to a twenty-first invention, in the structure for suppressing flow vibration of an instrumentation guide tube of the second invention, a convex portion that directs a flow direction of the coolant in a direction of the lower hole is provided at an inner circumferential surface of an extension tube provided at a lower end of the head nozzle or an inner circumferential surface of the guide tube, or at the inner circumferential surface of the extension tube and the inner circumferential surface of the guide tube.

According to a twenty-second invention, in the structure for suppressing flow vibration of an instrumentation guide tube of the fourth invention, a convex portion that directs a flow direction of the coolant in directions of the upper hole and the lower hole is provided at an inner circumferential surface of an extension tube provided at a lower end of the head nozzle or an inner circumferential surface of the guide tube, or at the inner circumferential surface of the extension tube and the inner circumferential surface of the guide tube.

According to a twenty-third invention, in the structure for suppressing flow vibration of an instrumentation guide tube of the second invention, a pressure introduction tube is provided at a position opposite to the lower hole along a longitudinal direction of the guide tube, and inside of the pressure introduction tube and inside of the guide tube communicate with each other.

According to a twenty-fourth invention, in the structure for suppressing flow vibration of an instrumentation guide tube of the fourth invention, a pressure introduction tube is provided at positions opposite to the upper hole and the lower hole along a longitudinal direction of the guide tube, and inside of the pressure introduction tube and inside of the guide tube communicate with each other.

According to a twenty-fifth invention, in the structure for suppressing flow vibration of an instrumentation guide tube of the twenty-third or twenty-fourth invention, a concave portion communicating with the inside of the pressure introduction tube is formed at an inner circumferential surface of the head nozzle.

According to a twenty-sixth invention, in the structure for suppressing flow vibration of an instrumentation guide tube of the twenty-third invention, a communicating hole that makes the inside of the pressure introduction tube and the inside of the guide tube communicate with each other is provided at a position corresponding to the lower hole.

According to a twenty-seventh invention, in the structure for suppressing flow vibration of an instrumentation guide tube of the twenty-fourth invention, communicating holes that make the inside of the pressure introduction tubes and the inside of the guide tubes communicate with each other are provided at positions corresponding to the upper hole and the lower hole.

According to a twenty-eightieth invention, in the structure for suppressing flow vibration of an instrumentation guide tube of the twenty-third invention, the lower hole is provided at the side surface of the guide tube in plurality in a circumferential direction, the instrumentation guide tube is pressed against the inner circumferential surface of the guide tube, by a differential pressure between the coolant inside and outside any one lower hole among the lower holes, and the coolant flowing into the guide tube from a lower end of the guide tube flows out to outside from inside the guide tube through a lower hole other than the one lower hole among the lower holes, and also flows out to outside from inside the upper core support column through the pressure adjustment hole.

According to a twenty-ninth invention, in the structure for suppressing flow vibration of an instrumentation guide tube of the twenty-fourth invention, the upper hole and the lower hole are provided at the side surface of the guide tube in plurality in a circumferential direction, the instrumentation guide tube is pressed against the inner circumferential surface of the guide tube, by a differential pressure between the coolant inside and outside any one upper hole and lower hole among the upper holes and the lower holes, and the coolant flowing into the guide tube from an upper end of the guide tube flows out to outside from inside the guide tube through an upper hole other than the one upper hole among the upper holes, and also flows out to outside from inside the upper core support column through the upper pressure adjustment hole, and the coolant flowing into the guide tube from a lower end of the guide tube flows out to outside from inside the guide tube through a lower hole other than the one lower hole among the lower holes, and also flows out to outside from inside the upper core support column through the lower pressure adjustment hole.

According to a thirtieth invention, a structure for suppressing flow vibration of an instrumentation guide tube includes, an upper core support column interposed between an upper core support plate and an upper core plate in a reactor vessel; a support column penetrating hole that penetrates through the upper core support column in an axis direction thereof and communicates with an opening portion provided at the upper core plate; a head nozzle provided at an end of the upper core support column on a core side; a head nozzle penetrating hole that penetrates through the head nozzle in an axis direction thereof and communicates with the support column penetrating hole; an instrumentation guide tube inserted through the support column penetrating hole and the head nozzle penetrating hole, and whose one end is inserted into the core; and a side hole provided at a side portion of the upper core support column and making the support column penetrating hole and outside of the upper core support column communicate with each other. The instrumentation guide tube is pressed against an inner circumference of the head nozzle, by a differential pressure between a coolant at an opening portion of the head nozzle and a coolant outside the side hole.

According to a thirty-first invention, the structure for suppressing flow vibration of an instrumentation guide tube of the thirtieth invention further includes: a coolant inlet provided at the head nozzle on the core side and guiding the coolant to the head nozzle penetrating hole; and a coolant outlet provided at the head nozzle on the upper core support column side and also on a side opposite to an axis of the head nozzle, and letting the coolant introduced to the head nozzle penetrating hole flow out to the support column penetrating hole.

According to a thirty-second invention, in the structure for suppressing flow vibration of an instrumentation guide tube of the thirtieth invention, the coolant inlet and the coolant outlet are provided in plurality.

According to a thirty-third invention, in the structure for suppressing flow vibration of an instrumentation guide tube of the thirtieth invention, an inlet side coolant passage communicating with the coolant inlet and whose opening area having a cross-section perpendicular to an axis of the head nozzle gradually increases towards the core side from the support column penetrating hole side is provided inside the head nozzle.

According to a thirty-fourth invention, in the structure for suppressing flow vibration of an instrumentation guide tube of the thirtieth invention, an inner surface of the head nozzle on the core side has an opening area having a cross-section perpendicular to an axis of the head nozzle that increases towards an end of the head nozzle on the core side from the upper core support column side.

According to a thirty-fifth invention, in the structure for suppressing flow vibration of an instrumentation guide tube of the thirtieth invention, the head nozzle includes an instrumentation guide tube holder arranged at an outer circumferential portion of the instrumentation guide tube, a nozzle space provided outside the instrumentation guide tube holder, a barrier provided between an inner surface of the head nozzle space and the instrumentation guide tube holder, and dividing the nozzle space into a side of the coolant inlet and a side of the coolant outlet, a coolant inflow port provided at an outer circumferential portion of the instrumentation guide tube holder, and communicating with the nozzle space on the side of the coolant inlet being divided, and a coolant outflow port provided at an outer circumferential portion of the instrumentation guide tube holder, and communicating with the nozzle space on the side of the coolant outlet being divided. the nozzle space on the side of the coolant inlet being divided and the coolant inlet communicate with each other, and the nozzle space on the side of the coolant outlet being divided and the coolant outlet communicate with each other.

According to a thirty-sixth invention, a structure for suppressing flow vibration of an instrumentation guide tube includes: an upper core support column interposed between an upper core support plate and an upper core plate in a reactor vessel; a support column penetrating hole that penetrates through the upper core support column in an axis direction thereof, and communicating with an opening portion provided at the upper core plate; an instrumentation guide tube inserted through the support column penetrating hole, and whose one end is inserted into a core; a side hole provided at a side surface of the upper core support column, and making the support column penetrating hole and outside of the upper core support column communicate with each other; a coolant blocking member formed with an insertion hole through which the instrumentation guide tube is inserted, provided on a side closer to the upper core support plate than the side hole in the support column penetrating hole, and blocking a coolant that flows in the support column penetrating hole; an instrumentation guide tube holder arranged between the instrumentation guide tube and the support column penetrating hole, and closer to the core side than the coolant blocking member; a barrier provided between the support column penetrating hole and the instrumentation guide tube holder, and closer to the core side than the coolant blocking member, and dividing inside of the support column penetrating hole into a space on a side where the side hole is provided and a space on a side where the side hole is not provided; a coolant inflow port that makes the space on the side where the side hole is not provided and inside of the instrumentation guide tube holder communicate with each other; and a coolant outflow port that makes the space on the side where the side hole is provided and inside of the instrumentation guide tube holder communicate with each other. The instrumentation guide tube is pressed against an inner circumference of the instrumentation guide tube holder, by a differential pressure between a coolant present in the space on the side where the side hole is provided and a coolant present on the side where the side hole is not provided.

According to a thirty-seventh invention, in the structure for suppressing flow vibration of an instrumentation guide tube of the thirty-sixth invention, an end of the barrier on the core side has a curved surface.

According to a thirty-eighth invention, in the structure for suppressing flow vibration of an instrumentation guide tube of the thirty-sixth invention, an end of the instrumentation guide tube holder on the core side has a curved surface.

According to a thirty-ninth invention, in the structure for suppressing flow vibration of an instrumentation guide tube of the thirty-sixth invention, an inner surface of the support column penetrating hole on the core side is formed in a bell-mouth shape.

According to a fortieth invention, in the structure for suppressing flow vibration of an instrumentation guide tube of the thirty-sixth invention, a closure member that blocks the space divided by the barrier on the side where the side hole is provided, is provided at an end of the upper core support column on the core side.

According to a forty-first invention, in the structure for suppressing flow vibration of an instrumentation guide tube of the thirty-sixth invention, a coolant rectifying unit that rectifies the coolant flowing into the support column penetrating hole is provided at the support column penetrating hole on the core side.

According to a forty-second invention, in the structure for suppressing flow vibration of an instrumentation guide tube of the thirty-sixth invention, an inner surface of the support column penetrating hole has an opening area having a cross-section perpendicular to an axis of the upper core support column gradually increasing towards an end of the upper core support column on the core side.

The components of the inventions may arbitrarily be combined. For example, the plug in the fifth invention can be combined with the components of the other inventions.

Effect of the Invention

With the structure for suppressing flow vibration of an instrumentation guide tube according to the first invention, the instrumentation guide tube can be smoothly inserted into the head nozzle, while being guided to the head nozzle by the guide tube. Accordingly, the instrumentation guide tube can be smoothly inserted into the core, by being inserted through the head nozzle. The lower hole is provided at least at the lower portion of the side surface of the guide tube, and the instrumentation guide tube is pressed against the inner circumferential surface of the guide tube, by a differential pressure between the coolant inside and outside the lower hole. Consequently, it is possible to suppress the flow vibration of the instrumentation guide tube generated by the flow of the coolant flowing out from the core, by the pressing force generated by the differential pressure between the coolant inside and outside the lower hole.

With the structure for suppressing flow vibration of an instrumentation guide tube according to the second invention, the pressure adjustment hole is provided at the side surface of the upper core support column. The coolant flowing into the guide tube from the lower end of the guide tube flows out to the outside from inside the guide tube through the gap between the instrumentation guide tube and the lower hole, and then flows out to the outside from inside the upper core support column through the pressure adjustment hole. Because the pressure of the coolant is low outside the upper core support column (in an upper plenum), the pressure in the upper core support column (between the guide tube and the upper core support column) can further be lowered, by providing the pressure adjustment hole at the upper core support column. Accordingly, because the pressing force generated by the differential pressure between the coolant inside and outside the lower hole can be increased, it is possible to more reliably suppress the flow vibration of the instrumentation guide tube.

With the structure for suppressing flow vibration of an instrumentation guide tube according to the third invention, the instrumentation guide tube can be smoothly inserted into the head nozzle, by guiding the instrumentation guide tube to the head nozzle by the guide tube. Accordingly, the instrumentation guide tube can be smoothly inserted into the core, by the head nozzle. The upper hole and the lower hole are provided at two positions, namely, the upper portion and the lower portion, of the side surface of the guide tube, and the instrumentation guide tube is pressed against the inner circumferential surface of the guide tube, by a differential pressure between the coolant inside and outside the upper hole and the lower hole. Consequently, it is possible to suppress the flow vibration of the instrumentation guide tube generated by the flow of the coolant flowing out from the core, by the pressing force generated by the differential pressure between the coolant inside and outside the upper hole and the lower hole.

With the structure for suppressing flow vibration of an instrumentation guide tube according to the fourth invention, the upper pressure adjustment hole and the lower pressure adjustment hole are provided at two positions, namely, the upper portion and the lower portion, of the side surface of the upper core support column. Accordingly, the coolant flowing into the guide tube from the upper end of the guide tube flows out to the outside from inside the guide tube through the gap between the instrumentation guide tube and the upper hole, and also flows out to the outside from inside the upper core support column through the upper pressure adjustment hole. The coolant flowing into the guide tube from the lower end of the guide tube flows out to the outside from inside the guide tube through the gap between the instrumentation guide tube and the lower hole, and also flows out to the outside from inside the upper core support column through the lower pressure adjustment hole. Because the pressure of the coolant is low outside the upper core support column (in the upper plenum), the pressure of the coolant in the upper core support column (between the guide tube and the upper core support column) can further be lowered, by providing the upper pressure adjustment hole and the lower pressure adjustment hole at the upper core support column. Accordingly, because the pressing force generated by the differential pressure between the coolant can be increased, it is possible to more reliably suppress the flow vibration of the instrumentation guide tube.

With the structure for suppressing flow vibration of an instrumentation guide tube according to the fifth invention, the pressure adjustment hole is the hole for the plug detachably provided at the side surface of the upper core support column. Because any plug can be selected from a plurality of plugs with different hole size and fixed at the side surface of the upper core support column, the pressure of the coolant in the upper core support column (between the guide tube and the upper core support column) can be arbitrarily adjusted, by adjusting the size of the pressure adjustment hole at will. Accordingly, the pressing force generated by the differential pressure between the coolant can be arbitrarily adjusted, and the flow amount of the coolant flowing out from the core into the guide tube can be adjusted at will.

With the structure for suppressing flow vibration of an instrumentation guide tube according to the sixth invention, the upper pressure adjustment hole and the lower pressure adjustment hole are the holes for the plugs detachably provided at the side surface of the upper core support column. Because any plug can be selected from the plugs with different hole size, and fixed to the side surface of the upper core support column, the pressure of the coolant in the upper core support column (between the guide tube and the upper core support column) can be arbitrarily adjusted, by adjusting the sizes of the upper pressure adjustment hole and the lower pressure adjustment hole at will. Accordingly, the pressing force generated by the differential pressure between the coolant can be arbitrarily adjusted, and the flow amount of the coolant from the top end (upper space of the upper core support plate) into the guide tube, and the flow amount of the coolant flowing out from the core into the guide tube can be adjusted at will.

With the structure for suppressing flow vibration of an instrumentation guide tube according to the seventh invention, the pressure introduction hole is provided at the side surface of the guide tube at the position above the lower hole. A part of the coolant flowing into the guide tube from the lower end of the guide tube flows out to the outside from inside the guide tube through the pressure introduction hole, and also flows out to the outside from inside the upper core support column through the pressure adjustment hole. Accordingly, the pressure of the coolant (coolant flowing out from the core) flowing into the guide tube from the lower end of the guide tube is introduced to the position of the pressure introduction hole. As a result, the pressure of the coolant in the guide tube at the position of the lower hole can be increased. Consequently, it is possible to more reliably suppress the flow vibration of the instrumentation guide tube, by increasing the pressing force generated by the differential pressure between the coolant.

With the structure for suppressing flow vibration of an instrumentation guide tube according to the eighth invention, the first pressure introduction hole of the upper side and the second pressure introduction hole of the lower side are provided at the side surface of the guide tube, at the positions between the upper hole and the lower hole. A part of the coolant flowing into the guide tube from the upper end of the guide tube flows out to the outside from inside the guide tube through the first pressure introduction hole, and also flows out to the outside from inside the upper core support column through the upper pressure adjustment hole. A part of the coolant flowing into the guide tube from the lower end of the guide tube flows out to the outside from inside the guide tube through the second pressure introduction hole, and also flows out to the outside from inside the upper core support column through the lower pressure adjustment hole. Accordingly, the pressure of the coolant (coolant in the top end) that flows into the guide tube from the upper end of the guide tube is introduced to the position of the first pressure introduction hole, and the pressure of the coolant (coolant flowing out from the core) that flows into the guide tube from the lower end of the guide tube is introduced to the position of the second pressure introduction hole. As a result, the pressure of the coolant in the guide tube at the positions of the upper hole and the lower hole can be increased. Accordingly, it is possible to more reliably suppress the flow vibration of the instrumentation guide tube, by increasing the pressing force generated by the differential pressure between the coolant. The coolant at a low temperature (coolant in the top end) that flows into the guide tube from the upper end of the guide tube, and the coolant at a high temperature (coolant flowing out from the core) that flows into the guide tube from the lower end of the guide tube flow out from the first pressure introduction hole and the second pressure introduction hole, separately. Accordingly, it is possible to suppress the generation of thermal stress, due to interface migration of the low-temperature coolant and the high-temperature coolant.

With the structure for suppressing flow vibration of an instrumentation guide tube according to the ninth invention, the restricting unit is provided at the inner circumferential surface of the guide tube, at the position between the first pressure introduction hole and the second pressure introduction hole. By using the restricting unit, the low-temperature coolant (coolant in the top end) that flows into the guide tube from the upper end of the guide tube and the high-temperature coolant (coolant flowing out from the core) that flows into the guide tube from the lower end of the guide tube are more reliably suppressed from being mixed. As a result, it is possible to more reliably suppress the generation of thermal stress, due to interface migration of the low-temperature coolant and the high-temperature coolant.

With the structure for suppressing flow vibration of an instrumentation guide tube according to the tenth invention, the cover that guides the coolant flowing out from the pressure adjustment hole downwards is provided at the side surface of the upper core support column. Accordingly, even if the pressure outside the upper core support column at the set position of the pressure adjustment hole is increased, due to the influence of the side flow of the coolant from the adjacent upper core support column, the coolant flowing out from the pressure adjustment hole can be guided downwards where pressure is low, by the cover. Consequently, it is possible to reliably suppress the flow vibration of the instrumentation guide tube, by obtaining the pressing force generated by the differential pressure between the coolant.

With the structure for suppressing flow vibration of an instrumentation guide tube according to the eleventh invention, the cover that guides the coolant flowing out from the lower pressure adjustment hole downwards is provided at the side surface of the upper core support column. Accordingly, even if the pressure outside the upper core support column at the set position of the lower pressure adjustment hole is increased, due to the influence of the side flow of the coolant from the adjacent upper core support column, the coolant flowing out from the lower pressure adjustment hole can be guided downwards where pressure is low, by the cover. Consequently, it is possible to reliably suppress the flow vibration of the instrumentation guide tube, by obtaining the pressing force generated by the differential pressure between the coolant.

With the structure for suppressing flow vibration of an instrumentation guide tube according to the twelfth invention, the inner circumferential surface of the head nozzle through which the instrumentation guide tube is inserted has the shape of an inverted truncated cone. Accordingly, it is possible to insert the instrumentation guide tube more smoothly into the core by the head nozzle. Because the gap between the inner circumferential surface of the head nozzle and the instrumentation guide tube becomes small at the lower end of the head nozzle, it is also possible to prevent the turbulence of the coolant generated because the coolant is disturbed at the lower end of the head nozzle, from flowing into the head nozzle. Because the turbulence of the coolant causes the flow vibration (excitation force) of the instrumentation guide tube, the flow vibration of the instrumentation guide tube can be suppressed, by preventing the turbulence of the coolant from flowing into the head nozzle.

With the structure for suppressing flow vibration of an instrumentation guide tube according to the thirteenth invention, the outer circumferential surface of the head nozzle through which the instrumentation guide tube is inserted has the shape of an inverted truncated cone, and the lower end of the outer circumferential surface and the lower end of the inner circumferential surface communicate with each other. In other words, because the exterior of the head nozzle is a streamline, the coolant is hardly disturbed at the lower end of the head nozzle. Consequently, it is possible to suppress the generation of the flow vibration of the instrumentation guide tube, because the turbulence (excitation force) of the coolant that causes the flow vibration of the instrumentation guide tube is hardly generated.

With the structure for suppressing flow vibration of an instrumentation guide tube according to the fourteenth invention, the hole is provided at the side surface of the head nozzle, and the instrumentation guide tube is pressed against the inner circumferential surface of the head nozzle, by a differential pressure between the coolant inside and outside the hole. Accordingly, the flow vibration of the instrumentation guide tube can be suppressed, by the pressing force generated by the differential pressure between the coolant inside and outside the hole.

With the structure for suppressing flow vibration of an instrumentation guide tube according to the fifteenth invention, the rectifying plate is provided at the opening portion of the upper core plate. A part of the coolant water flows upwards towards the head nozzle, by rectifying the part of the coolant that passes through the opening portion of the upper core plate by the rectifying plate. Accordingly, the side flow of the coolant can be prevented from being disturbed, at the lower end of the head nozzle. Consequently, it is possible to suppress the generation of the flow vibration of the instrumentation guide tube, because the turbulence (excitation force) of the coolant that causes the flow vibration of the instrumentation guide tube is hardly generated.

With the structure for suppressing flow vibration of an instrumentation guide tube according to the sixteenth invention, the extension tube is provided at the lower end of the head nozzle, and the hole is provided at the side surface of the extension tube. Accordingly, the instrumentation guide tube is pressed against the inner circumferential surface of the extension tube, by a differential pressure between the coolant inside and outside the hole. Consequently, it is possible to suppress the flow vibration of the instrumentation guide tube, by the pressing force generated by the differential pressure between the coolant inside and outside the hole.

With the structure for suppressing flow vibration of an instrumentation guide tube according to the seventeenth invention, the guide tube is divided into two, namely, the first guide tube unit of the upper side and the second guide tube unit of the lower side, at the position between the first pressure introduction hole and the second pressure introduction hole. The lower end of the first guide tube unit and the upper end of the second guide tube unit are separated from each other. Accordingly, it is possible to suppress the generation of thermal stress caused by thermal elongation of the guide tube.

With the structure for suppressing flow vibration of an instrumentation guide tube according to the eighteenth invention, the instrumentation guide tube has a corrugated shape. The curves of the corrugated instrumentation guide tube come into contact with the inner circumferential surface of the guide tube. Accordingly, it is possible to suppress the flow vibration of the instrumentation guide tube, by the inner circumferential surface of the guide tube, with which the curves of the instrumentation guide tube come into contact.

With the structure for suppressing flow vibration of an instrumentation guide tube according to the nineteenth invention, the lower hole is provided at the side surface of the guide tube in plurality in the circumferential direction, and the pressure adjustment hole is provided at the side surface of the upper core support column. Accordingly, the instrumentation guide tube is pressed against the inner circumferential surface of the guide tube, by a differential pressure between the coolant inside and outside any one lower hole among the lower holes. The coolant flowing into the guide tube from the lower end of the guide tube flows out to the outside from inside the guide tube through a lower hole other than the one lower hole among the lower holes, and also flows out to the outside from inside the upper core support column through the pressure adjustment hole. Consequently, for example, even if the instrumentation guide tube is permanently bent, and the position of the instrumentation guide tube in the guide tube varies, the instrumentation guide tube can be pressed against the inner circumferential surface of the guide tube, at any one of the lower holes.

With the structure for suppressing flow vibration of an instrumentation guide tube according to the twentieth invention, the upper hole and the lower hole are provided at the side surface of the guide tube in plurality in the circumferential direction, and the upper pressure adjustment hole and the lower pressure adjustment hole are provided at two positions, namely, the upper portion and the lower portion, of the side surface of the upper core support column. Accordingly, the instrumentation guide tube is pressed against the inner circumferential surface of the guide tube, by a differential pressure between the coolant inside and outside any one upper hole and any one lower hole among the upper holes and the lower holes. The coolant flowing into the guide tube from the upper end of the guide tube flows out to the outside from inside the guide tube through an upper hole other than the one upper hole among the upper holes, and also flows out to the outside from inside the upper core support column through the upper pressure adjustment hole. The coolant flowing into the guide tube from the lower end of the guide tube flows out to the outside from inside the guide tube through a lower hole other than the one lower hole among the lower holes, and also flows out to the outside from inside the upper core support column through the lower pressure adjustment hole. Consequently, for example, even if the instrumentation guide tube is permanently bent, and the position of the instrumentation guide tube in the guide tube varies, it is possible to press the instrumentation guide tube against the inner circumferential surface of the guide tube, at any one of the upper holes and any one of the lower holes.

With the structure for suppressing flow vibration of an instrumentation guide tube according to the twenty-first invention, the convex portion that directs the flow direction of the coolant in the direction of the lower hole is provided at the inner circumferential surface of the extension tube provided at the lower end of the head nozzle or at the inner circumferential surface of the guide tube, or at the inner circumferential surface of the extension tube and the inner circumferential surface of the guide tube. Accordingly, the force that presses the instrumentation guide tube in the direction of the lower hole is applied to the instrumentation guide tube, by the flow towards the lower hole (flow in the transverse direction). Consequently, for example, even if the instrumentation guide tube is permanently bent and the position of the instrumentation guide tube in the guide tube varies, it is possible to press the instrumentation guide tube against the inner circumferential surface of the guide tube at the lower hole, more reliably.

With the structure for suppressing flow vibration of an instrumentation guide tube according to the twenty-second invention, the convex portion that directs the flow direction of the coolant in the direction of the upper hole and the lower hole is provided at the inner circumferential surface of the extension tube provided at the lower end of the head nozzle or the inner circumferential surface of the guide tube, or at the inner circumferential surface of the extension tube and the inner circumferential surface of the guide tube. Accordingly, the force that presses the instrumentation guide tube in the directions of the upper hole and the lower hole is applied to the instrumentation guide tube, by the flow towards the upper hole and the lower hole (flow in the transverse direction). Accordingly, for example, even if the instrumentation guide tube is permanently bent, and the position of the instrumentation guide tube in the guide tube varies, it is possible to reliably press the instrumentation guide tube against the inner circumferential surface of the guide tube at the upper hole and the lower hole.

With the structure for suppressing flow vibration of an instrumentation guide tube according to the twenty-third invention, the pressure introduction tube is provided at the position opposite to the lower hole along the longitudinal direction of the guide tube, and the inside of the pressure introduction tube and the inside of the guide tube communicate with each other. Accordingly, the pressure of the coolant is introduced to the side opposite to the lower hole by the pressure introduction tube, thereby increasing the pressure on the side opposite to the lower hole. Consequently, even if the instrumentation guide tube is separated from the lower hole, while the instrumentation guide tube is inserted through the guide tube, the instrumentation guide tube is pressed in the direction of the lower hole, by the pressure on the side opposite to the lower hole. As a result, it is possible to reliably press the instrumentation guide tube against the inner circumferential surface of the guide tube at the lower hole.

With the structure for suppressing flow vibration of an instrumentation guide tube according to the twenty-fourth invention, the pressure introduction tube is provided at the position opposite to the upper hole and the lower hole along the longitudinal direction of the guide tube, and the inside of the pressure introduction tube and the inside of the guide tube communicate with each other. Accordingly, the pressure of the coolant is introduced to the side opposite to the upper hole and the lower hole by the pressure introduction tube, thereby increasing the pressure on the side opposite to the upper hole and the lower hole. Consequently, even if the instrumentation guide tube is separated from the upper hole and the lower hole, while the instrumentation guide tube is inserted through the guide tube, the instrumentation guide tube is pressed in the directions of the upper hole and the lower hole, by the pressure on the side opposite to the upper hole and the lower hole. As a result, it is possible to reliably press the instrumentation guide tube against the inner circumferential surface of the guide tube, at the upper hole and the lower hole.

With the structure for suppressing flow vibration of an instrumentation guide tube according to the twenty-fifth invention, the concave portion communicating with the inside of the pressure introduction tube is formed at the inner circumferential surface of the head nozzle. Because an upper flow of the coolant can be introduced in the pressure introduction tube through the concave portion, the pressure of the coolant can be introduced by the pressure introduction tube more reliably.

With the structure for suppressing flow vibration of an instrumentation guide tube according to the twenty-sixth invention, the communicating hole that makes the inside of the pressure introduction tube and the inside of the guide tube communicate with each other is provided at the position corresponding to the lower hole. Compared with the case where the inside of the pressure introduction tube and the inside of the guide tube entirely communicate with each other, it is possible to introduce the pressure of the coolant to the side opposite to the lower hole at a position corresponding to the lower hole, by the pressure introduction tube more reliably. Accordingly, compared with the case where the inside of the pressure introduction tube and the inside of the guide tube entirely communicate with each other, it is possible to press the instrumentation guide tube in the direction of the lower hole more reliably, by the pressure of the coolant introduced to the side opposite to the lower hole.

With the structure for suppressing flow vibration of an instrumentation guide tube according to the twenty-seventh invention, the communicating hole that makes the inside of the pressure introduction tube and the inside of the guide tube communicate with each other is provided at a position corresponding to the upper hole and the lower hole. Compared with the case where the inside of the pressure introduction tube and the inside of the guide tube entirely communicate with each other, it is possible to introduce the pressure of the coolant to the side opposite to the upper hole and the lower hole, at the positions corresponding to the upper hole and the lower hole, by the pressure introduction tube more reliably. Accordingly, compared with the case where the inside of the pressure introduction tube and the inside of the guide tube entirely communicate with each other, it is possible to press the instrumentation guide tube in the direction of the upper hole and the lower hole, by the pressure of the coolant introduced to the side opposite to the upper hole and the lower hole more reliably.

With the structure for suppressing flow vibration of an instrumentation guide tube according to the twenty-eighth invention, the lower hole is provided at the side surface of the guide tube in plurality in the circumferential direction. The instrumentation guide tube is pressed against the inner circumferential surface of the guide tube, by a differential pressure between the coolant inside and outside any one lower hole among the lower holes. The coolant flowing into the guide tube from the lower end of the guide tube flows out to the outside from inside the guide tube through a lower hole other than the one lower hole among the lower holes, and also flows out to the outside from inside the upper core support column through the pressure adjustment hole. Accordingly, even if the instrumentation guide tube is placed at the position inclined to one side in the guide tube, it is possible to press the instrumentation guide tube against the inner circumferential surface of the guide tube at any one of the lower holes.

With the structure for suppressing flow vibration of an instrumentation guide tube according to the twenty-ninth invention, the upper hole and the lower hole are provided at the side surface of the guide tube in plurality in the circumferential direction. The instrumentation guide tube is pressed against the inner circumferential surface of the guide tube, by a differential pressure between the coolant inside and outside any one upper hole and any one lower hole among the upper holes and the lower holes. The coolant flowing into the guide tube from the upper end of the guide tube flows out to the outside from inside the guide tube through an upper hole other than the one upper hole among the upper holes, and also flows out to the outside from inside the upper core support column through the upper pressure adjustment hole. The coolant flowing into the guide tube from the lower end of the guide tube flows out to the outside from inside the guide tube through a lower hole other than the one lower hole among the lower holes, and also flows out to the outside from inside the upper core support column through the lower pressure adjustment hole. Accordingly, even if the instrumentation guide tube is placed at the position inclined to one side in the guide tube, it is possible to press the instrumentation guide tube against the inner circumference of the guide tube at any one of the upper holes and any one of the lower holes.

With the structure for suppressing flow vibration of an instrumentation guide tube according to the thirtieth invention, the instrumentation guide tube is pressed against the inner circumference of the head nozzle, by a differential pressure between the coolant at the opening portion of the head nozzle and the coolant outside the side hole provided at the upper core support column. Accordingly, the flow vibration of the instrumentation guide tube generated by the flow of the coolant flowing out from the core can be suppressed, by the pressing force generated by the differential pressure between the coolant at the opening portion of the head nozzle and the coolant outside the side hole provided at the upper core support column. Because the head nozzle is used, the structure is simplified, thereby preventing cost increase.

With the structure for suppressing flow vibration of an instrumentation guide tube according to the thirty-first invention, the coolant inlet that introduces the coolant to the head nozzle penetrating hole and the coolant outlet that let the coolant introduced to the head nozzle penetrating hole flow out to the support column penetrating hole are arranged at positions substantially symmetrical about the axis of the head nozzle. Accordingly, the pressure of the coolant can be effectively transmitted to the instrumentation guide tube, and the instrumentation guide tube can be pressed against the inner circumference of the head nozzle. As a result, it is possible to more effectively suppress the flow vibration of the instrumentation guide tube, generated by the flow of the coolant flowing out from the core.

With the structure for suppressing flow vibration of an instrumentation guide tube according to the thirty-second invention, the coolant inlet and the coolant outlet are provided in plurality. Accordingly, the force that presses the instrumentation guide tube against the inner circumference of the head nozzle can further be increased. Consequently, it is possible to more effectively suppress the flow vibration of the instrumentation guide tube, generated by the flow of the coolant flowing out from the core.

With the structure for suppressing flow vibration of an instrumentation guide tube according to the thirty-third invention, the head nozzle includes the inlet side coolant passage communicating with the coolant inlet on the core side and whose opening area having a cross-section perpendicular to the axis of the head nozzle gradually increases towards the core side from the support column penetrating hole side. Accordingly, the strength of the pressing force applied to the instrumentation guide tube can be made approximately the same towards the support column penetrating hole side from the coolant inlet side. Consequently, it is possible to prevent imbalance of pressing force. As a result, it is possible to more stably suppress the flow vibration of the instrumentation guide tube.

With the structure for suppressing flow vibration of an instrumentation guide tube according to the thirty-fourth invention, the inner surface of the head nozzle on the core side is formed so that the opening area having a cross-section perpendicular to the axis of the head nozzle increases towards the end of the head nozzle on the core side from the upper core support column side. Accordingly, the coolant from the core can be effectively supplied to the coolant passage of the head nozzle. As a result, the instrumentation guide tube can be pressed against the inner circumference of the head nozzle more reliably, by the coolant. Consequently, it is possible to suppress the flow vibration of the instrumentation guide tube more reliably.

With the structure for suppressing flow vibration of an instrumentation guide tube according to the thirty-fifth invention, the head nozzle includes the instrumentation guide tube holder that holds the instrumentation guide tube, and the barrier provided between the inner surface of the nozzle space in the head nozzle and the instrumentation guide tube holder, and dividing the nozzle space into the side of the coolant inlet and the side of the coolant outlet. The instrumentation guide tube is pressed against the instrumentation guide tube holder that forms a part of the head nozzle, by the pressing force generated by the differential pressure between the coolant at the opening portion of the head nozzle and the coolant outside the side hole provided at the upper core support column. As a result, it is possible to suppress the flow vibration of the instrumentation guide tube generated by the flow of the coolant flowing out from the core.

With the structure for suppressing flow vibration of an instrumentation guide tube according to the thirty-sixth invention, the instrumentation guide tube holder that holds the instrumentation guide tube and the barrier provided between the inner surface of the nozzle space in the head nozzle and the instrumentation guide tube holder, and divides the nozzle space into the side of the coolant inlet and the side of the coolant outlet, is provided in the support column penetrating hole of the upper core support column to which the side hole is provided. The instrumentation guide tube is pressed against the inner circumference of the instrumentation guide tube holder, by a differential pressure between the coolant present in the space on the side where the side hole is provided and the coolant present on the side where the side hole is not provided. Accordingly, it is possible to suppress the flow vibration of the instrumentation guide tube, generated by the flow of the coolant flowing out from the core. Because the head nozzle is not required, the structure is more simplified, thereby preventing cost increase.

With the structure for suppressing flow vibration of an instrumentation guide tube according to the thirty-seventh invention, the end of the barrier on the core side has a curved surface. With the structure for suppressing flow vibration of an instrumentation guide tube according to the thirty-eighth invention, the end of the instrumentation guide tube holder on the core side also has a curved surface. Accordingly, the coolant flowing into the support column penetrating hole can be prevented from being removed at the end of the barrier and at the end of the instrumentation guide tube holder. Consequently, it is possible to suppress the flow vibration of the instrumentation guide tube more effectively.

With the structure for suppressing flow vibration of an instrumentation guide tube according to the thirty-ninth invention, the inner surface of the support column penetrating hole on the core side is formed in a bell-mouth shape. Accordingly, the coolant flowing into the support column penetrating hole can be prevented from being removed at the end of the upper core support column on the core side. Consequently, it is possible to suppress the flow vibration of the instrumentation guide tube more effectively.

With the structure for suppressing flow vibration of an instrumentation guide tube according to the fortieth invention, the closure member that blocks the space divided by the barrier and on the side where the side hole is provided, is provided at the end of the upper core support column on the core side. Accordingly, it is possible to prevent the coolant from flowing into the space on the side where the side hole is provided, and the pressure of the coolant in the space on the side where the side hole is provided can further be lowered. As a result, the instrumentation guide tube is pressed against the instrumentation guide tube holder with a larger pressing force, thereby suppressing the flow vibration of the instrumentation guide tube more effectively.

With the structure for suppressing flow vibration of an instrumentation guide tube according to the forty-first invention, the coolant rectifying unit that rectifies the coolant flowing into the support column penetrating hole is provided at the support column penetrating hole on the core side. Because the coolant flows into the support column penetrating hole after being rectified by the coolant rectifying unit such as a porous plate, the generation of eddy current at the support column penetrating hole can be suppressed. As a result, it is possible to suppress the flow vibration of the instrumentation guide tube more effectively.

With the structure for suppressing flow vibration of an instrumentation guide tube according to the forty-second invention, the inner surface of the support column penetrating hole is formed so that the opening area having a cross-section perpendicular to the axis of the upper core support column gradually increases towards the end of the upper core support column on the core side. Accordingly, the strength of the pressing force applied to the instrumentation guide tube can be made approximately the same towards the coolant blocking member provided at the support column penetrating hole, from the coolant inlet side. Consequently, it is possible to prevent imbalance of pressing force. As a result, it is possible to suppress the flow vibration of the instrumentation guide tube more stably.

Figure 1:
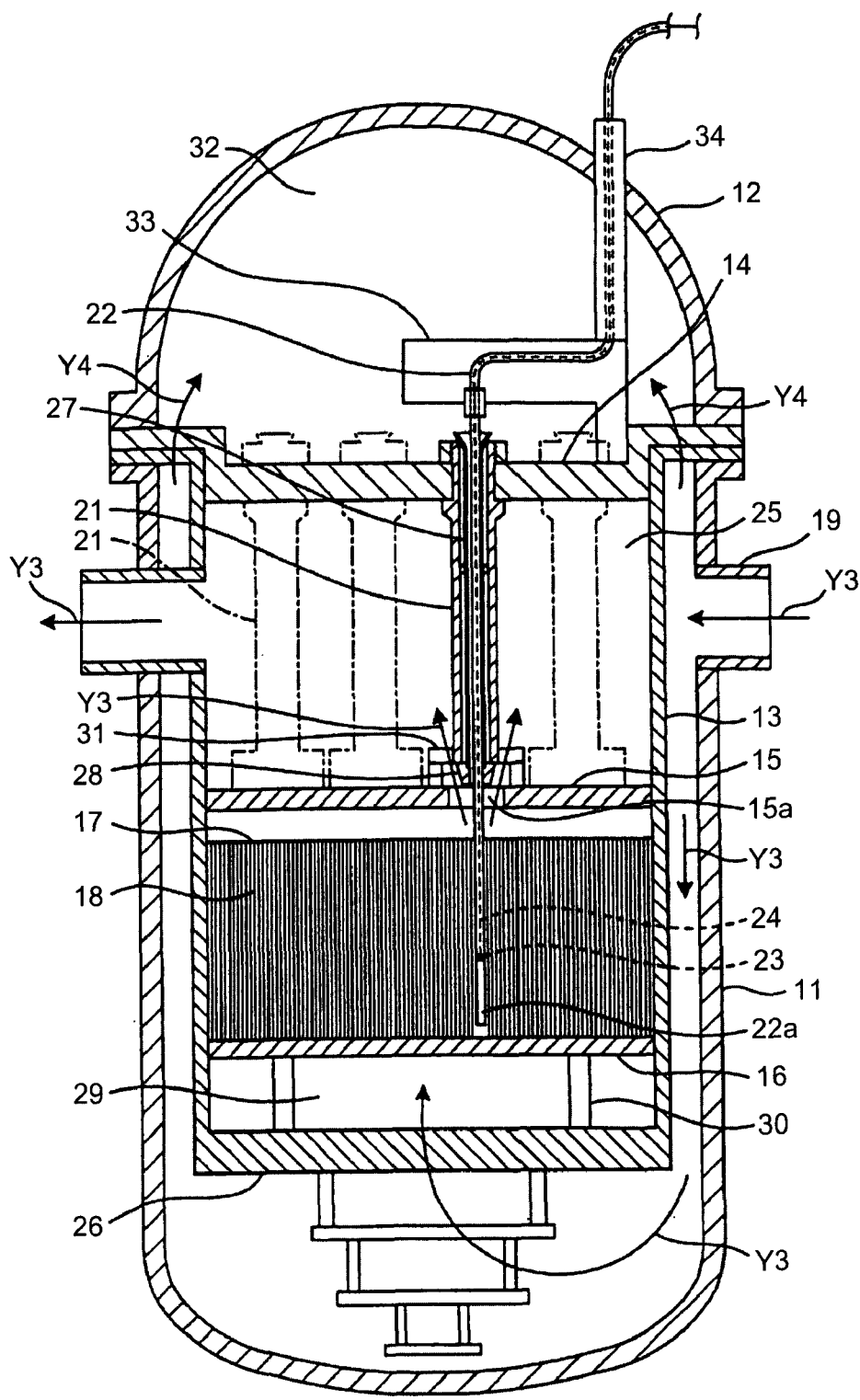
FIG. 1 is an outline sectional view of an internal structure of a PWR reactor vessel that has a structure for suppressing flow vibration of an instrumentation guide tube according to a first embodiment of the present invention.

EXPLANATIONS OF LETTERS OR NUMERALS 11 reactor vessel
12 reactor vessel lid
13 core barrel
14 upper core support plate
15 upper core plate
15a opening portion
16 lower core plate
17 core
18 fuel assembly
19 reactor vessel inlet nozzle
20 reactor vessel outlet nozzle
21, 21A upper core support column
21a inside (support column penetrating hole)
21a1 first support column space
21a2 second support column space
21b, 21c screw hole
22 thimble tube
22a lower end
22b curve
23 neutron detector
24 cable
25 upper plenum
26 lower core support plate
27 guide tube
27A first guide tube unit
27B second guide tube unit 27a inner circumferential surface
28, 28A, 28B, 28C, 28D, 28E head nozzle
28a insertion hole
28b inner circumferential surface
28b-1 lower end of inner circumferential surface
28c outer circumferential surface
28c-1 lower end of outer circumferential surface
29 lower plenum
30 lower core support column
31 leg unit
32 top end
33 thimble tube support plate
34 guide tube
35 nut
36 chamfer
37A upper hole
37B lower hole
38A upper positioner
38A-1 flow hole
38B lower positioner
38B-1 flow hole
38C positioner
38D positioner
41A upper hole
41A-1 expanded portion
41B lower hole
41B-1 expanded portion
42A upper pressure adjustment hole
42B lower pressure adjustment hole
51A upper plug
51A-1 upper pressure adjustment hole
51B lower plug
51B-1 lower pressure adjustment hole
61 pressure introduction hole
71A first pressure introduction hole
71B second pressure introduction hole
81 restricting unit
91 cover
101A first hole
101B second hole
102, 103 hole
111 rectifying plate
112 support member
121 extension tube
121a hole
131A-1 first upper hole
131A-2 second upper hole
131B-1 first lower hole
131B-2 second lower hole
141A first convex portion
141B second convex portion
141C third convex portion
142 extension tube
151 pressure introduction tube
161 concave portion
171A, 171B communicating hole
172 boundary wall
181A-1 first upper hole
181A-2 second upper hole
181B-1 first lower hole
181B-2 second lower hole
210a, 210b side hole
212 holder space
213 closure member
214 spacer
215 coolant blocking member
215H insertion hole
216, 216A porous plate
217 coolant passing hole
280, 280E head nozzle penetrating hole
281 coolant inlet
282, 282c, 282E inlet side coolant passage
283, 283E outlet side coolant passage
284 coolant outlet
285 inlet side sealing unit
286 outlet side sealing unit
287 partition member
287n partition member opening portion
290 core side head nozzle
300 instrumentation guide tube holder
300A first holder
300B second holder
301 barrier
301A first barrier
301B second barrier
303 coolant inflow port
304 coolant outflow port
S gap

BEST MODE(S) FOR CARRYING OUT THE INVENTION

Exemplary embodiments according to the present invention are described below in detail with reference to the accompanying drawings. The present invention is suitably applicable to a pressurized water reactor (PWR). However, the application of the present invention is not limited thereto, and the present invention is also applicable to a boiling water reactor (BWR).

First Embodiment

Figure 2:
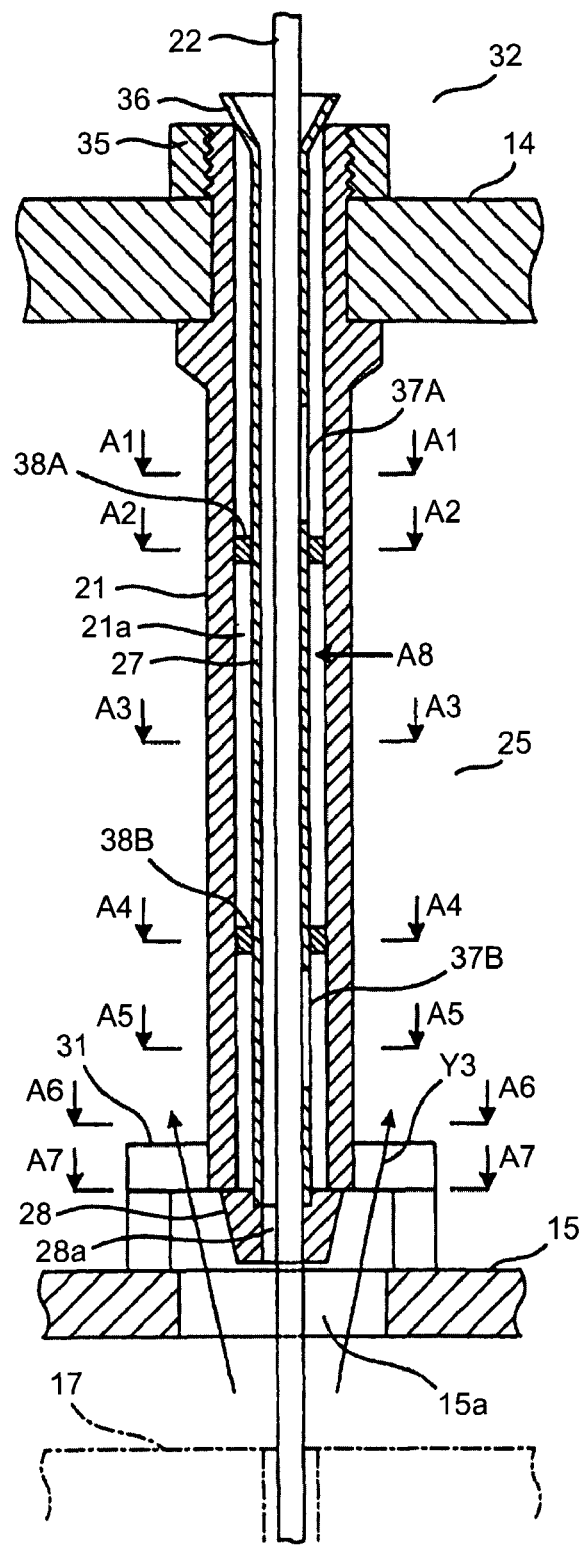
FIG. 2 is an enlarged sectional view of the structure for suppressing flow vibration of an instrumentation guide tube extracted from FIG. 1.

FIG. 1 is an outline sectional view of an internal structure of a PWR reactor vessel that has a structure for suppressing flow vibration of an instrumentation guide tube according to a first embodiment of the present invention. FIG. 2 is an enlarged sectional view of the structure for suppressing flow vibration of an instrumentation guide tube extracted from FIG. 1. FIG. 3(a) is an enlarged fragmentary sectional view taken along the line A1-A1 of FIG. 2. FIG. 3(b) is an enlarged fragmentary sectional view taken along the line A2-A2 of FIG. 2. FIG. 3(c) is an enlarged fragmentary sectional view taken along the line A3-A3 of FIG. 2. FIG. 3(d) is an enlarged fragmentary sectional view taken along the line A4-A4 of FIG. 2. FIG. 3(e) is an enlarged fragmentary sectional view taken along the line A5-A5 of FIG. 2. FIG. 3(f) is an enlarged fragmentary sectional view taken along the line A6-A6 of FIG. 2. FIG. 3(g) is an enlarged fragmentary sectional view taken along the line A7-A7 of FIG. 2. FIG. 3(h) is an enlarged fragmentary view taken in the direction of the arrow A8 in FIG. 2, in which a guide tube is extracted from FIG. 2.

As shown in FIG. 1, an upper portion of a reactor vessel 11 is covered by a reactor vessel lid 12, and the reactor vessel 11 includes a core barrel 13. An upper portion of the core barrel 13 is covered by an upper core support plate 14, and a lower portion thereof is covered by a lower core support plate 26. The core barrel 13 includes an upper core plate 15, a lower core plate 16, and a core 17 provided between the core plates 15 and 26. The core 17 is made up of a large number of fuel assemblies 18. A reactor vessel inlet nozzle 19 is connected to the reactor vessel 11, and a reactor vessel outlet nozzle 20 is connected to the core barrel 13. The reactor vessel outlet nozzle 20 penetrates through the reactor vessel 11, and projects to the outside of the reactor vessel 11.

Although the details will be described later, hollow upper core support columns 21 are interposed between the upper core support plate 14 and the upper core plate 15, and a guide tube 27 is included in each of the upper core support columns 21. A head nozzle 28 is provided at the lower end of each of the upper core support plates 21. A thimble tube 22 that is an instrumentation guide tube is sequentially inserted through the guide tube 27, the head nozzle 28, and an opening portion 15a of the upper core plate 15 from top to bottom, and a lower end 22a thereof is inserted into the core 17. A neutron detector 23 is guided from top to bottom by the thimble tube 22 and inserted into the core 17, with a cable 24 connected thereto.

A top end 32 that is an upper space of the upper core support plate 14 includes a thimble tube support plate 33, and a guide tube 34 penetrates through the reactor vessel lid 12. Accordingly, after inserted into the top end 32 while being guided by the guide tube 34, the thimble tube 22 is inserted into the guide tube 27 through the thimble tube support plate 33.

In FIG. 1, only one upper core support column 21 is indicated by the solid line. However, as shown by the dashed dotted lines in FIG. 1, a plurality of upper core support columns 21 is included in an upper plenum 25 between the upper core support plate 14 and the upper core plate 15, and so is a plurality of thimble tubes 22. On the other hand, a plurality of lower core support columns 30 and the like are included in a lower plenum 29 under the lower core plate 16. A control rod driving device, a control rod cluster guide tube, and the like are not shown.

As shown by the arrows Y3, a coolant (light water) flows into the reactor vessel 11 from the reactor vessel inlet nozzle 19, and flows downward through the reactor vessel 11 and the core barrel 13. The coolant then flows upward in the core 17, cooling the core 17 during this time, and the coolant is heated to a high temperature. After flowing out from the core 17, the coolant passes through the opening portion 15a of the upper core plate 15 and leg units 31 of the upper core support columns 21, and flows into the upper plenum 25. The coolant then flows out to the outside of the reactor vessel 11 from the reactor vessel outlet nozzle 20. At this time, although a small amount, as shown by the arrows Y4, a part of the coolant flowing into the reactor vessel 11 from the reactor vessel inlet nozzle 19, flows into the top end 32 through a bypass flow path, which is not shown.

Based on FIGS. 2 and 3, the structure for suppressing flow vibration of an instrumentation guide tube according to the first embodiment will now be described.

Figure 3:
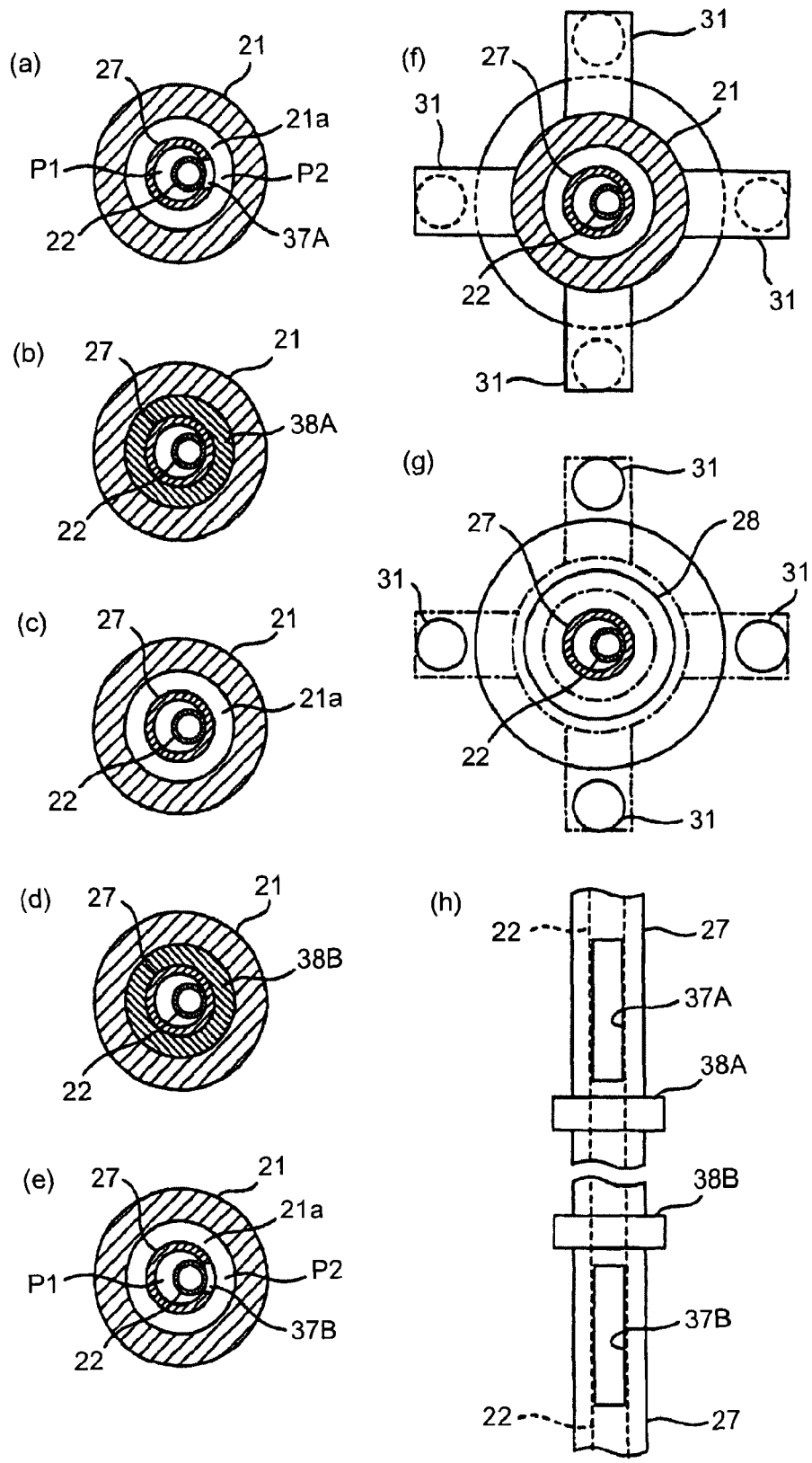
FIG. 3 is an enlarged fragmentary sectional view taken along the line A1-A1 of FIG. 2; an enlarged fragmentary sectional view taken along the line A2-A2 of FIG. 2; an enlarged fragmentary sectional view taken along the line A3-A3 of FIG. 2; an enlarged fragmentary sectional view taken along the line A4-A4 of FIG. 2; an enlarged fragmentary sectional view taken along the line A5-A5 of FIG. 2; an enlarged fragmentary sectional view taken along the line A6-A6 of FIG. 2; an enlarged fragmentary sectional view taken along the line A7-A7 of FIG. 2; and an enlarged fragmentary view taken in the direction of the arrow A8 in FIG. 2, in which a guide tube is extracted from FIG. 2.

As shown in FIGS. 2 and 3, the upper core support column 21 is a cylindrical member supported by the upper core plate 15 by using a plurality of leg units 21 provided at the lower end, and stands vertically upright directly above the opening portion 15a of the upper core plate 15. The upper end of the upper core support column 21 penetrates through the upper core support plate 14, and fixed to the upper core support plate 14 by being screwed together with a nut 35.

The head nozzle 28 is a member in an inverted truncated cone shape whose width is reduced toward the bottom, and fixed to the lower end of the upper core support column 21. The head nozzle 28 includes an insertion hole 28a through which the thimble tube 22 is inserted. The guide tube 27 is a cylindrical member, and inserted into an inside 21a of the upper core support column 21, and the lower end of the guide tube 27 is fitted to the upper end of the head nozzle 28. The guide tube 27 is only inserted into the head nozzle 28, and not fixed to the head nozzle 28. This is to suppress the generation of thermal stress between the guide tube 27 and the head nozzle 28.

The inside of the guide tube 21 and the inside of the head nozzle 28 (insertion hole 28a) communicate with each other, and have the same diameters. A chamfer 36 in an inverted truncated cone shape whose width increases toward the top is provided at the upper end of the guide tube 27. Accordingly, the thimble tube 22 is smoothly inserted into the guide tube 27 by the chamfer 36, and smoothly inserted into the insertion hole 28a of the head nozzle 28, while being guided by the guide tube 27.

An upper positioner 38A and a lower positioner 38B are provided at an upper portion and a lower portion of the outer circumferential surface of the guide tube 27. The positioners 38A and 38B prevent the guide tube 27 from swinging in the upper core support column 21.

In the first embodiment, an upper hole 37A and a lower hole 37B are formed at two positions, namely, the upper portion and the lower portion, of the side surface of the guide tube 27. The upper hole 37A and the lower hole 37B are slits extending in the axis direction of the guide tube 27. However, the shapes of the upper hole 37A and 37B are not limited to the slits, and for example, may be ovals or circles.

By providing the upper hole 37A and the lower hole 37B at the side surface of the guide tube 27, the thimble tube 22 is pressed against the inner circumferential surface of the guide tube 27, by a differential pressure between the coolant inside (in other words, inside the guide tube 27) and outside (in other words, outside the guide tube 27) the upper hole 37A and the lower hole 37B.

In other words, the coolant flowing out from the core 17 can flow into the guide tube 27, from the lower end of the guide tube 27 through the head nozzle 28, and the coolant in the top end 32 can flow into the guide tube 27 from the upper end of the guide tube 27. Accordingly, a pressure P1 of the coolant inside the guide tube 27, as shown in FIGS. 3(a) and 3(e), is substantially equivalent to the pressure of the coolant flowing out from the core 17, or the pressure of the coolant in the top end 32. Alternatively, a pressure P2 of the coolant outside the guide tube 27 is lower than the pressure P1 in the guide tube 27. Accordingly, at the upper hole 37A and the lower hole 37B, the thimble tube 22 is pressed against the inner circumferential surface of the guide tube 27, due to the differential pressure ($\Delta P = P1 - P2$) between the pressures P1 and P2 of the coolant.

As described above, with the structure for suppressing flow vibration of an instrumentation guide tube according to the first embodiment, the thimble tube 22 is guided to the head nozzle 28 by the guide tube 27, and smoothly inserted into the head nozzle 28, and also smoothly inserted into the core by the head nozzle 28. The upper hole 37A and the lower hole 37B are provided at two positions, namely, the upper portion and the lower portion, of the side surface of the guide tube 27, and the thimble tube 22 is pressed against the inner circumferential surface of the guide tube 27, by a differential pressure between the coolant inside and outside the upper hole 37A and the lower hole 37B. Accordingly, the flow vibration of the thimble tube 22 generated by the flow of the coolant flowing out from the core 17, can be suppressed by the pressing force generated by the differential pressure between the coolant inside and outside the upper hole 37A and the lower hole 37B.

Second Embodiment

Figure 4:
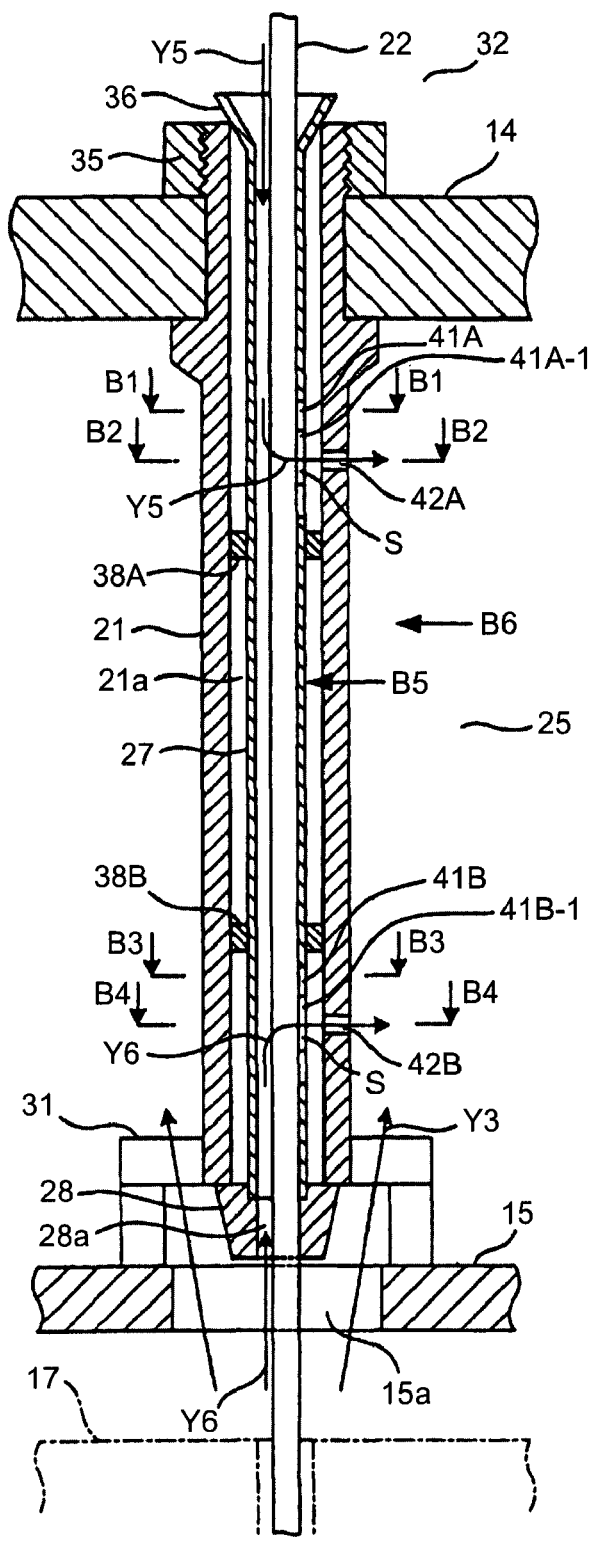
FIG. 4 is a schematic sectional view of a structure for suppressing flow vibration of an instrumentation guide tube according to a second embodiment of the present invention.

FIG. 4 is a schematic sectional view of a structure for suppressing flow vibration of an instrumentation guide tube according to a second embodiment of the present invention. FIG. 5(a) is an enlarged fragmentary sectional view taken along the line B1-B1 of FIG. 4. FIG. 5(b) is an enlarged fragmentary sectional view taken along the line B2-B2 of FIG. 4. FIG. 5(c) is an enlarged fragmentary sectional view taken along the line B3-B3 of FIG. 4. FIG. 5(d) is an enlarged fragmentary sectional view taken along the line B4-B4 of FIG. 4. FIG. 5(e) is an enlarged fragmentary view taken in the direction of the arrow B5 in FIG. 4, in which a guide tube is extracted from FIG. 4. FIG. 5(f) is an enlarged fragmentary view taken in the direction of the arrow B6 in FIG. 4.

Because the overall configuration of the reactor vessel is the same as that of the first embodiment (see FIG. 1), the illustrations and descriptions thereof will be omitted. The same reference numerals are also given to the same parts as those in the first embodiment (see FIGS. 2 and 3), for the structure for suppressing flow vibration of an instrumentation guide tube shown in FIGS. 4 and 5, and their repeated detailed descriptions will be omitted.

Figure 5:
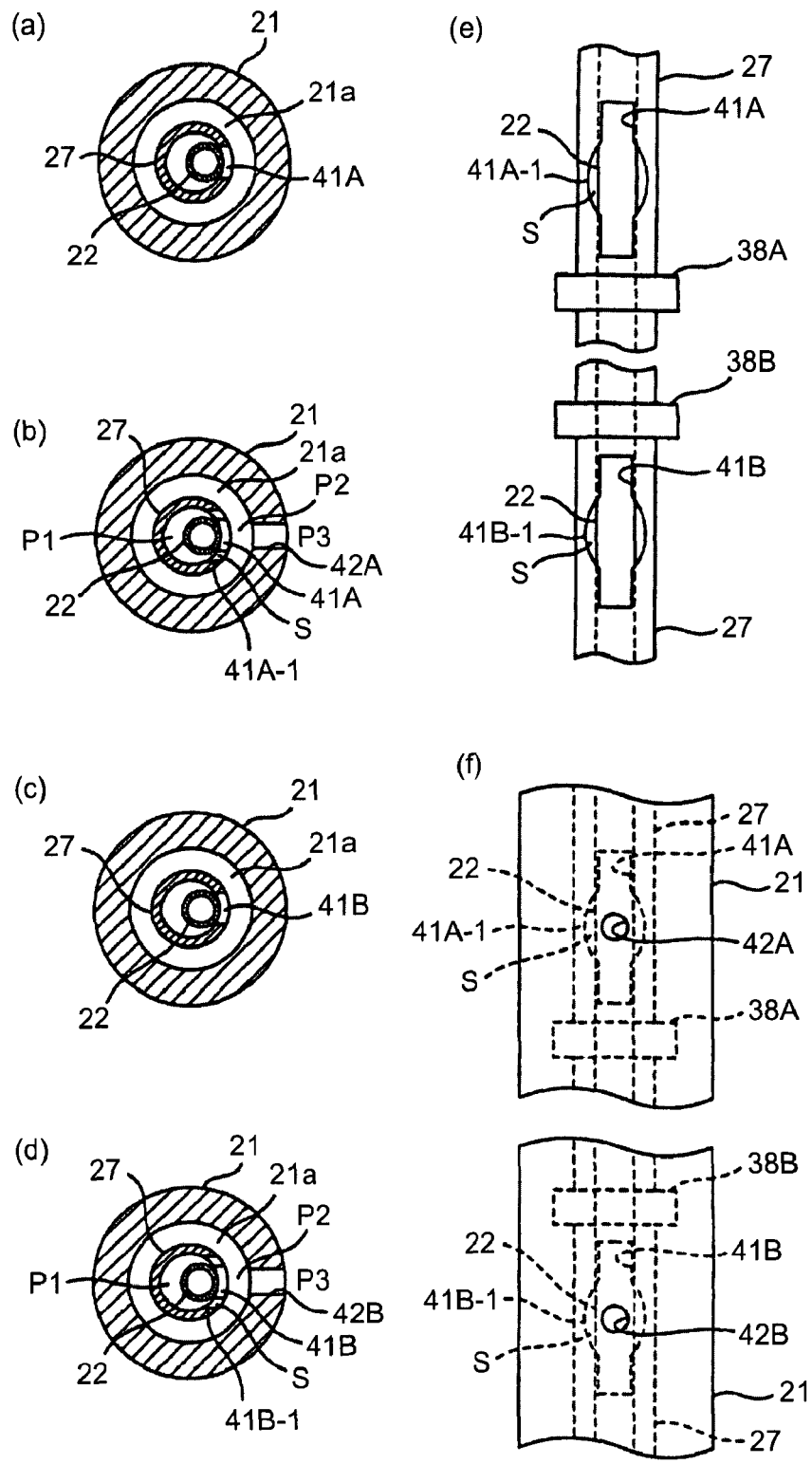
FIG. 5 is an enlarged fragmentary sectional view taken along the line B1-B1 of FIG. 4; an enlarged fragmentary sectional view taken along the line B2-B2 of FIG. 4; an enlarged fragmentary sectional view taken along the line B3-B3 of FIG. 4; an enlarged fragmentary sectional view taken along the line B4-B4 of FIG. 4; an enlarged fragmentary view taken in the direction of the arrow B5 in FIG. 4, in which a guide tube is extracted from FIG. 4; and an enlarged fragmentary view taken in the direction of the arrow B6 in FIG. 4.

As shown in FIGS. 4 and 5, in the second embodiment, an upper hole 41A and a lower hole 41B are provided at two positions, namely, the upper portion and the lower portion, of the side surface of the guide tube 27. The upper hole 41A and the lower hole 41B are both slits extending in the axis direction of the guide tube 27, and the middle portions of the slits are expanded portions 41A-1 and 41B-1 expanded in oval shapes. In other words, compared with the holes 37A and 37B of the second embodiment (see FIG. 3), the widths of the holes 41A and 41B of the second embodiment in the circumferential direction of the guide tube 27 are the same as those at the upper and lower portions, but wider in the middle portions.

Accordingly, in the first embodiment (see FIG. 3), when the thimble tube 22 is pressed against the inner circumferential surface of the guide tube 27, by the differential pressure between the coolant inside and outside the holes 37A and 37B (guide tube 27), the entire holes 37A and 37B are blocked by the thimble tube 22. Alternatively, in the second embodiment (see FIG. 5), when the thimble tube 22 is pressed against the inner circumferential surface of the guide tube 27, by the differential pressure between the coolant inside and outside the holes 41A and 41B (guide tube 27), gaps S are formed between the holes 41A and 41B and the thimble tube 22, at the expanded portions 41A-1 and 41B-1 of the holes 41A and 41B.

At two positions, namely, an upper portion and a lower portion, of the upper core support column 21, an upper pressure adjustment hole 42A and a lower pressure adjustment hole 42B are formed, respectively. The upper pressure adjustment hole 42A is provided at a position (in front of the upper hole 41A) corresponding to the upper hole 41A, and the lower pressure adjustment hole 42B is provided at a position (in front of the lower hole 41B) corresponding to the lower hole 41B.

Accordingly, as shown by the arrows Y5 in FIG. 4, the coolant (coolant in the top end 32) flowing into the guide tube 27 from the upper end of the guide tube 27 flows out to the outside from inside the guide tube 27 through the gap S between the upper hole 41A and the thimble tube 22, and also flows out to the outside from inside the upper core support column 21 through the upper pressure adjustment hole 42A. As shown by the arrows Y6 in FIG. 4, the coolant (coolant flowing out from the core 17) flowing into the guide tube 27 from the lower end of the guide tube 27 flows out to the outside from inside the guide tube 27 through the gap S between the lower hole 41B and the thimble tube 22, and also flows out to the outside from inside the upper core support column 21 through the lower pressure adjustment hole 42B.

The other components in FIGS. 4 and 5 are the same as those in the first embodiment (see FIGS. 2 and 3).

As described above, with the structure for suppressing flow vibration of an instrumentation guide tube according to the second embodiment, the upper pressure adjustment hole 42A and the lower pressure adjustment hole 42B are provided at two positions, namely, the upper portion and the lower portion, of the side surface of the upper core support column 21. The coolant flowing into the guide tube 27 from the upper end of the guide tube 27 flows out to the outside from inside the guide tube 27 through the gap S between the thimble tube 22 and the upper hole 41A, and also flows out to the outside from inside the upper core support column 21 through the upper pressure adjustment hole 42A. The coolant flowing into the guide tube 27 from the lower end of the guide tube 27 flows out to the outside from inside the guide tube 27 through the gap S between the thimble tube 22 and the lower hole 41B, and also flows out to the outside from inside the upper core support column 21 through the lower pressure adjustment hole 42B. Because a pressure P3 of the coolant outside the upper core support column 21 (in the upper plenum 25) is lower than the pressure P2 of the coolant between the guide tube 27 and the upper core support column 21, the pressure P2 of the coolant in the upper core support column 21 can further be lowered, by providing the upper pressure adjustment hole 42A and the lower pressure adjustment hole 42B at the upper core support column 21. Accordingly, the pressing force generated by the differential pressure ($\Delta P = P1 - P2$) between the coolant can be increased, thereby suppressing flow vibration of the thimble tube 22 more reliably.

The shapes of the upper hole 41A and the lower hole 41B are not limited to the shapes as shown in the diagrams, and may be any shape as long as gaps are formed between the thimble tube 22 and the holes 41A and 41B, when the thimble tube 22 is pressed against the inner circumferential surface of the guide tube 27. Accordingly, the shapes may simply be, for example, ovals or circles.

Third Embodiment

Figure 6:
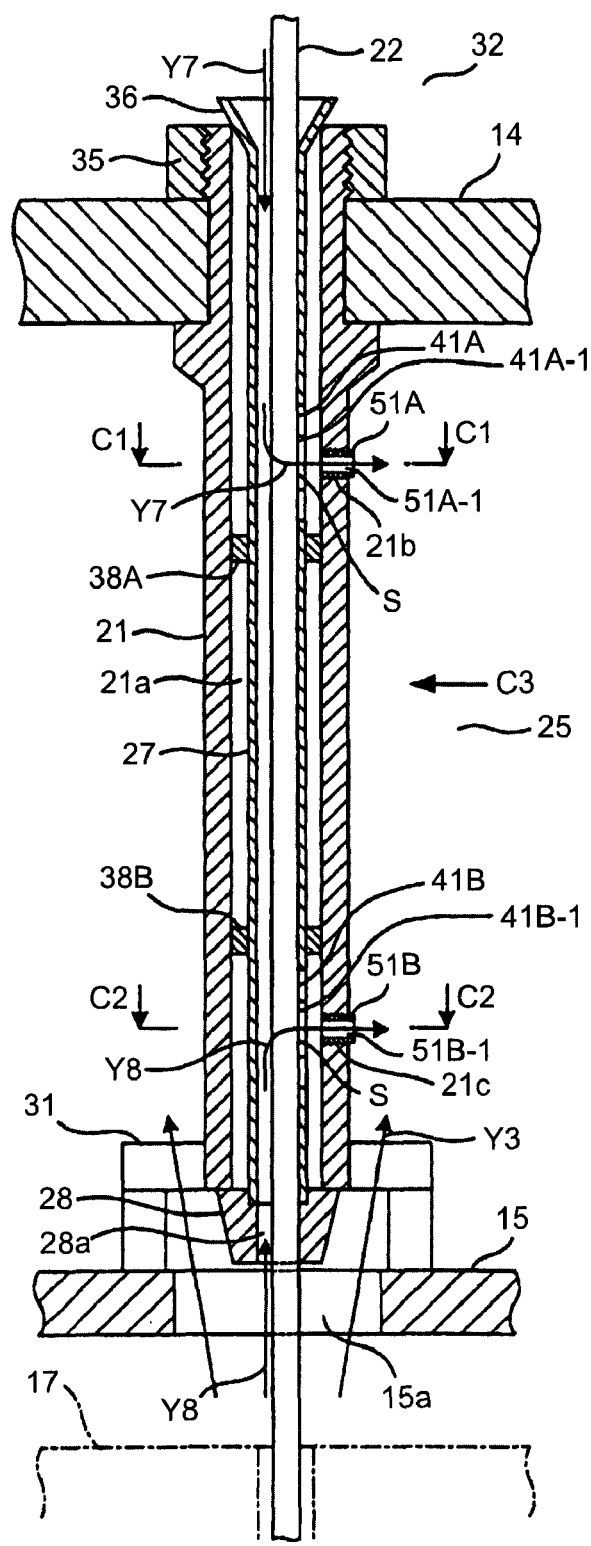
FIG. 6 is a schematic sectional view of a structure for suppressing flow vibration of an instrumentation guide tube according to a third embodiment of the present invention.

FIG. 6 is a schematic sectional view of a structure for suppressing flow vibration of an instrumentation guide tube according to a third embodiment of the present invention. FIG. 7(a) is an enlarged fragmentary sectional view taken along the line C1-C1 of FIG. 6. FIG. 7(b) is an enlarged fragmentary sectional view taken along the line C2-C2 of FIG. 6. FIG. 7(c) is an enlarged fragmentary view taken in the direction of the arrow C3 in FIG. 6.

Because the overall configuration of the reactor vessel is the same as that of the first embodiment (see FIG. 1), the illustrations and descriptions thereof will be omitted. The same reference numerals are also given to the same parts as those in the second embodiment (see FIGS. 4 and 5), for the structure for suppressing flow vibration of an instrumentation guide tube shown in FIGS. 6 and 7, and their repeated detailed descriptions will be omitted.

Figure 7:
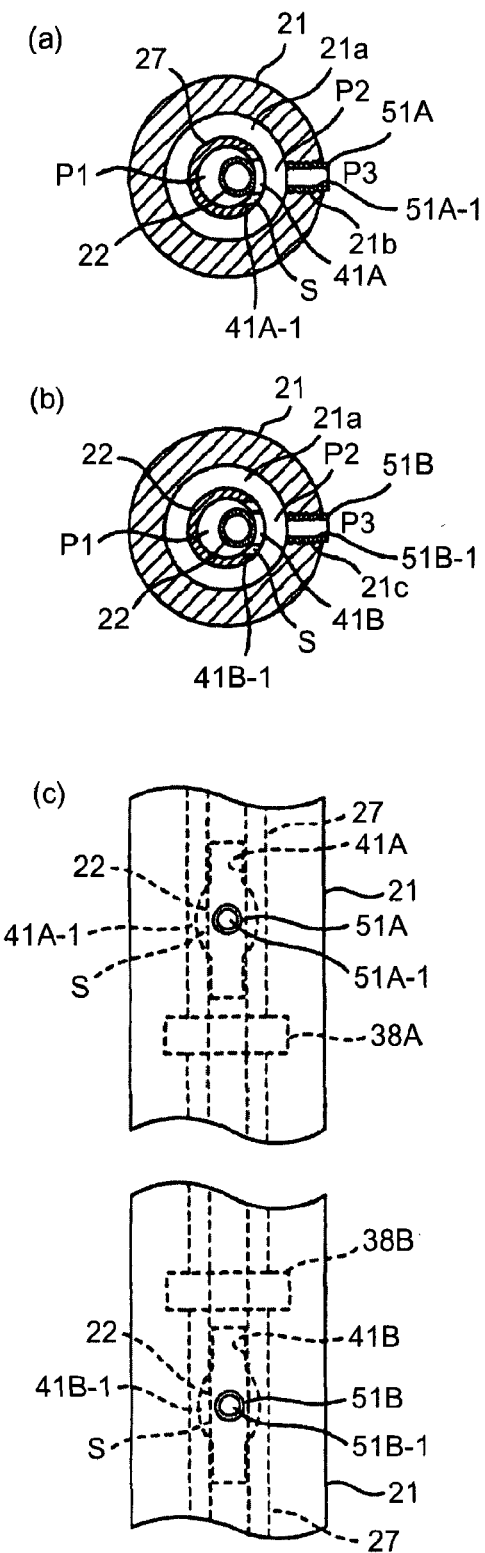
FIG. 7 is an enlarged fragmentary sectional view taken along the line C1-C1 of FIG. 6; an enlarged fragmentary sectional view taken along the line C2-C2 of FIG. 6; and an enlarged fragmentary view taken in the direction of the arrow C3 in FIG. 6.

As shown in FIGS. 6 and 7, in the third embodiment, an upper plug 51A and a lower plug 51B are detachably provided at two positions, namely, the upper portion and the lower portion, of the side surface of the guide tube 27. A hole 51A-1 for the upper plug 51A is an upper pressure adjustment hole, and a hole 51B-1 for the lower plug 51B is a lower pressure adjustment hole. The upper pressure adjustment hole 51A-1 is provided at a position corresponding to the upper hole 41A, and the lower pressure adjustment hole 51B-1 is provided at a position corresponding to the lower hole 41B. Screws are formed at the outer circumferential surfaces of the plugs 51A and 51B, and screwed into screw holes 21b and 21c formed at the side surface of the upper core support column 21. A plurality of plugs 51A and 51B with different hole diameters are prepared, and the plugs 51A and 51B with desired hole diameters may be arbitrarily selected and fixed to the side surface of the upper core support column 21.

The flows of the coolant are the same as those in the second embodiment, and as shown by the arrows Y7 in FIG. 6, the coolant (coolant in the top end 32) flowing into the guide tube 27 from the upper end of the guide tube 27 flows out to the outside from inside the guide tube 27 through the gap S between the upper hole 41A and the thimble tube 22, and also flows out to the outside from inside the upper core support column 21 through the upper pressure adjustment hole 51A-1 of the upper plug 51A. As shown by the arrows Y8 in FIG. 6, the coolant (coolant flowing out from the core 17) flowing into the guide tube 27 from the lower end of the guide tube 27 flows out to the outside from inside the guide tube 27 through the gap S between the lower hole 41B and the thimble tube 22, and also flows out to the outside from inside the upper core support column 21 through the lower pressure adjustment hole 51B-1 of the lower plug 51B.

The other components in FIGS. 6 and 7 are the same as those in the second embodiment (see FIGS. 4 and 5).

As described above, with the structure for suppressing flow vibration of an instrumentation guide tube according to the third embodiment, similar to the second embodiment, the pressure P2 of the coolant in the upper core support column 21 can further be lowered, by providing the plugs 51A and 51B (pressure adjustment holes 51A-1 and 51B-1). Accordingly, the pressing force generated by the differential pressure between the coolant can be increased, thereby suppressing flow vibration of the thimble tube 22 more reliably.

With the structure for suppressing flow vibration of an instrumentation guide tube according to the third embodiment, any of the plugs 51A and 51B may be selected from the plugs 51A and 51B with different hole sizes, and fixed to the side surface of the upper core support column 21. Accordingly, the pressure of the coolant in the upper core support column 21 (between the guide tube 27 and the upper core support column 21) can be arbitrarily adjusted, by adjusting the sizes of the upper pressure adjustment hole 51A-1 and the lower pressure adjustment hole 51B-1 at will. Consequently, the pressing force generated by the differential pressure between the coolant can be arbitrarily adjusted, and the flow amount of the coolant into the guide tube 27 from the top end 32, and the flow amount of the coolant flowing out from the core 17 into the guide tube 27 can be adjusted at will.

Fourth Embodiment

FIG. 8(a) is a schematic sectional view of a structure for suppressing flow vibration of an instrumentation guide tube according to a fourth embodiment of the present invention. FIG. 8(b) is an enlarged fragmentary sectional view taken along the line D1-D1 of FIG. 8(a). FIG. 8(c) is an enlarged fragmentary view taken in the direction of the arrow D2 in FIG. 8(a), in which a guide tube is extracted from FIG. 8(a).

Because the overall configuration of the reactor vessel is the same as that of the first embodiment (see FIG. 1), the illustrations and descriptions thereof will be omitted. The same reference numerals are also given to the same parts as those in the second embodiment (see FIGS. 4 and 5), for the structure for suppressing flow vibration of an instrumentation guide tube shown in FIG. 8, and their repeated detailed descriptions will be omitted.

Figure 8:
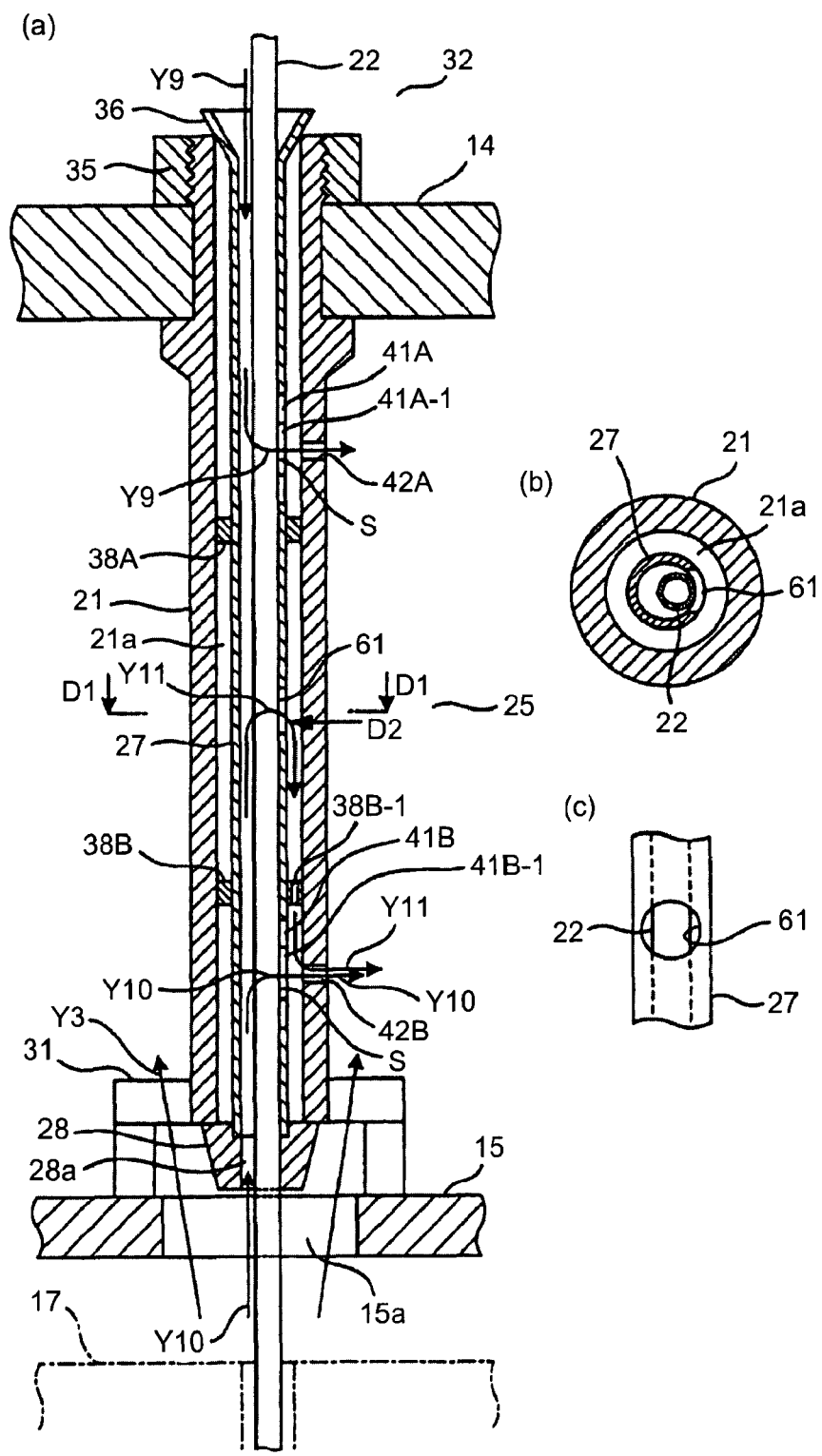
FIG. 8 is a schematic sectional view of a structure for suppressing flow vibration of an instrumentation guide tube according to a fourth embodiment of the present invention; an enlarged fragmentary sectional view taken along the line D1-D1; and an enlarged fragmentary view taken in the direction of the arrow D2, in which a guide tube is extracted therefrom.

As shown in FIG. 8, in the fourth embodiment, a pressure introduction hole 61 is formed at the side surface of the guide tube 22. The pressure introduction hole 61 is placed between the upper hole 41A and the lower hole 41B. In other words, the pressure introduction hole 61 is placed at the position above the lower hole 41a.

Accordingly, similar to the second embodiment, as shown by the arrows Y9 in FIG. 8, the coolant (coolant in the top end 32) flowing into the guide tube 27 from the upper end of the guide tube 27 flows out to the outside from inside the guide tube 27 through the gap S between the upper hole 41A and the thimble tube 22, and also flows out to the outside from inside the upper core support column 21 through the upper pressure adjustment hole 42A. As shown by the arrows Y10 in FIG. 8, the coolant (coolant flowing out from the core 17) flowing into the guide tube 27 from the lower end of the guide tube 27 flows out to the outside from inside the guide tube 27 through the gap S between the lower hole 41B and the thimble tube 22, and also flows out to the outside from inside the upper core support column 21 through the lower pressure adjustment hole 42B.

As shown by the arrows 11 in FIG. 8, a part of the coolant flowing into the guide tube 27 from the lower end of the guide tube 27 flows out to the outside from inside the guide tube 27 through the pressure introduction hole 61, and also flows out to the outside from inside the upper core support column 21 through the lower pressure adjustment hole 42B, after flowing downward through a flow hole 38B-1 of the lower positioner 38B.

The other components in FIG. 8 are the same as those in the second embodiment (see FIGS. 4 and 5).

As described above, with the structure for suppressing flow vibration of an instrumentation guide tube according to the fourth embodiment, the pressure introduction hole 61 is provided at the side surface of the guide tube 27 at the position above the lower hole 41B. A part of the coolant flowing into the guide tube 27 from the lower end of the guide tube 27 flows out to the outside from inside the guide tube 27 through the pressure introduction hole 61, and also flows out to the outside from inside the upper core support column 21 through the lower pressure adjustment hole 42B. Accordingly, the pressure of the coolant (coolant flowing out from the core) flowing into the guide tube 27 from the lower end of the guide tube 27 is introduced to the position of the pressure introduction hole 61. As a result, the pressure of the coolant in the guide tube 27 at the position of the lower hole 42 can be increased. Accordingly, the pressing force generated by the differential pressure between the coolant can be increased, thereby suppressing flow vibration of the thimble tube 22 more reliably.

Fifth Embodiment

FIG. 9(a) is a schematic sectional view of a structure for suppressing flow vibration of an instrumentation guide tube according to a fifth embodiment of the present invention. FIG. 9(b) is an enlarged fragmentary sectional view taken along the line E1-E1 of FIG. 9(a). FIG. 9(c) is an enlarged fragmentary sectional view taken along the line E2-E2 of FIG. 9(a). FIG. 9(d) is an enlarged fragmentary view taken in the direction of the arrow E3 in FIG. 9(a), in which a guide tube is extracted from FIG. 9(a).

Because the overall configuration of the reactor vessel is the same as that of the first embodiment (see FIG. 1), the illustrations and descriptions thereof will be omitted. The same reference numerals are also given to the same parts as those in the second embodiment (see FIGS. 4 and 5), for the structure for suppressing flow vibration of an instrumentation guide tube shown in FIG. 9, and their repeated detailed descriptions will be omitted.

Figure 9:
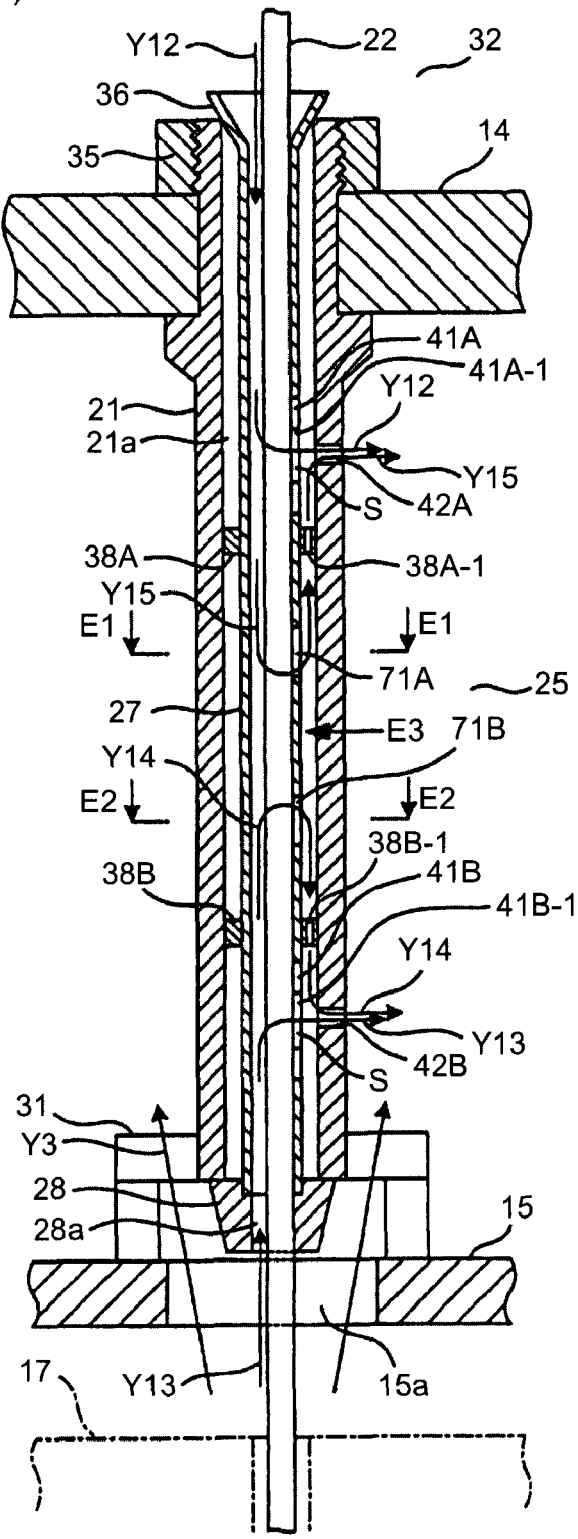
FIG. 9 is a schematic sectional view of a structure for suppressing flow vibration of an instrumentation guide tube according to a fifth embodiment of the present invention; an enlarged fragmentary sectional view taken along the line E1-E1; an enlarged fragmentary sectional view taken along the line E2-E2; and an enlarged fragmentary view taken in the direction of the arrow E3, in which a guide tube is extracted therefrom.
Figure 9:
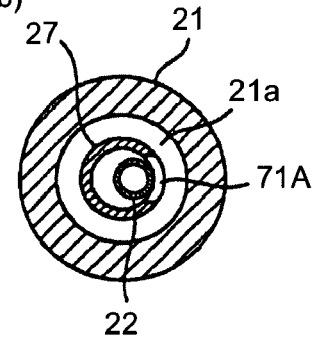
Figure 9:
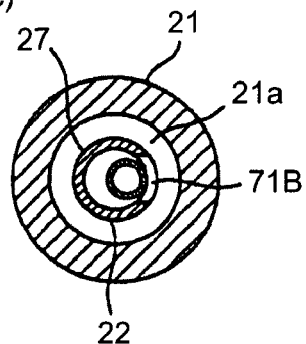
Figure 9:
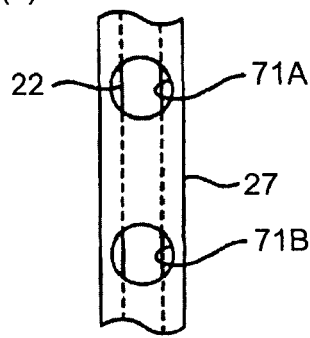

As shown in FIG. 9, in the fifth embodiment, a first pressure introduction hole 71A of the upper side and a second pressure introduction hole 71B of the lower side are formed at the side surface of the guide tube 22. The pressure introduction holes 71A and 71B are positioned between the upper hole 41A and the lower hole 41B.

Accordingly, similar to the third embodiment, as shown by the arrows Y12 in FIG. 9, the coolant (coolant in the top end 32) flowing into the guide tube 27 from the upper end of the guide tube 27 flows out to the outside from inside the guide tube 27 through the gap S between the upper hole 41A and the thimble tube 22, and also flows out to the outside from inside the upper core support column 21 through the upper pressure adjustment hole 42A. As shown by the arrows Y13 in FIG. 9, the coolant (coolant flowing out from the core 17) flowing into the guide tube 27 from the lower end of the guide tube 27 flows out to the outside from inside the guide tube 27 through the gap S between the lower hole 41B and the thimble tube 22, and also flows out to the outside from inside the upper core support column 21 through the lower pressure adjustment hole 42B.

As shown by the arrows Y14 in FIG. 9, a part of the coolant flowing into the guide tube 27 from the lower end of the guide tube 27 flows out to the outside from inside the guide tube 27 through the second pressure introduction hole 71B, and also flows out to the outside from inside the upper core support column 21 through the lower pressure adjustment hole 42B, after flowing downward through the flow hole 38B-1 of the lower positioner 38B. As shown by the arrows Y15 in FIG. 9, a part of the coolant flowing into the guide tube 27 from the upper end of the guide tube 27 flows out to the outside from inside the guide tube 27 through the first pressure introduction hole 71A, and also flows out to the outside from inside the upper core support column 21 through the lower pressure adjustment hole 42B, after flowing upward through a flow hole 38A-1 of the upper positioner 38A.

The other components in FIG. 9 are the same as those in the second embodiment (see FIGS. 4 and 5).

As described above, with the structure for suppressing flow vibration of an instrumentation guide tube according to the fifth embodiment, the first pressure introduction hole 71A of the upper side and the second pressure introduction hole 71B of the lower side are provided at the side surface of the guide tube 27, at positions between the upper hole 41A and the lower hole 41B. Accordingly, a part of the coolant flowing into the guide tube 27 from the upper end of the guide tube 27 flows out to the outside from inside the guide tube 27 through the first pressure introduction hole 71A, and also flows out to the outside from inside the upper core support column 21 through the upper pressure adjustment hole 42A. A part of the coolant flowing into the guide tube 27 from the lower end of the guide tube 27 flows out to the outside from inside the guide tube 27 through the second pressure introduction hole 71B, and also flows out to the outside from inside the upper core support column 21 through the lower pressure adjustment hole 42B. Consequently, the pressure of the coolant (coolant in the top end 32) that flows into the guide tube 27 from the upper end of the guide tube 27 is introduced to the position of the first pressure introduction hole 71A, and the pressure of the coolant (coolant flowing out from the core 17) that flows into the guide tube 27 from the lower end of the guide tube 27 is introduced to the position of the second pressure introduction hole 71B. As a result, the pressure of the coolant in the guide tube 27 at the positions of the upper hole 41A and the lower hole 41B can be increased. Accordingly, the pressing force generated by the differential pressure between the coolant can be increased, thereby suppressing flow vibration of the thimble tube 22 more reliably.

The coolant at a low temperature (coolant in the top end 32) flowing into the guide tube 27 from the upper end of the guide tube 27, and the coolant at a high temperature (coolant flowing out from the core 17) flowing into the guide tube 27 from the lower end of the guide tube 27 flow out from the first pressure introduction hole 71A and the second pressure introduction hole 71B, separately. Accordingly, it is possible to suppress the generation of thermal stress, due to interface migration of the low-temperature coolant and the high-temperature coolant.

Sixth Embodiment

FIG. 10(a) is a schematic sectional view of a structure for suppressing flow vibration of an instrumentation guide tube according to a sixth embodiment of the present invention. FIG. 10(b) is an enlarged sectional view of a portion F in FIG. 10(a).

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 10, and their repeated detailed descriptions will be omitted.

Figure 10:
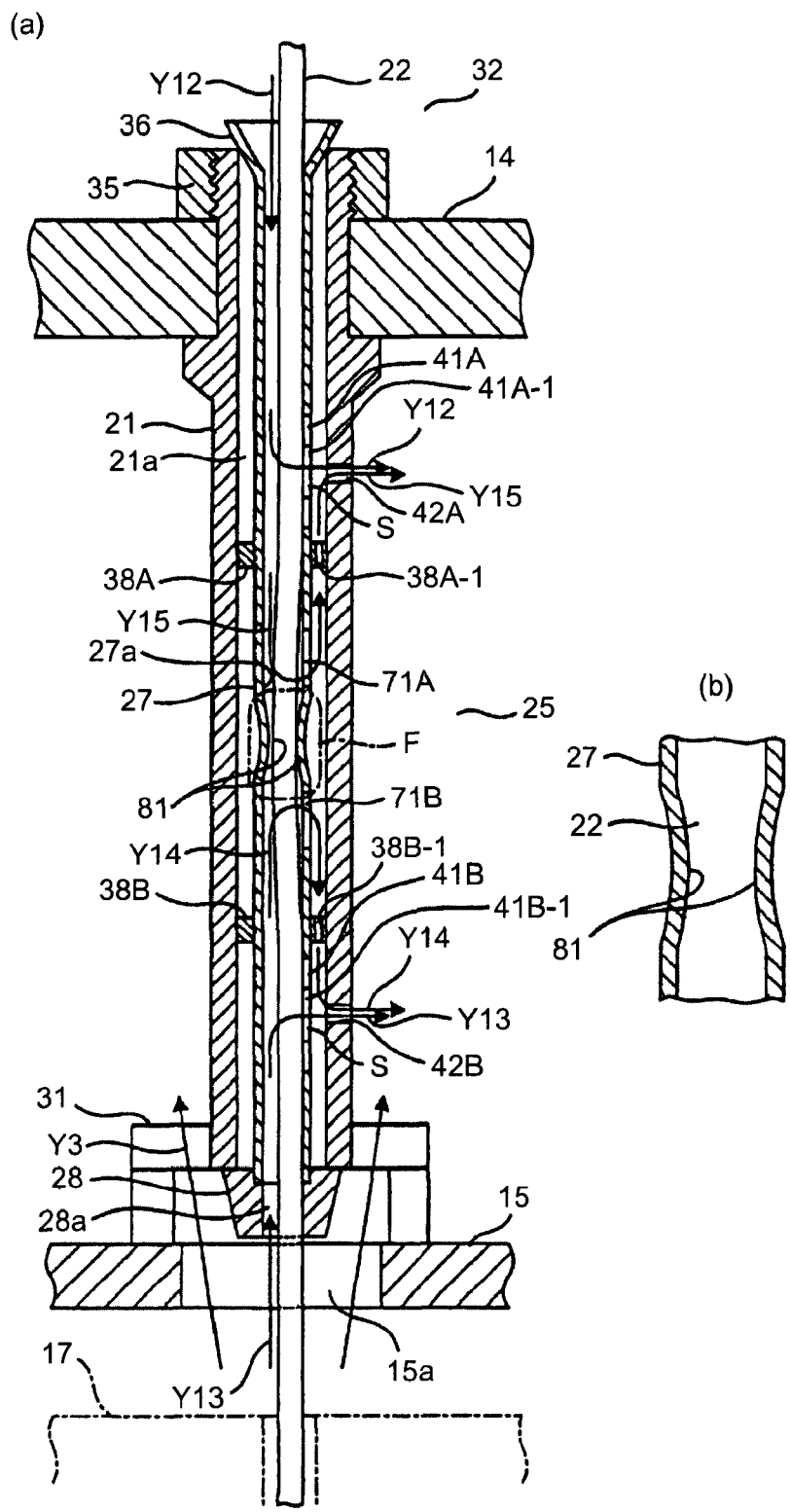
FIG. 10 is a schematic sectional view of a structure for suppressing flow vibration of an instrumentation guide tube according to a sixth embodiment of the present invention; and an enlarged sectional view of a portion F.

As shown in FIG. 10, in the sixth embodiment, a restricting unit 81 is provided at an inner circumferential surface 27a of the guide tube 27, at the position between the first pressure introduction hole 71A and the second pressure introduction hole 71B. In the diagram, the restricting unit 81 is formed by bending a part of the guide tube 27 towards inside.

The other components in FIG. 10 are the same as those in the fifth embodiment (see FIG. 9).

As described above, with the structure for suppressing flow vibration of an instrumentation guide tube according to the sixth embodiment, the restricting unit 81 is provided at the inner circumferential surface of the guide tube 27, at the position between the first pressure introduction hole 71A and the second pressure introduction hole 71B. Accordingly, by using the restricting unit 81, it is possible to more reliably prevent the low-temperature coolant (coolant in the top end 32) that flows into the guide tube 27 from the upper end of the guide tube 27 and the high-temperature coolant (coolant flowing out from the core 17) that flows into the guide tube 27 from the lower end of the guide tube 27, from being mixed. As a result, it is possible to more reliably suppress the generation of thermal stress, due to interface migration of the low-temperature coolant and the high-temperature coolant.

Seventh Embodiment

FIG. 11(a) is a schematic sectional view of a structure for suppressing flow vibration of an instrumentation guide tube according to a seventh embodiment of the present invention. FIG. 11(b) is a fragmentary view taken in the direction of the arrow G in FIG. 11(a).

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 11, and their repeated detailed descriptions will be omitted.

Figure 11:
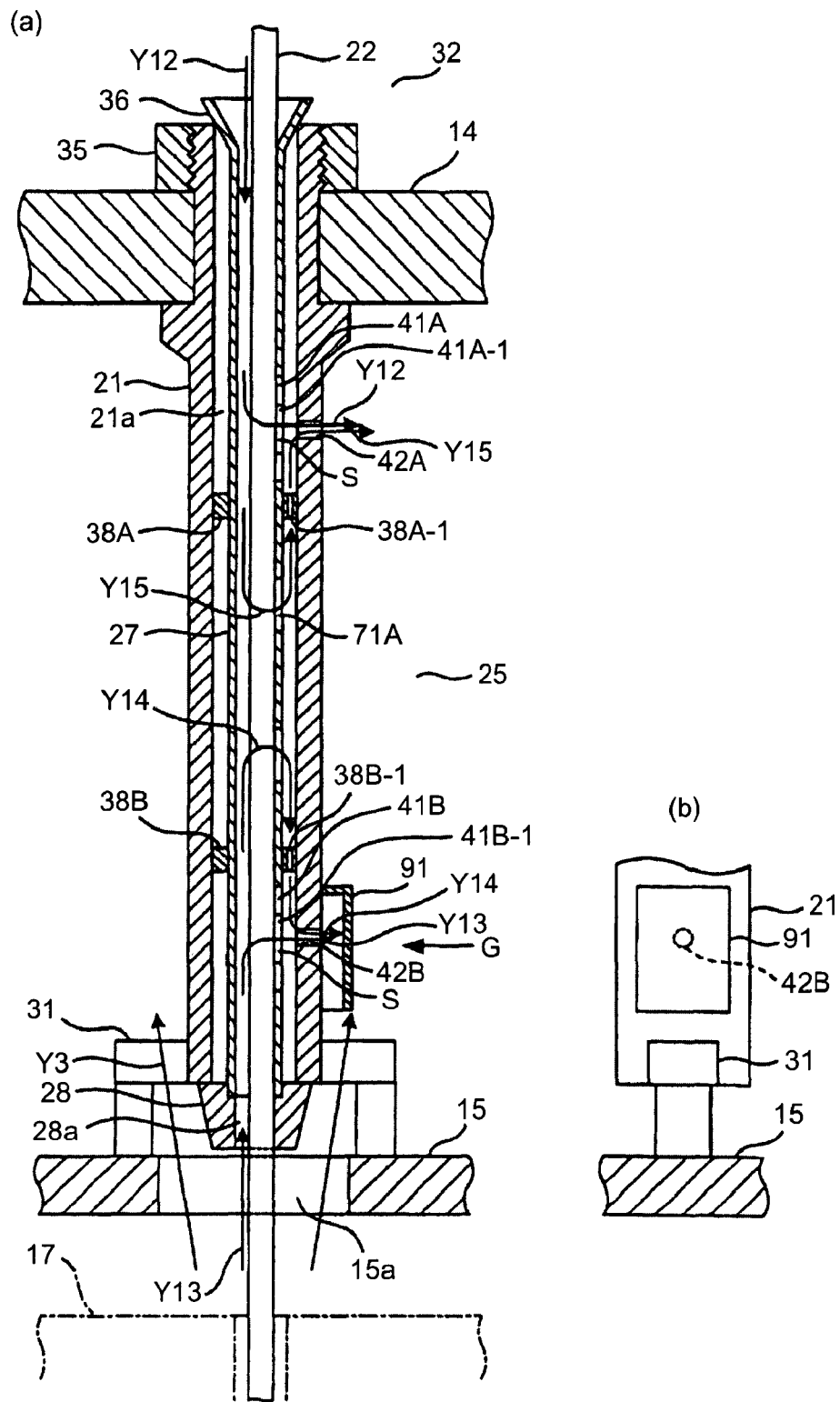
FIG. 11 is a schematic sectional view of a structure for suppressing flow vibration of an instrumentation guide tube according to a seventh embodiment of the present invention; and a fragmentary view taken in the direction of the arrow G.

As shown in FIG. 11, in the seventh embodiment, a cover 91 is provided at the side surface of the upper core support column 21. The cover 91 is fixed at the lower portion of the outer circumferential surface of the upper core support column 21 so as to cover the lower pressure adjustment hole 42B, and the lower end is opened. Accordingly, the coolant flowing out from the lower pressure adjustment hole 42B flows into the upper plenum 25 from the lower end of the cover 91, after being guided downwards near the leg unit 31 by the cover 91.

The other components in FIG. 11 are the same as those in the fifth embodiment (see FIG. 9).

As described above, with the structure for suppressing flow vibration of an instrumentation guide tube according to the seventh embodiment, the cover 91 that guides the coolant flowing out from the lower pressure adjustment hole 42B downwards is provided at the side surface of the upper core support column 21. Accordingly, even if pressure outside the upper core support column 21 at a set position of the lower pressure adjustment hole 42B is increased, due to the influence of a side flow of the coolant from the adjacent upper core support column 21 (see FIG. 1), the coolant flowing out from the lower pressure adjustment hole 42B can be guided downwards where pressure is low, by the cover 91. Consequently, it is possible to obtain the pressing force generated by the differential pressure between the coolant, thereby reliably suppressing flow vibration of the thimble tube 22.

Eighth Embodiment

Figure 12:
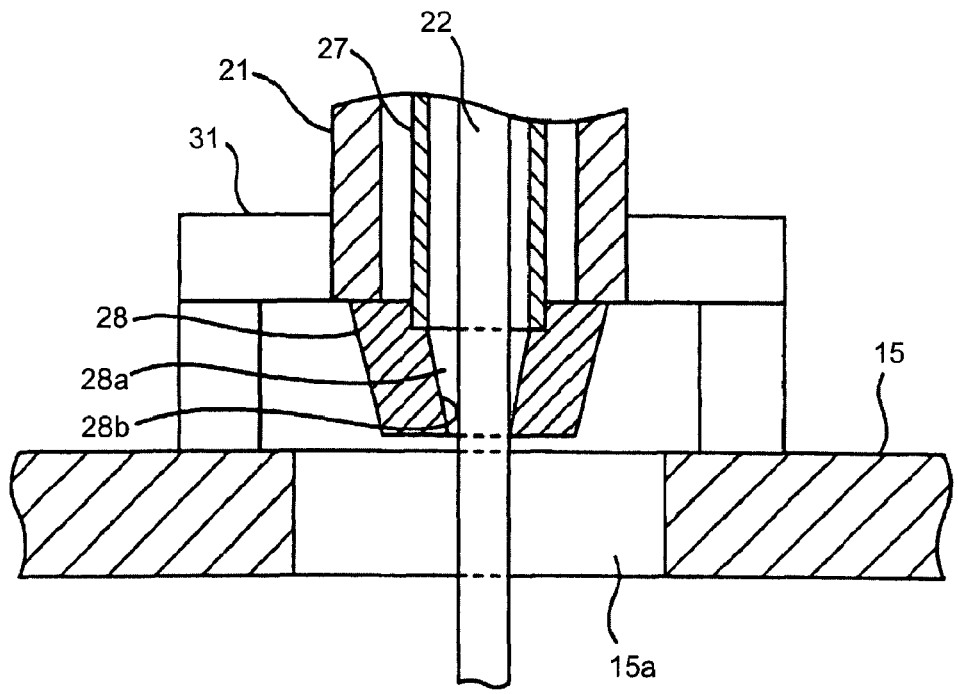
FIG. 12 is a schematic sectional view of a principal portion of a structure for suppressing flow vibration of an instrumentation guide tube according to an eighth embodiment of the present invention.

FIG. 12 is a schematic sectional view of a principal portion of a structure for suppressing flow vibration of an instrumentation guide tube according to an eighth embodiment of the present invention.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 12, and their repeated detailed descriptions will be omitted.

In the fifth embodiment (see FIG. 9) and the like, the inner circumferential surface (insertion hole 28a) of the head nozzle 28 has a cylinder shape (constant width). Alternatively, in the eighth embodiment, as shown in FIG. 12, an inner circumferential surface 28b (insertion hole 28a) of the head nozzle 28 has a shape of an inverted truncated cone whose width is reduced toward the bottom.

The other components in FIG. 12 are the same as those in the fifth embodiment (see FIG. 9).

As described above, with the structure for suppressing flow vibration of an instrumentation guide tube according to the eighth embodiment, the inner circumferential surface 28b of the head nozzle 28 through which the thimble tube 22 is inserted has a shape of an inverted truncated cone. Accordingly, the thimble tube 22 can be further smoothly inserted into the core 17, by using the head nozzle 28. At the lower end of the head nozzle 28, the gap between the inner circumferential surface 28b of the head nozzle 28 and the thimble tube 22 becomes small. Consequently, it is possible to prevent the turbulence of the coolant from flowing into the head nozzle 28. The turbulence of the coolant is generated because the coolant is disturbed at the lower end of the head nozzle 28. Because the turbulence of the coolant causes the flow vibration (excitation force) of the thimble tube 22, the flow vibration of the thimble tube 22 can be suppressed by preventing the turbulence of the coolant from flowing into the head nozzle 28.

Ninth Embodiment

Figure 13:
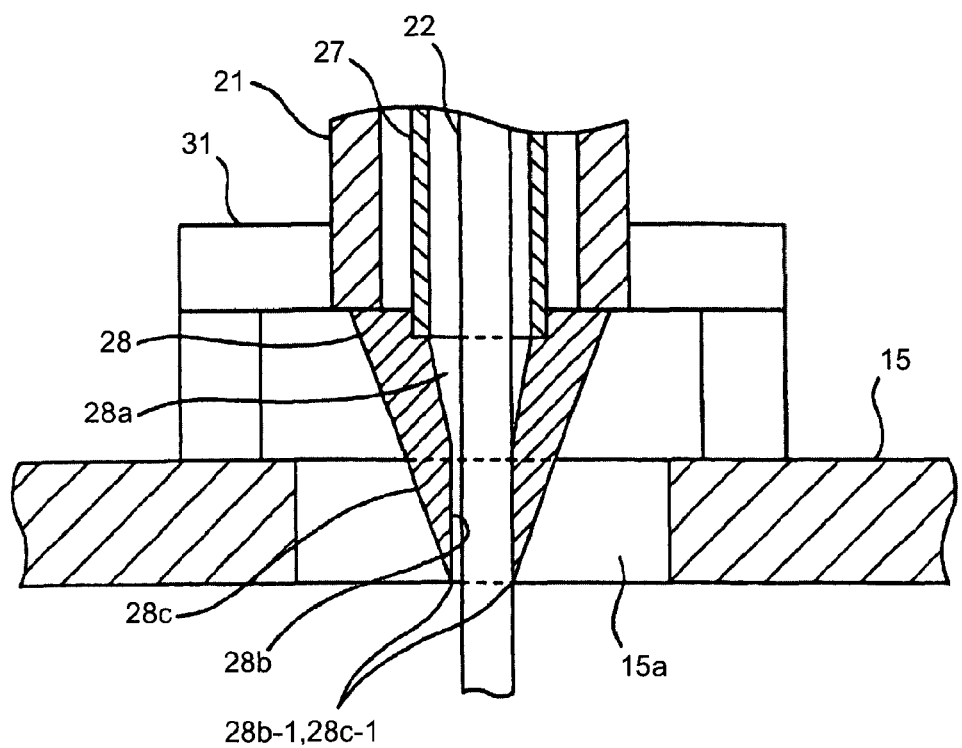
FIG. 13 is a schematic sectional view of a principal portion of a structure for suppressing flow vibration of an instrumentation guide tube according to a ninth embodiment of the present invention.

FIG. 13 is a schematic sectional view of a principal portion of a structure for suppressing flow vibration of an instrumentation guide tube according to a ninth embodiment of the present invention.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 13, and their repeated detailed descriptions will be omitted.

In the head nozzle 28 of the fifth embodiment (see FIG. 9) and the like, the outer circumferential surface has a shape of an inverted truncated cone whose width is reduced toward the bottom. However, the lower end of the outer circumferential surface and the lower end of the inner circumferential surface do not communicate with each other, thereby including a lower end surface (horizontal surface) between the lower end of the outer circumferential surface and the lower end of the inner circumferential surface. Alternatively, as shown in FIG. 13, in the head nozzle 28 of the ninth embodiment, an outer circumferential surface 28c has a shape of an inverted truncated cone whose width is reduced toward the bottom and also a lower end 28c-1 of the outer circumferential surface 28c and a lower end 28b-1 of the inner circumferential surface 28b communicate with each other. In other words, the exterior of the head nozzle 28 of the ninth embodiment is a streamline.

The upper portion of the inner circumferential surface 28b of the head nozzle 28 in the diagram has an inverted truncated cone shape similar to the head nozzle 28 of the eighth embodiment, and the lower portion thereof is a cylinder having the same diameter as that of the lower end of the upper portion (the inverted truncated cone shape). However, it is not limited thereto, and the inner circumferential surface 28b of the head nozzle 28 may have, for example, a shape of an inverted truncated cone as a whole or may be a cylinder as a whole.

The other components in FIG. 13 are the same as those in the fifth embodiment (see FIG. 9).

As described above, with the structure for suppressing flow vibration of an instrumentation guide tube according to the ninth embodiment, in the head nozzle 28 through which the thimble tube 22 is inserted, the outer circumferential surface 28c has a shape of an inverted truncated cone, and the exterior thereof is a streamline, because the lower end 28c-1 of the outer circumferential surface 28c and the lower end 28b-1 of the inner circumferential surface 28b communicate with each other. Accordingly, the coolant is hardly disturbed at the lower end of the head nozzle 28. Consequently, it is possible to suppress the generation of the flow vibration of the thimble tube 22, because the turbulence (excitation force) of the coolant that causes the flow vibration of the thimble tube 22, is hardly generated.

Tenth Embodiment

FIG. 14(a) is a schematic sectional view of a principal portion of a structure for suppressing flow vibration of an instrumentation guide tube according to a tenth embodiment of the present invention. FIG. 14(b) is a fragmentary view taken in the direction of the arrow H, in which a head nozzle extracted from FIG. 14(a). FIG. 15 is a schematic sectional view of another head nozzle.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 14, and their repeated detailed descriptions will be omitted.

Figure 14:
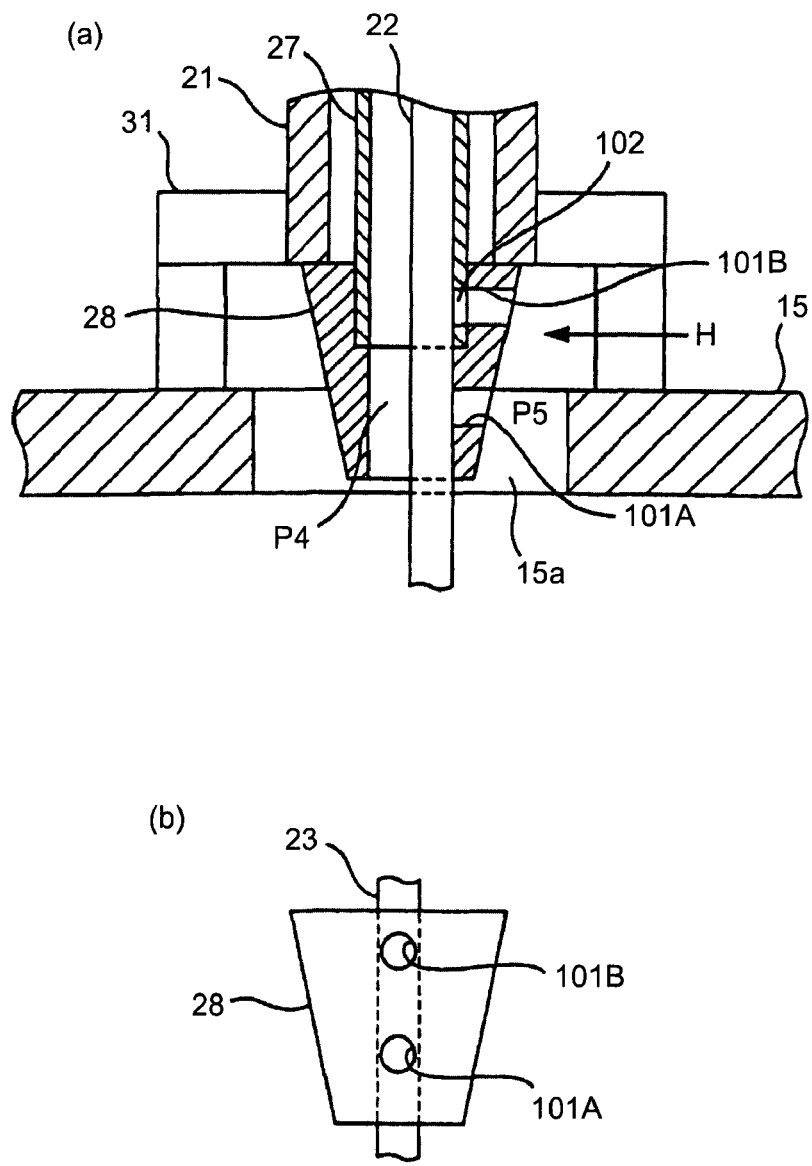
FIG. 14 is a schematic sectional view of a principal portion of a structure for suppressing flow vibration of an instrumentation guide tube according to a tenth embodiment of the present invention; and a fragmentary view taken in the direction of the arrow H, in which a head nozzle is extracted therefrom.
Figure 15:
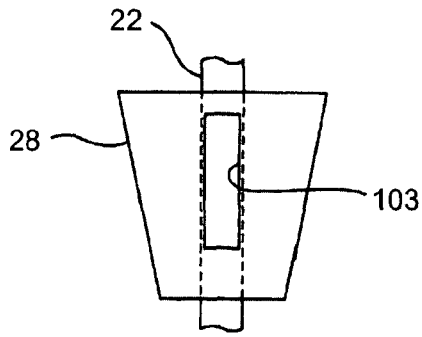
FIG. 15 is a schematic sectional view of another head nozzle.

As shown in FIG. 14, the head nozzle 28 of the tenth embodiment has an inverted truncated cone shape similar to that of the head nozzle 28 of the second embodiment (see FIG. 4) and the like, and extended to the opening portion 15a of the upper core plate 15. A first hole 101A of a lower side and a second hole 101B of an upper side are formed at the side surface of the head nozzle 28. Because the lower end of the guide tube 27 is present in the head nozzle 28, at the position where the second hole 101B is formed, a hole 102 is also formed at the side surface of the lower end of the guide tube 27. The holes 101A, 101B, and 102 are formed in circles.

Because the first hole 101A and the second hole 102B are provided at the side surface of the head nozzle 28, the thimble tube 22 is pressed against the inner circumferential surface of the guide tube 27, due to the differential pressure between a pressure P4 of the coolant inside (in other words, inside of the head nozzle 28) the first hole 101A and the second hole 101B, and a pressure P5 of the coolant outside (in other words, outside the head nozzle 28).

The other components in FIG. 14 are the same as those in the fifth embodiment (see FIG. 9).

As described above, with the structure for suppressing flow vibration of an instrumentation guide tube according to the tenth embodiment, the holes 101A and 101B are provided at the side surface of the head nozzle 28, and the thimble tube 22 is pressed against the inner circumferential surface of the head nozzle 28, by the differential pressure between the coolant inside and outside the holes 101A and 101B. Accordingly, the flow vibration of the thimble tube 22 can be suppressed by the pressing force generated by the differential pressure between the coolant inside and outside the holes 101A and 101B.

In the diagram, the first hole 101A and the second hole 101B are blocked by the guide tube 27 pressed against the inner circumferential surface of the head nozzle 28. However, it is not limited thereto, and the coolant may flow out to the outside from inside the head nozzle 28 through the gaps between the thimble tube 22 and the first hole 101A and the second hole 101B.

In the diagram, two of the first hole 101A and the second hole 101B are provided at the head nozzle 28. However, it is not limited thereto, and for example, only the first hole 101A may be provided. The first hole 101A and the second hole 101B in the diagram are circles, but these are not limited thereto, and for example, as shown in FIG. 15, a hole 103 in a slit may be provided at the head nozzle 28.

Eleventh Embodiment

FIG. 16(a) is a schematic sectional view of a principal portion of a structure for suppressing flow vibration of an instrumentation guide tube according to an eleventh embodiment of the present invention. FIG. 16(b) is a fragmentary sectional view taken along the line I-I in FIG. 16(a).

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 16, and their repeated detailed descriptions will be omitted.

Figure 16:
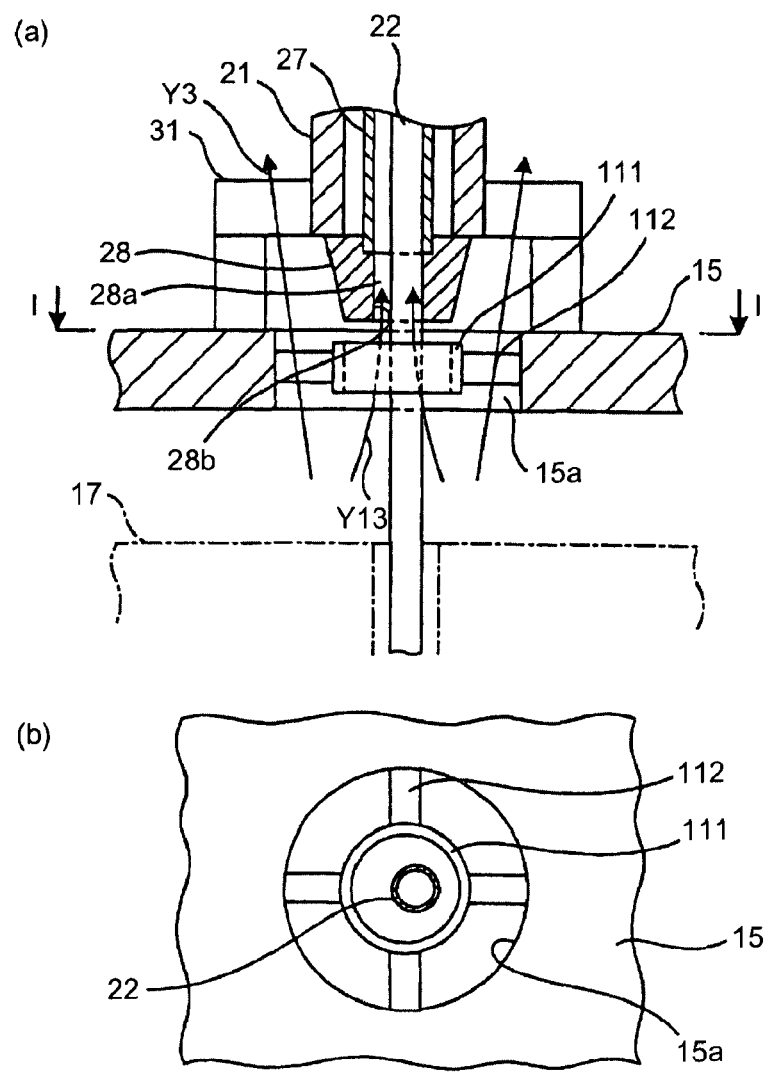
FIG. 16 is a schematic sectional view of a principal portion of a structure for suppressing flow vibration of an instrumentation guide tube according to an eleventh embodiment of the present invention; and a fragmentary sectional view taken along the line I-I.

As shown in FIG. 16, in the eleventh embodiment, a rectifying plate 111 is provided at the lower end 15a of the upper core plate 15. The rectifying plate 111 is a circular ring, and positioned below the head nozzle 28. The rectifying plate 111 is supported by the upper core plate 15 by using a plurality of support members 112 connected to the outer circumferential surface. A part of the coolant that flows out from the core 17 and flows through the opening portion 15 of the upper core plate 15 flows upwards as shown by the arrows Y13, while being rectified by the rectifying plate 111. Accordingly, the coolant flows into the insertion hole 28a of the head nozzle 28 straight upwards.

The other components of FIG. 16 are the same as those in the fifth embodiment (see FIG. 9).

As described above, with the structure for suppressing flow vibration of an instrumentation guide tube according to the eleventh embodiment, the rectifying plate 111 is provided at the opening portion 15a of the upper core plate 15. Because a part of the coolant that flows through the opening portion 15a of the upper core plate 15 is rectified by the rectifying plate 111, the part of coolant water flows upwards towards the head nozzle 28. Accordingly, the side flow of the coolant can be prevented from being disturbed, at the lower end of the head nozzle 28. Because the turbulence (excitation force) of the coolant that causes the flow vibration of the thimble tube 22 is hardly generated, it is possible to suppress the generation of the flow vibration of the thimble tube 22.

Twelfth Embodiment

FIG. 17(a) is a schematic sectional view of a principal portion of a structure for suppressing flow vibration of an instrumentation guide tube according to a twelfth embodiment of the present invention. FIG. 17(b) is an enlarged fragmentary sectional view taken along the line J1-J1 of FIG. 17(a). FIG. 17(c) is an enlarged fragmentary view taken in the direction of the arrow J2 in FIG. 17(a), in which an extension tube is extracted from FIG. 17(a).

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 17, and their repeated detailed descriptions will be omitted.

Figure 17:
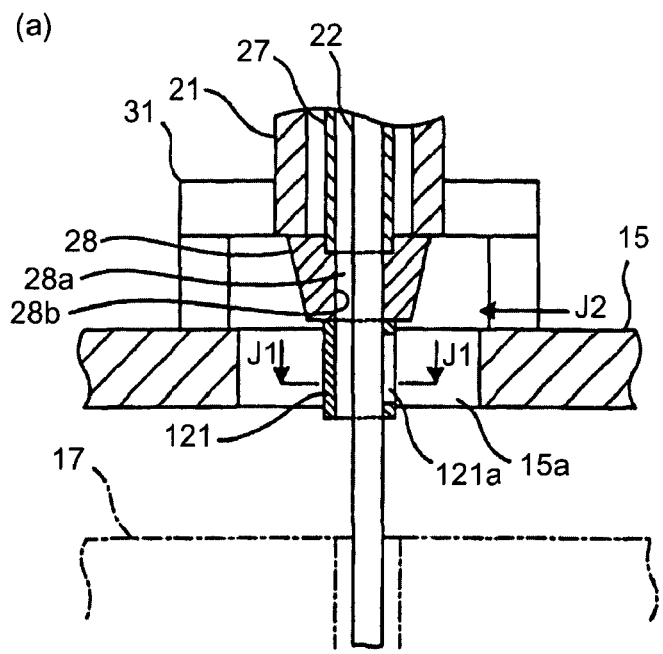
FIG. 17 is a schematic sectional view of a principal portion of a structure for suppressing flow vibration of an instrumentation guide tube according to a twelfth embodiment of the present invention; an enlarged fragmentary sectional view taken along the line J1-J1; and an enlarged fragmentary view taken in the direction of the arrow J2, in which an extension tube is extracted therefrom.
Figure 17:
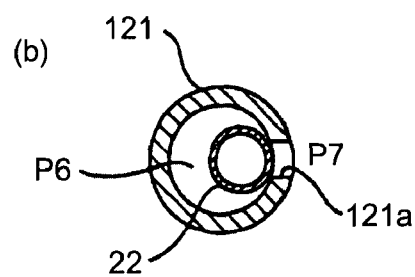
Figure 17:
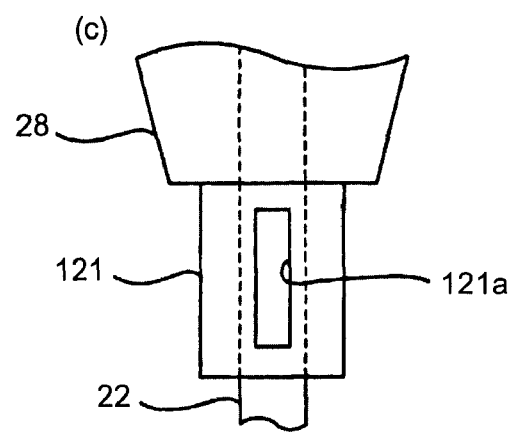

As shown in FIG. 17, in the twelfth embodiment, an extension tube 121 is provided at the lower end of the head nozzle 28. A slit-shaped hole 121a that extends in the vertical direction is formed at the side surface of the extension tube 121. The flow of the coolant outside the extension tube 121 is fast, and compared with the inside of the extension tube 121, the pressure is low. Accordingly, the thimble tube 121 is pressed against the inner circumferential surface of the extension tube 121, by the differential pressure (difference between a pressure P6 of the coolant inside and a pressure P7 of the coolant outside) between the coolant inside (in other words, inside the extension tube 121) and outside (in other words, outside the extension tube 121) the hole 121a.

In the diagram, the hole 121a is blocked by the thimble tube 22. However, it is not limited thereto, and the coolant may flow out to the outside from inside the extension tube 121 through a gap between the thimble tube 22 and the hole 121a. The shape of the hole 121a is not limited to the slit, and for example, may be an oval or a circle.

The other components in FIG. 17 are the same as those in the fifth embodiment (see FIG. 9).

As described above, with the structure for suppressing flow vibration of an instrumentation guide tube according to the twelfth embodiment, the extension tube 121 is provided at the lower end of the head nozzle 28, and the hole 121a is provided at the side surface of the extension tube 121. Accordingly, the thimble tube 22 is pressed against the inner circumferential surface of the extension tube 121, by the differential pressure between the coolant inside and outside the hole 121a. Consequently, the flow vibration of the thimble tube 22 can be suppressed by the pressing force generated by the differential pressure between the coolant inside and outside the hole 121a.

Thirteenth Embodiment

Figure 18:
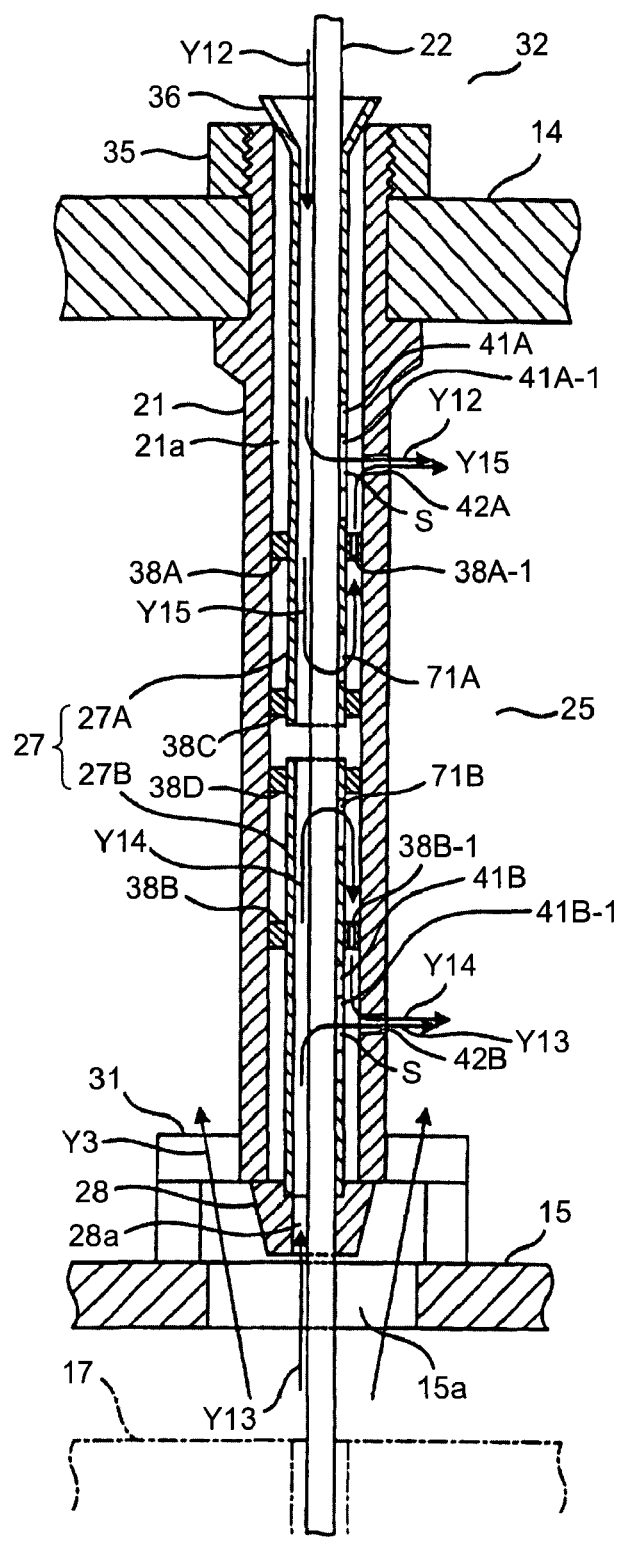
FIG. 18 is a schematic sectional view of a structure for suppressing flow vibration of an instrumentation guide tube according to a thirteenth embodiment of the present invention.

FIG. 18 is a schematic sectional view of a structure for suppressing flow vibration of an instrumentation guide tube according to a thirteenth embodiment of the present invention.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 18, and their repeated detailed descriptions will be omitted.

As shown in FIG. 18, in the thirteenth embodiment, the guide tube 27 is divided into two, namely, a first guide tube unit 27A of the upper side and a second guide tube unit 27B, at the position between the first pressure introduction hole 71A and the second pressure introduction hole 71B, and the lower end of the first guide tube unit 27A and the upper end of the second guide tube unit 27B are separated from each other. Positioners 38C and 38D are provided at the outer circumferential surfaces of the lower end of the first guide tube unit 27A and the upper end of the second guide tube unit 27B, respectively. The positioners 38C and 38D in the middle, and the upper and lower positioners 38A and 38B prevent the upper and lower guide tube units 27A and 27B from swinging in the upper core support column 21.

The other components in FIG. 18 are the same as those in the fifth embodiment (see FIG. 9).

As described above, with the structure for suppressing flow vibration of an instrumentation guide tube according to the thirteenth embodiment, the guide tube 27 is divided into two, namely, the first guide tube unit 27A of the upper side and the second guide tube unit 27B of the lower side, at the position between the first pressure introduction hole 71A and the second pressure introduction hole 71B, and the lower end of the first guide tube unit 27A and the upper end of the second guide tube unit 27B are separated from each other. Accordingly, it is possible to suppress the generation of thermal stress caused by thermal elongation of the guide tube 27.

The positioners 38C and 38D in the middle prevent the upper and lower guide tube units 27A and 27B from swinging, and also prevent the low-temperature coolant and the high-temperature coolant from mixing outside the guide tube 27. The positioners in the middle may be provided at the position between the first pressure introduction hole 71A and the second pressure introduction hole 71B in the configuration of FIG. 9 and the like.

Fourteenth Embodiment

Figure 19:
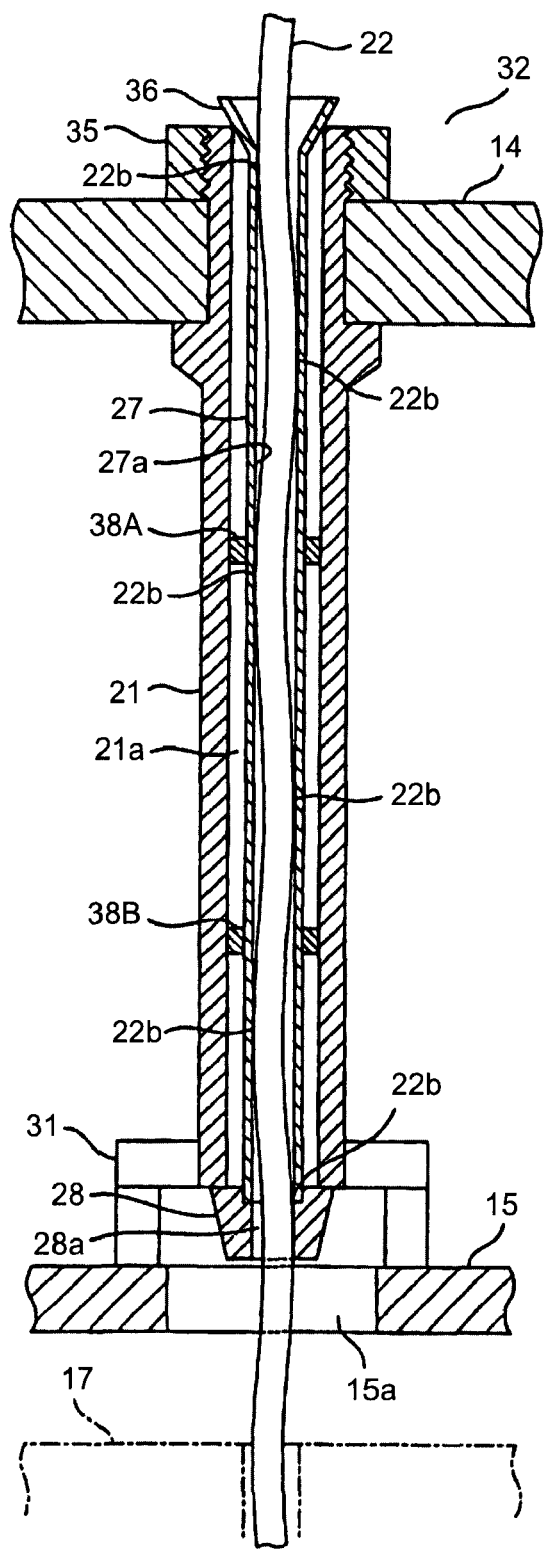
FIG. 19 is a schematic sectional view of a structure for suppressing flow vibration of an instrumentation guide tube according to a fourteenth embodiment of the present invention.

FIG. 19 is a schematic sectional view of a structure for suppressing flow vibration of an instrumentation guide tube according to a fourteenth embodiment of the present invention.

Because the overall configuration of the reactor vessel is the same as that of the first embodiment (see FIG. 1), the illustrations and descriptions thereof will be omitted. The same reference numerals are also given to the same parts as those in the first embodiment (see FIGS. 2 and 3), for the structure for suppressing flow vibration of an instrumentation guide tube shown in FIG. 19, and their repeated detailed descriptions will be omitted.

As shown in FIG. 19, in the fourteenth embodiment, the thimble tube 22 is formed in a corrugated pattern, and curves 22b of the corrugated thimble tube 22 come into contact with the inner circumferential surface 27a of the guide tube 27.

The other components in FIG. 19 are the same as those in the first embodiment (see FIGS. 2 and 3). In FIG. 19, the holes 37A and 37B are not provided in the guide tube 27.

As described above, with the structure for suppressing flow vibration of an instrumentation guide tube according to the fourteenth embodiment, the thimble tube 22 has a corrugated shape, and the curves 22b of the corrugated thimble tube 22 come into contact with the inner circumferential surface 27a of the guide tube 27. Accordingly, it is possible to suppress the flow vibration of the thimble tube 22 by the inner circumferential surface 27a of the guide tube 27 with which the curves 22b of the thimble tube 22 come into contact.

To prevent the flow vibration of the thimble tube 22 more reliably, it is preferable not only the curves 22b of the thimble tube 22 are brought into contact with the inner circumferential surface of the guide tube 27, but also the pressing force is applied to the inner circumferential surface 27a of the guide tube 27, and the reaction force is received from the inner circumferential surface 27a. However, if the reaction force is too large, the insertability of the thimble tube 22 into the guide tube 27 will be lowered. Accordingly, an appropriate reaction force in which the balance between the prevention of flow vibration and the maintenance of insertability are taken into account needs to be obtained. In this case, because the reaction force is increased in proportion to the amplitude of the corrugation of the guide tube 27, an amplitude value that can obtain an appropriate reaction force may be obtained, for example, by a stress analysis using the finite element method (FEM).

Fifteenth Embodiment

Figure 20:
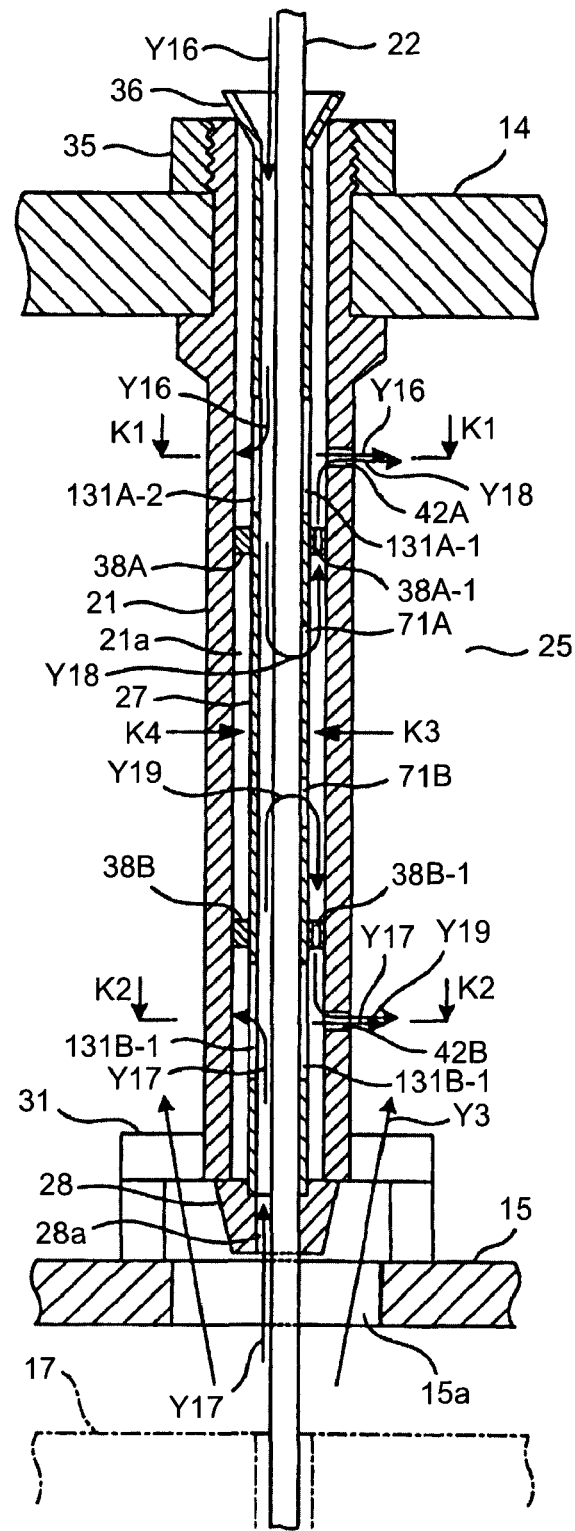
FIG. 20 is a schematic sectional view of a structure for suppressing flow vibration of an instrumentation guide tube according to a fifteenth embodiment of the present invention.

FIG. 20 is a schematic sectional view of a structure for suppressing flow vibration of an instrumentation guide tube according to a fifteenth embodiment of the present invention. FIG. 21(a) is an enlarged fragmentary sectional view taken along the line K1-K1 of FIG. 20. FIG. 21(b) is an enlarged fragmentary sectional view taken along the line K2-K2 of FIG. 20. FIG. 21(c) is an enlarged fragmentary view taken in the direction of the arrow K3 in FIG. 20, in which a guide tube is extracted from FIG. 20. FIG. 21(d) is an enlarged fragmentary view taken in the direction of the arrow K4 in FIG. 20, in which the guide tube is extracted from FIG. 20.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIGS. 20 and 21, and their repeated detailed descriptions will be omitted.

Figure 21:
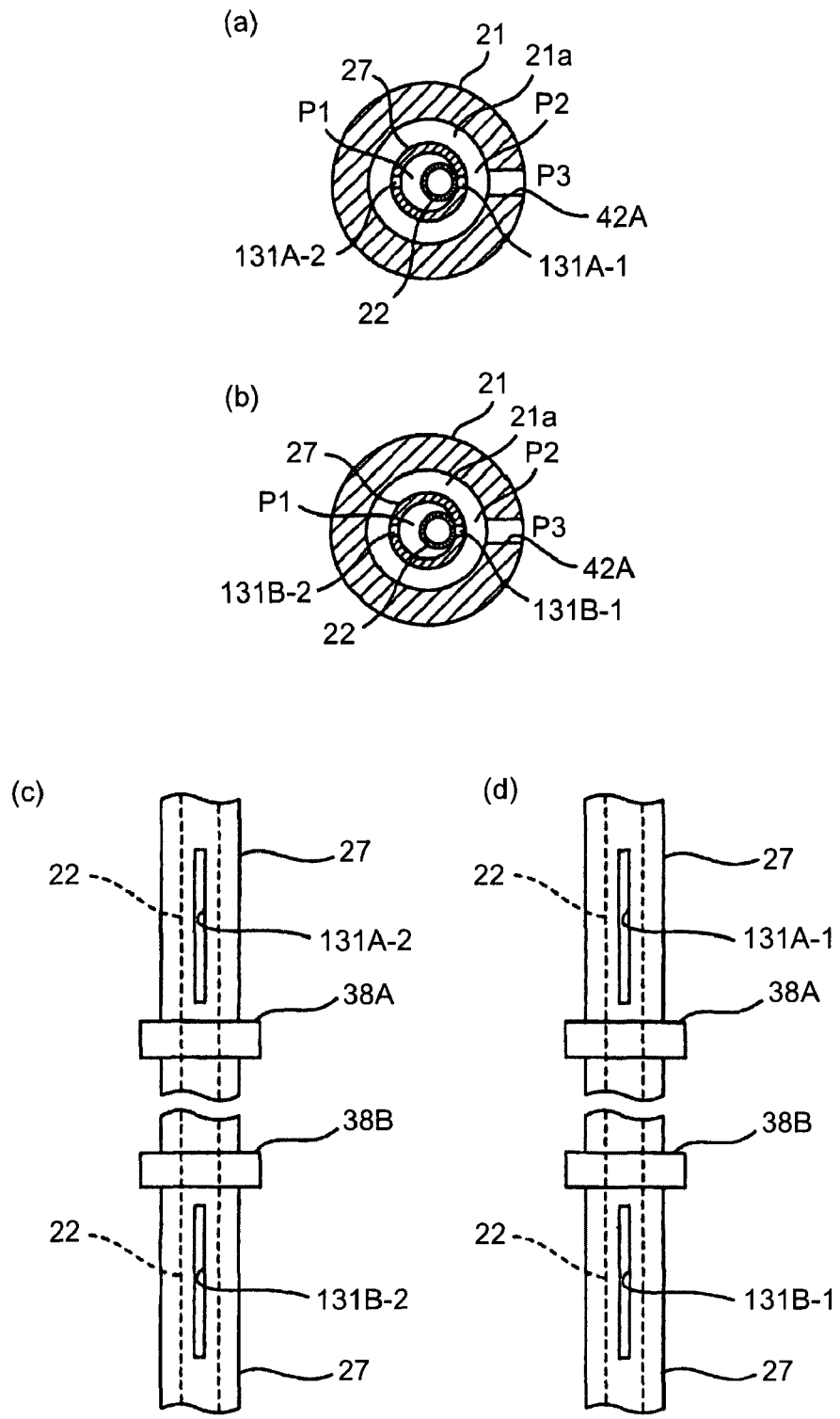
FIG. 21 is an enlarged fragmentary sectional view taken along the line K1-K1 of FIG. 20; an enlarged fragmentary sectional view taken along the line K2-K2 of FIG. 20; an enlarged fragmentary view taken in the direction of the arrow K3 in FIG. 20, in which a guide tube is extracted from FIG. 20; and an enlarged fragmentary view taken in the direction of the arrow K4 in FIG. 20, in which the guide tube is extracted from FIG. 20.

As shown in FIGS. 20 and 21, in the fifteenth embodiment, a first upper hole 131A-1 and a second upper hole 131A-1 are formed at two positions of the upper side surface of the guide tube 27 in the circumferential direction. In the diagram, the first upper hole 131A-1 and the second upper hole 131A-2 are both slits extending in the vertical direction, and provided at positions rotationally symmetrical by 180 degrees to each other, about the axis of the guide tube 27. Similarly, a first lower hole 131B-1 and a second lower hole 131B-1 are also formed at two positions of the lower side surface of the guide tube 27 in the circumferential direction. In the diagram, the first upper hole 131B-1 and the second upper hole 131B-2 are both slits extending in the vertical direction, and provided at positions rotationally symmetrical by 180 degrees to each other, about the axis of the guide tube 27.

The thimble tube 22 is pressed against the inner circumferential surface of the guide tube 27, by the differential pressure (differential pressure ΔP between the pressure P1 of the coolant inside and the pressure P2 of the coolant outside) between the coolant inside (in other words, inside the guide tube 27) and outside (in other words, outside the guide tube 27) one upper hole and one lower hole (in the diagram, the first upper hole 131A-1 and the first lower hole 131B-1) of the upper holes 131A-1 and 131A-2 and the lower holes 131B-1 and 131B-2.

As shown by the arrows Y16, the coolant flowing into the guide tube 27 from the upper end of the guide tube 27 flows out to the outside from inside the guide tube 27 through an upper hole (in the diagram, the second upper hole 131A-2) other than the one upper hole (in the diagram, the first upper hole 131A) of the upper holes 131A-1 and 131A-2, and also flows out to the outside from inside the upper core support column 21 through the upper pressure adjustment hole 42A. As shown by the arrows Y17, the coolant flowing into the guide tube 27 from the lower end of the guide tube 27 flows out to the outside from inside the guide tube 27 through a lower hole (in the diagram, the second lower hole 131B-2) other than the one lower hole (in the diagram, 131B-1) of the lower holes 131B-1 and 131B-2, and also flows out to the outside from inside the upper core support column 21 through the lower pressure adjustment hole 42B.

The other components in FIGS. 20 and 21 are the same as those in the fifth embodiment (see FIG. 9).

As described above, with the structure for suppressing flow vibration of an instrumentation guide tube according to the fifteenth embodiment, the upper holes 131A-1 and 131A-2 and the lower holes 131B-1 and 131B-2 are provided at the upper portion and the lower portion of the side surface of the guide tube 27 in the circumferential direction. The upper pressure adjustment hole 42A and the lower pressure adjustment hole 42B are provided at two positions, namely, the upper portion and the lower portion of the side surface of the upper core support column 21. The thimble tube 22 is pressed against the inner circumferential surface of the guide tube 27, by the differential pressure between the coolant inside and outside one upper hole and one lower hole of the upper holes 131A-1 and 131A-2 and the lower holes 131B-1 and 131B-2. The coolant flowing into the guide tube 27 from the upper end of the guide tube 27 flows out to the outside from inside the guide tube 27 through an upper hole other than the one upper hole of the upper holes 131A-1 and 131A-2, and also flows out to the outside from inside the upper core support column 21 through the upper pressure adjustment hole 42A. The coolant flowing into the guide tube 27 from the lower end of the guide tube 27 flows out to the outside from inside the guide tube 27 through a lower hole other than the one lower hole of the lower holes 131B-1 and 131B-2, and also flows out to the outside from inside the upper core support column 21 through the lower pressure adjustment hole 42B. For example, even if the thimble tube 22 is permanently bent and the position of the thimble tube 22 in the guide tube 27 varies, the thimble tube 22 can be pressed against the inner circumferential surface of the guide tube 27, at any one of the upper holes 131A-1 and 131A-2, and the lower holes 131B-1 and 131B-2.

The upper holes 131A-1 and 131A-2, and the lower holes 131B-1 and 131B-2 are all smaller (flow area is smaller) than the upper holes 37A and 37A in the first embodiment and the like. This is to prevent the flow amount of the coolant to the outside from inside the guide tube 27 from excessively increasing, and excessively lowering the pressure in the guide tube 27. The specific size (flow area) may be set appropriately, by analysis, experiment, and the like.

The shapes of the upper holes 131A-1 and 131A-2 and the lower holes 131B-1 and 131B-2 are not limited to the slits, and for example, may be ovals or circles.

Sixteenth Embodiment

Figure 22:
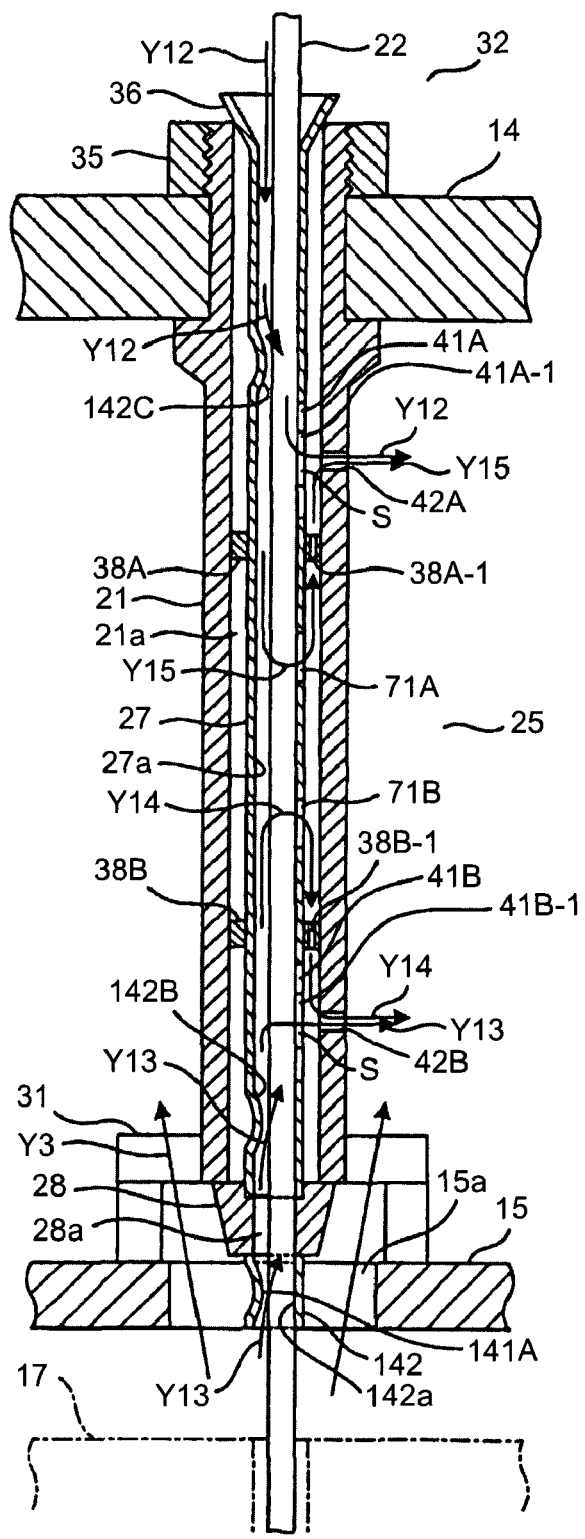
FIG. 22 is a schematic sectional view of a structure for suppressing flow vibration of an instrumentation guide tube according to a sixteenth embodiment of the present invention.

FIG. 22 is a schematic sectional view of a structure for suppressing flow vibration of an instrumentation guide tube according to a sixteenth embodiment of the present invention.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIG. 22, and their repeated detailed descriptions will be omitted.

As shown in FIG. 22, in the sixteenth embodiment, convex portions 141A, 141B, and 141C that direct the flow direction of the coolant in the directions of the upper hole 41A and the lower hole 41B as shown by the arrows Y13, are provided at an inner circumference surface 142a of an extension tube 142 in a cylinder provided at the lower end of the head nozzle 28 and at the inner circumferential surface 27a of the guide tube 27. In the diagram, a first convex portion 141A is formed by bending a part of the extension tube 142 towards inside. Similarly, a second convex portion 141B is formed by bending a part of the guide tube 27 towards inside, at a position above the upper hole 42A, and a third convex portion 1410 is formed by bending a part of the guide tube 27 towards inside, at a position below the lower hole 42B.

The other components in FIG. 22 are the same as those in the fifth embodiment (see FIG. 9).

As described above, with the structure for suppressing flow vibration of an instrumentation guide tube according to the sixteenth embodiment, the convex portions 141A, 141B, and 141C that direct the flow direction of the coolant in the directions of the upper hole 41A and the lower hole 41B are provided at the inner circumferential surface 142a of the extension tube 142 and the inner circumferential surface 27a of the guide tube 27. Accordingly, the force that presses the thimble tube 22 in the directions of the upper hole 41A and the lower hole 41B is applied to the thimble tube 22, by the flows (flows in the transverse direction) toward the upper hole 41A and the lower hole 41B. Consequently, for example, even if the thimble tube 22 is permanently bent and the position of the thimble tube 22 in the guide tube 27 varies, it is possible to reliably press the thimble tube 22 against the inner circumferential surface of the guide tube 27, at the upper hole 41A and the lower hole 41B.

Seventeenth Embodiment

Figure 23:
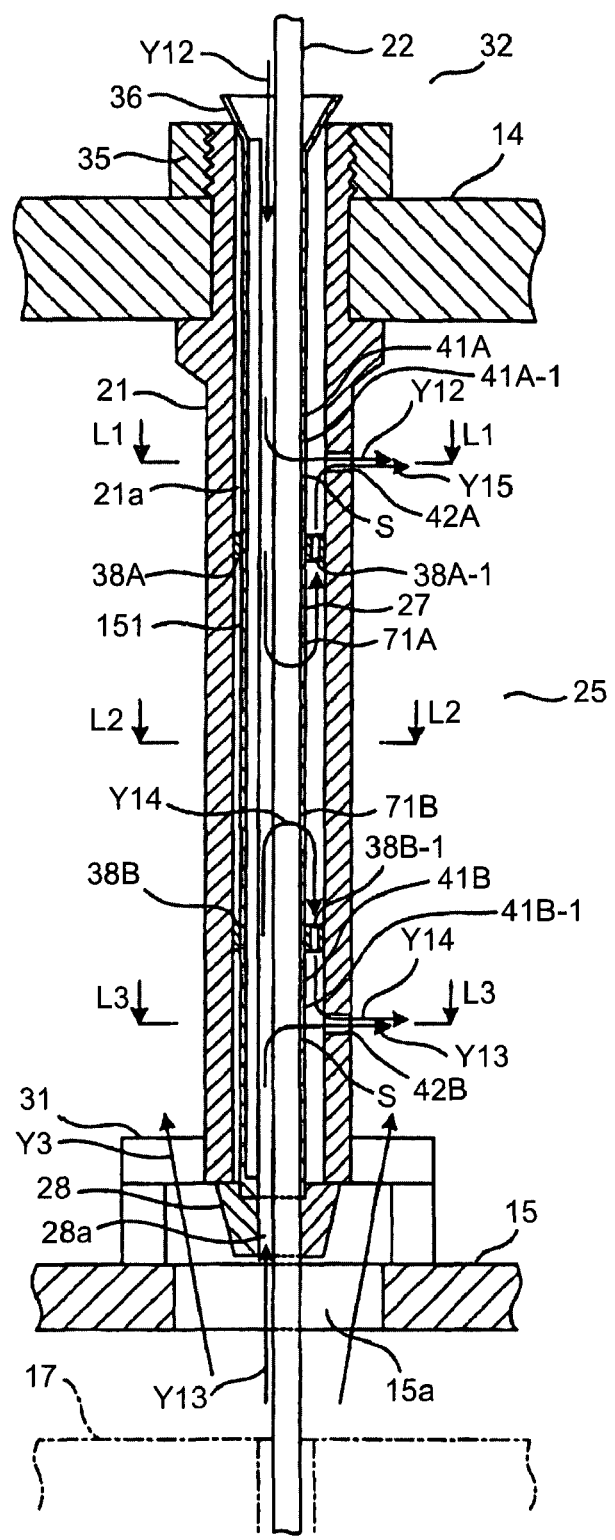
FIG. 23 is a schematic sectional view of a structure for suppressing flow vibration of an instrumentation guide tube according to a seventeenth embodiment of the present invention.

FIG. 23 is a schematic sectional view of a structure for suppressing flow vibration of an instrumentation guide tube according to a seventeenth embodiment of the present invention. FIG. 24(a) is an enlarged fragmentary sectional view taken along the line L1-L1 of FIG. 23. FIG. 24(b) is an enlarged fragmentary sectional view taken along the line L2-L2 of FIG. 23. FIG. 24(c) is an enlarged fragmentary sectional view taken along the line L3-L3 of FIG. 23. FIG. 24(d) is an enlarged perspective view of a guide tube extracted from FIG. 23.

Because the overall configuration of the reactor vessel is the same as that of the first embodiment (see FIG. 1), the illustrations and descriptions thereof will be omitted. The same reference numerals are also given to the same parts as those in the fifth embodiment (see FIG. 9), for the structure for suppressing flow vibration of an instrumentation guide tube shown in FIGS. 23 and 24, and their repeated detailed descriptions will be omitted.

Figure 24:
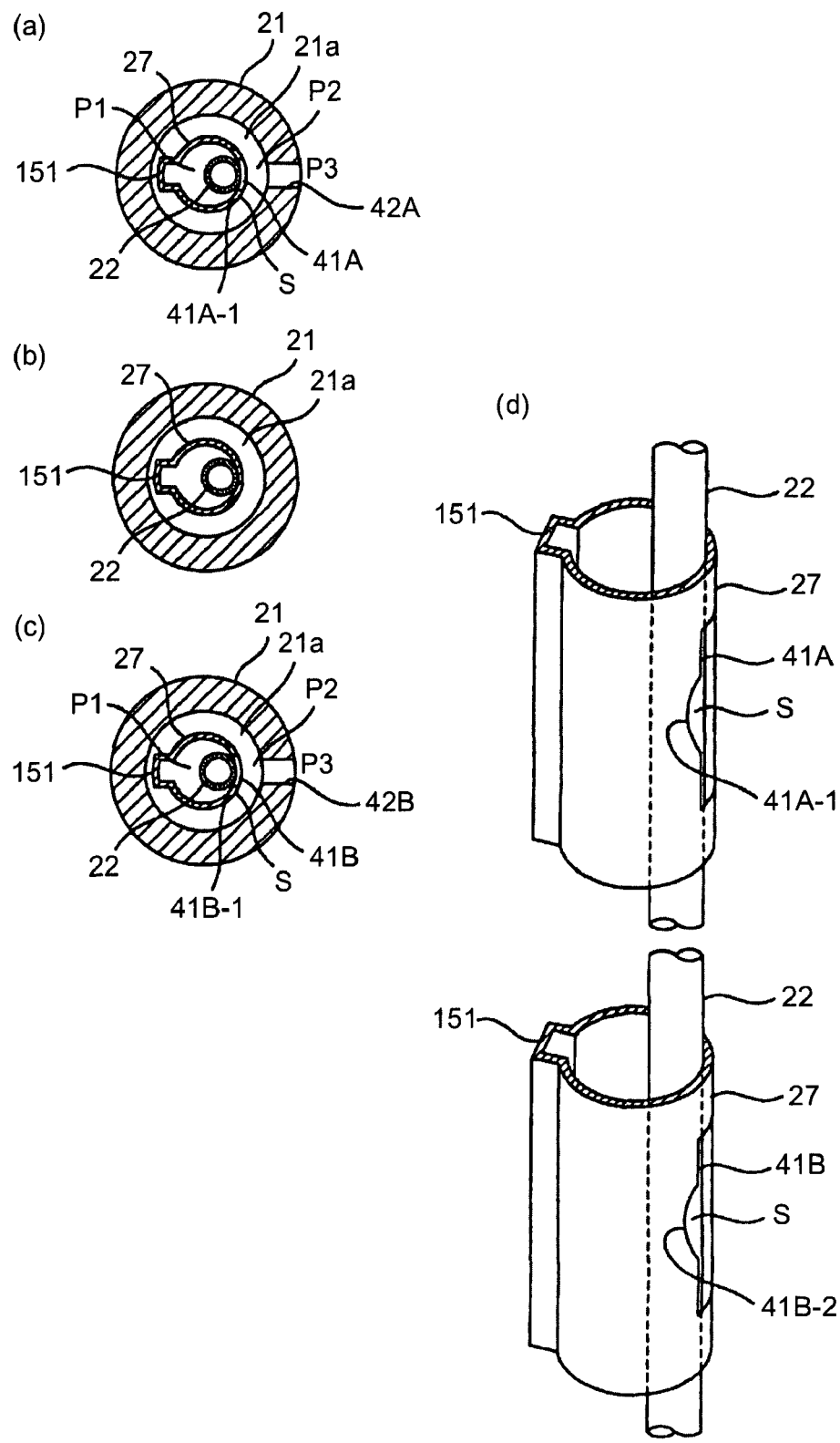
FIG. 24 is an enlarged fragmentary sectional view taken along the line L1-L1 of FIG. 23; an enlarged fragmentary sectional view taken along the line L2-L2 of FIG. 23; an enlarged fragmentary sectional view taken along the line L3-L3 of FIG. 23; and an enlarged perspective view of a guide tube extracted from FIG. 23.

As shown in FIGS. 23 and 24, in the seventeenth embodiment, a pressure introduction tube 151 is provided at the guide tube 27. The pressure introduction tube 151 is provided at a position opposite to the upper hole 41A and the lower hole 41B (in the diagram, at the position rotated by 180 degrees about the axis of the guide tube 27), and provided along the longitudinal direction (axis direction) of the guide tube 27.

Because the inside of the pressure introduction tube 151 and the inside of the guide tube 27 communicate with each other, the pressure of the coolant flowing out from the core 17 and the pressure of the coolant in the top end 32 are introduced to the region opposite to the upper hole 41A and the lower hole 41B in the pressure introduction tube 27 through the pressure introduction tube 151. In the diagrams, the cross section of the pressure introduction tube 151 is rectangular. However, it is not limited to thereto, and for example, may be a circle.

The other components in FIGS. 23 and 24 are the same as those in the fifth embodiment (see FIG. 9).

As described above, with the structure for suppressing flow vibration of an instrumentation guide tube according to the seventeenth embodiment, the pressure introduction tube 151 is provided at the position opposite to the upper hole 41A and the lower hole 41B along the longitudinal direction of the guide tube 27, and the inside of the pressure introduction tube 151 and the inside of the guide tube 27 communicate with each other. Accordingly, the pressure of the coolant is introduced to the side opposite to the upper hole 41A and the lower hole 41B by the pressure introduction tube 151, thereby increasing the pressure on the side opposite to the upper hole 41A and the lower hole 41B. Consequently, even if the thimble tube 22 is separated from the upper hole 41A and the lower hole 41B while the thimble tube 22 is inserted into the guide tube 27, the thimble tube 22 is pressed in the direction of the upper hole 41A and the lower hole 41B, by the pressure on the side opposite to the upper hole 41A and the lower hole 41B. As a result, it is possible to reliably press the thimble tube 22 against the inner circumferential surface of the guide tube 27, at the upper hole 41A and the lower hole 41B.

Eighteenth Embodiment

FIG. 25(a) is a schematic sectional view of a principal portion of a structure for suppressing flow vibration of an instrumentation guide tube according to an eighteenth embodiment of the present invention. FIG. 25(b) is a fragmentary sectional view taken along the line M1-M1 of FIG. 25(a). FIG. 25(b) is a fragmentary sectional view taken along the line M2-M2 of FIG. 25(a).

Because the overall configuration of the reactor vessel is the same as that of the first embodiment (see FIG. 1), the illustrations and descriptions thereof will be omitted. The same reference numerals are also given to the same parts as those in the seventeenth embodiment (see FIGS. 23 and 24), for the structure for suppressing flow vibration of an instrumentation guide tube shown in FIG. 25, and their repeated detailed descriptions will be omitted.

Figure 25:
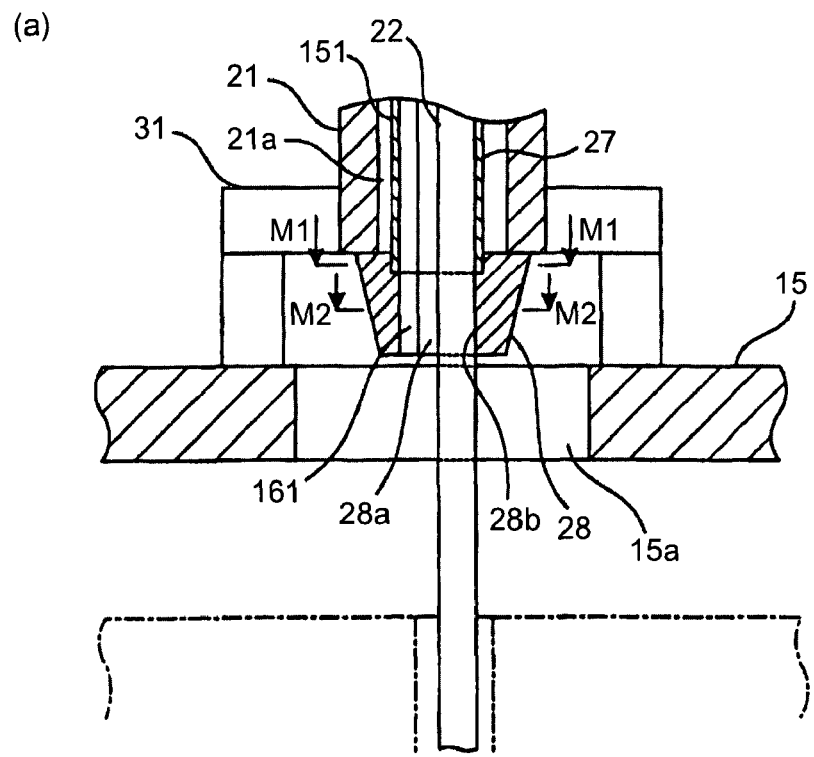
FIG. 25 is a schematic sectional view of a principal portion of a structure for suppressing flow vibration of an instrumentation guide tube according to an eighteenth embodiment of the present invention; a fragmentary sectional view taken along the line M1-M1; and a fragmentary sectional view taken along the line M2-M2.
Figure 25:
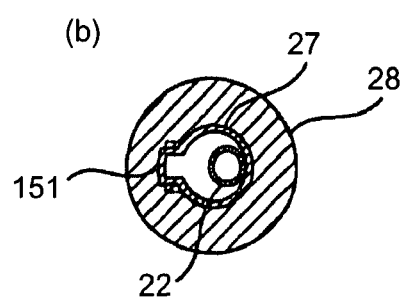
Figure 25:
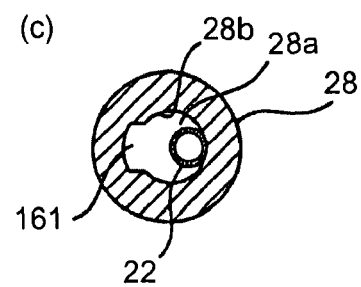

As shown in FIG. 25, in the eighteenth embodiment, a concave portion 161 is formed at the inner circumferential surface 28a of the head nozzle 28. In other words, an opening area of the insertion hole 28a of the head nozzle 28 increases. The concave portion 161 is positioned directly below the pressure introduction tube 151 provided at the pressure introduction tube 27, and communicating with the inside of the pressure introduction tube 151.

The other components in FIG. 25 are the same as those in the seventeenth embodiment (see FIGS. 23 and 24).

As described above, with the structure for suppressing flow vibration of an instrumentation guide tube according to the eighteenth embodiment, the concave portion 161 communicating with the inside of the pressure introduction tube 151 is formed at the inner circumferential surface 28b of the head nozzle 28. Because an upper flow of the coolant can be guided into the pressure introduction tube 151 through the concave portion 161, the pressure of the coolant can be introduced by the pressure introduction tube 151 more reliably. Accordingly, the pressure on the side opposite to the upper hole 41A and the lower hole 41B can be increased.

Nineteenth Embodiment

Figure 26:
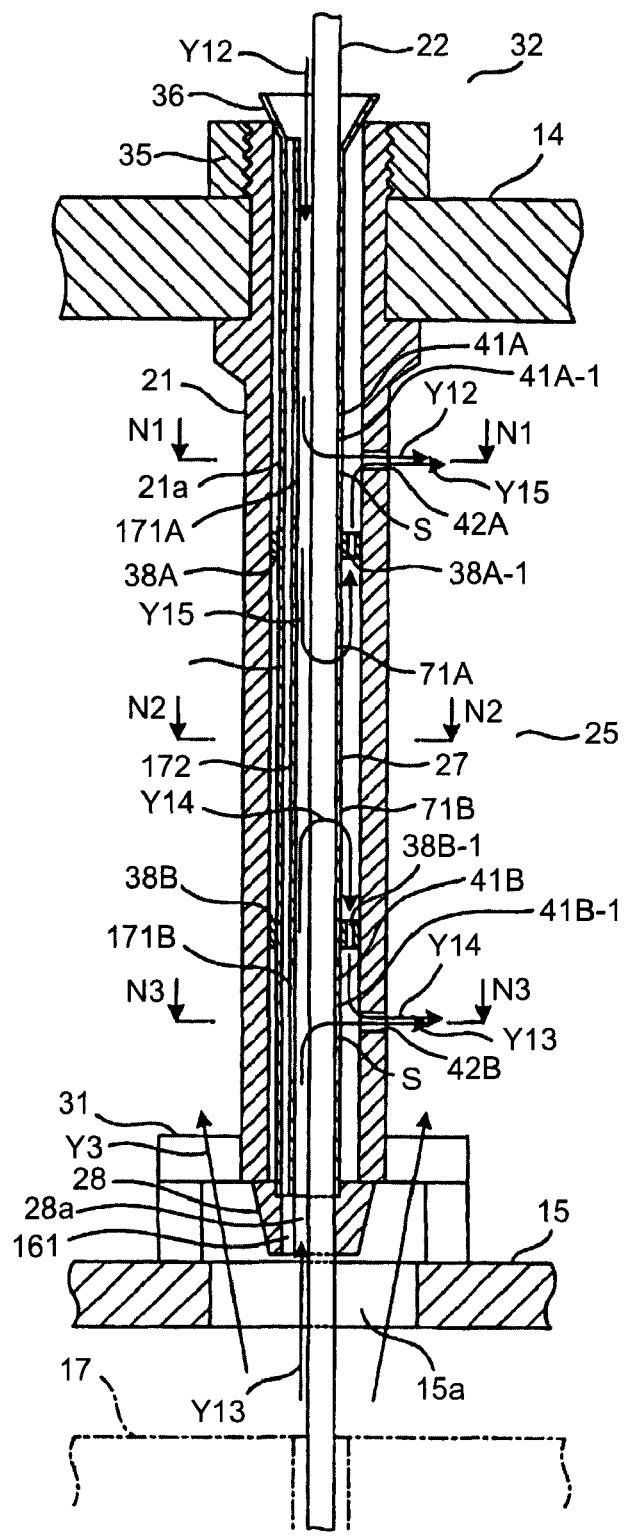
FIG. 26 is a schematic sectional view of a structure for suppressing flow vibration of an instrumentation guide tube according to a nineteenth embodiment of the present invention.

FIG. 26 is a schematic sectional view of a structure for suppressing flow vibration of an instrumentation guide tube according to a nineteenth embodiment of the present invention. FIG. 27(a) is an enlarged fragmentary sectional view taken along the line N1-N1 of FIG. 26. FIG. 27(b) is an enlarged fragmentary sectional view taken along the line N2-N2 of FIG. 26. FIG. 27(c) is an enlarged fragmentary sectional view taken along the line N3-N3 of FIG. 26. FIG. 27(d) is an enlarged perspective view of the guide tube extracted from FIG. 26.

Because the overall configuration of the reactor vessel is the same as that of the first embodiment (see FIG. 1), the illustrations and descriptions thereof will be omitted. The same reference numerals are also given to the same parts as those in the seventeenth and eighteenth embodiments (see FIGS. 23 to 25), for the structure for suppressing flow vibration of an instrumentation guide tube shown in FIGS. 26 and 27, and their repeated detailed descriptions will be omitted.

In the seventeenth embodiment, the inside of the pressure introduction tube 151 and the inside of the guide tube 27 communicate with each other over the entire length. However, as shown in FIG. 25, in the nineteenth embodiment, communicating holes 171A and 171B that make the inside of the pressure introduction tube 151 and the inside of the guide tube 27 communicate with each other are provided at a boundary wall 172 between the guide tube 27 and the pressure introduction tube 151. The communicating holes 171A and 171B are slits, and provided at positions corresponding to the upper hole 41A and the lower hole 41B, respectively.

Figure 27:
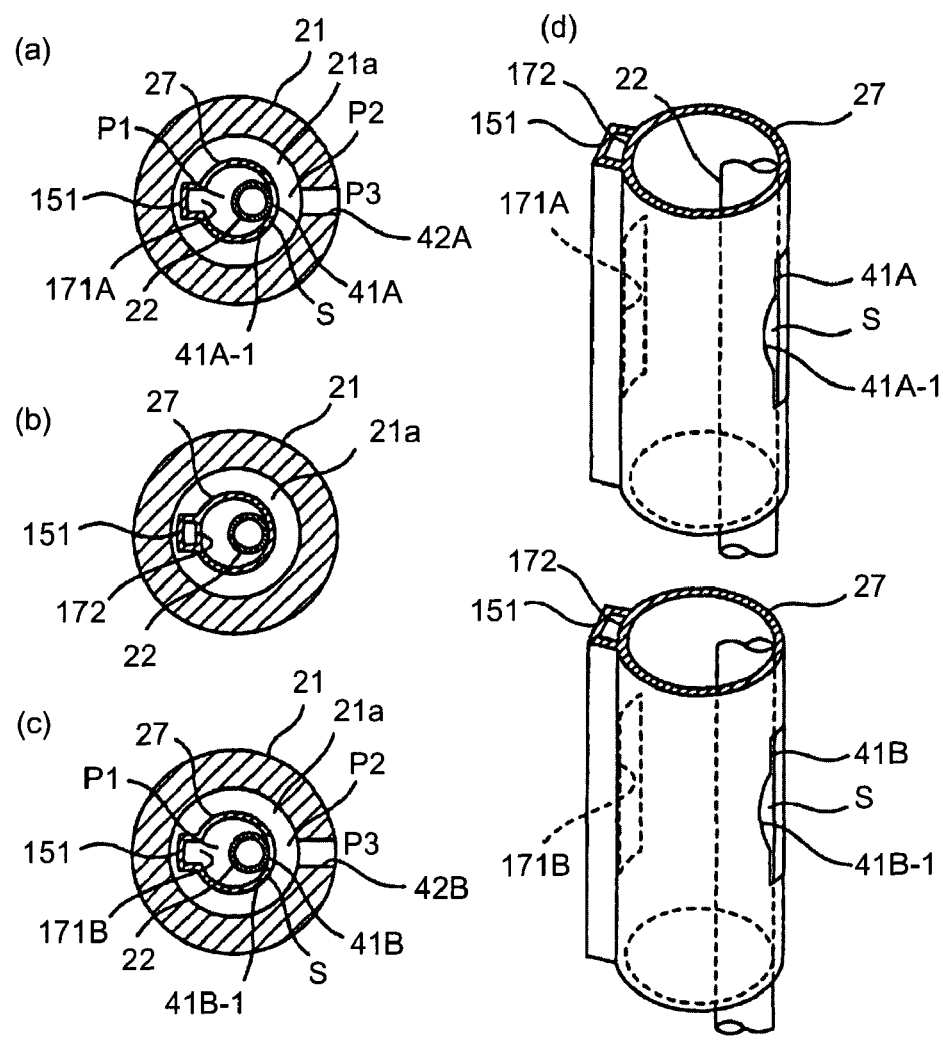
FIG. 27 is an enlarged fragmentary sectional view taken along the line N1-N1 of FIG. 26; an enlarged fragmentary sectional view taken along the line N2-N2 of FIG. 26; an enlarged fragmentary sectional view taken along the line N3-N3 of FIG. 26; and an enlarged perspective view of a guide tube extracted from FIG. 26.

The other components in FIGS. 26 and 27 are the same as those in the seventeenth and eighteenth embodiments (see FIGS. 23 to 25).

As described above, with the structure for suppressing flow vibration of an instrumentation guide tube according to the nineteenth embodiment, the communicating holes 171A and 171B that make the inside of the pressure introduction tube 151 and the inside of the guide tube 27 communicate with each other are provided at the positions corresponding to the upper hole 41A and the lower hole 41B. Accordingly, compared with the case where the inside of the pressure introduction tube 151 and the inside of the guide tube 27 entirely communicate with each other, it is possible to introduce the pressure of the coolant to the side opposite to the upper hole 41A and the lower hole 41B, at the positions corresponding to the upper hole 41A and the lower hole 41B, by the pressure introduction tube 151 more reliably. Consequently, compared with the case where the inside of the pressure introduction tube 151 and the inside of the guide tube 27 entirely communicate with each other, it is possible to press the thimble tube 22 in the direction of the upper hole 41A and the lower hole 41B, by the pressure of the coolant introduced to the side opposite to the upper hole 41A and the lower hole 41B more reliably.

The shapes of the communicating holes 171A and 171B are not limited to the slits, and for example, may be ovals or circles.

Twentieth Embodiment

Figure 28:
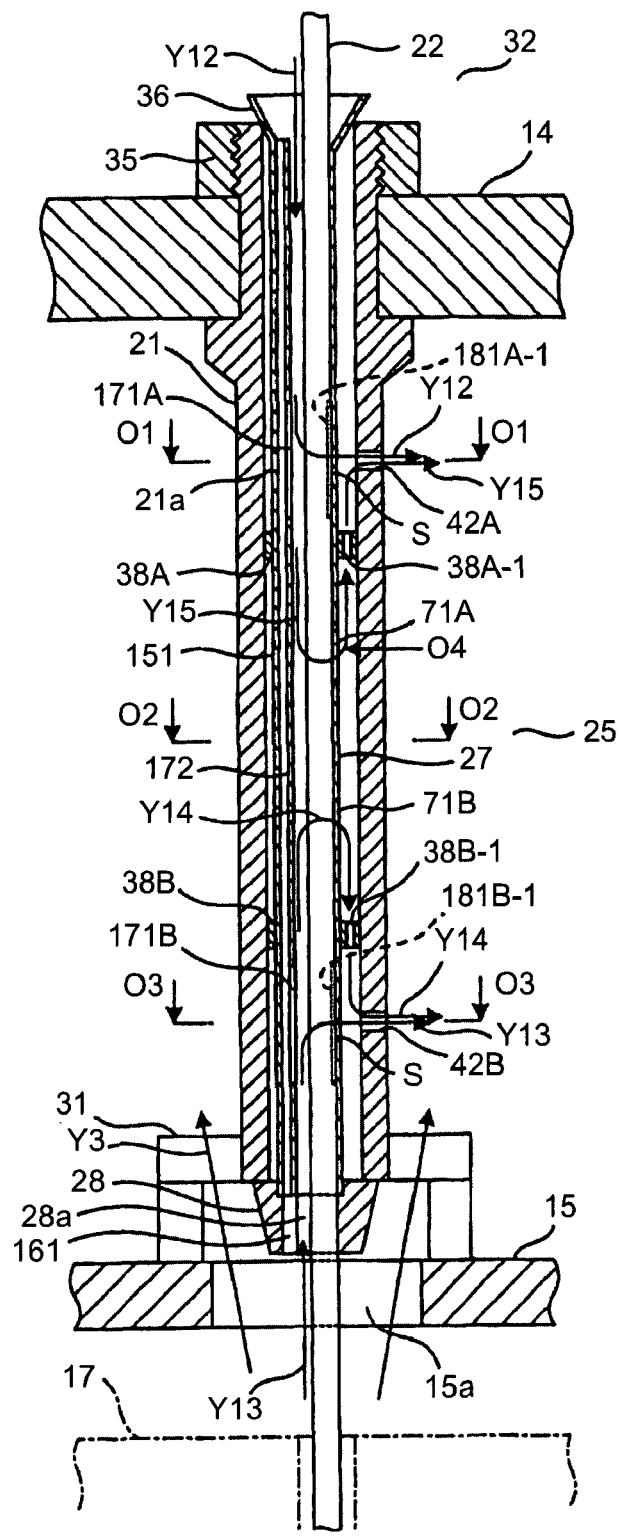
FIG. 28 is a schematic sectional view of a structure for suppressing flow vibration of an instrumentation guide tube according to a twentieth embodiment of the present invention.

FIG. 28 is a schematic sectional view of a structure for suppressing flow vibration of an instrumentation guide tube according to a twentieth embodiment of the present invention. FIG. 29(a) is an enlarged fragmentary sectional view taken along the line O1-O1 of FIG. 28. FIG. 29(b) is an enlarged fragmentary sectional view taken along the line O-O2 of FIG. 28. FIG. 29(c) is an enlarged fragmentary sectional view taken along the line O3-O3 of FIG. 28. FIG. 29(d) is an enlarged fragmentary view taken in the direction of the arrow O4 in FIG. 28, in which a guide tube is extracted from FIG. 28.

Because the overall configuration of the reactor vessel is the same as that of the first embodiment (see FIG. 1), the illustrations and descriptions thereof will be omitted. The same reference numerals are also given to the same parts as those in the nineteenth embodiment (see FIGS. 26 and 27), for the structure for suppressing flow vibration of an instrumentation guide tube shown in FIGS. 28 and 29, and their repeated detailed descriptions will be omitted.

As shown in FIG. 25, a first upper hole 181A-1 and a second upper hole 181A-2 are formed at two positions of the upper side surface of the guide tube 27 in the circumferential direction, and a first lower hole 181B-1 and a second lower hole 181B-2 are formed at two positions of the lower side surface of the guide tube 27 in the circumferential direction. The shapes of the upper holes 181A-1 and 181A-2 and the lower holes 181B-1 and 181B-2 are not limited to the slits, and for example, may be ovals or circles.

The thimble tube 22 is pressed against the inner circumferential surface of the guide tube 27 by the differential pressure (differential pressure ΔP between the pressure P1 of the coolant inside and the pressure P2 of the coolant outside) of the coolant inside (in other words, inside the guide tube 27) and outside (in other words, outside the guide tube 27) one upper hole and one lower hole (in the diagram, the first upper hole 181A-1 and the first lower hole 181B-1) of the upper holes 181A-1 and 181A-2 and the lower holes 181B-1 and 181B-2.

As shown by the arrows Y12, the coolant flowing into the guide tube 27 from the upper end of the guide tube 27 flows out to the outside from inside the guide tube 27 through an upper hole (in the diagram, the second upper hole 181A-2) other than the one upper hole (in the diagram, the first upper hole 181A) of the upper holes 181A-1 and 181A-2, and also flows out to the outside from inside the upper core support column 21 through the upper pressure adjustment hole 42A. As shown by the arrows Y17, the coolant flowing into the guide tube 27 from the lower end of the guide tube 27 flows out to the outside from inside the guide tube 27 through a lower hole (in the diagram, the second lower hole 181B-2) other than the one lower hole (in the diagram, 181B-1) of the lower holes 181B-1 and 181B-2, and also flows out to the outside from inside the upper core support column 21 through the lower pressure adjustment hole 42B.

Figure 29:
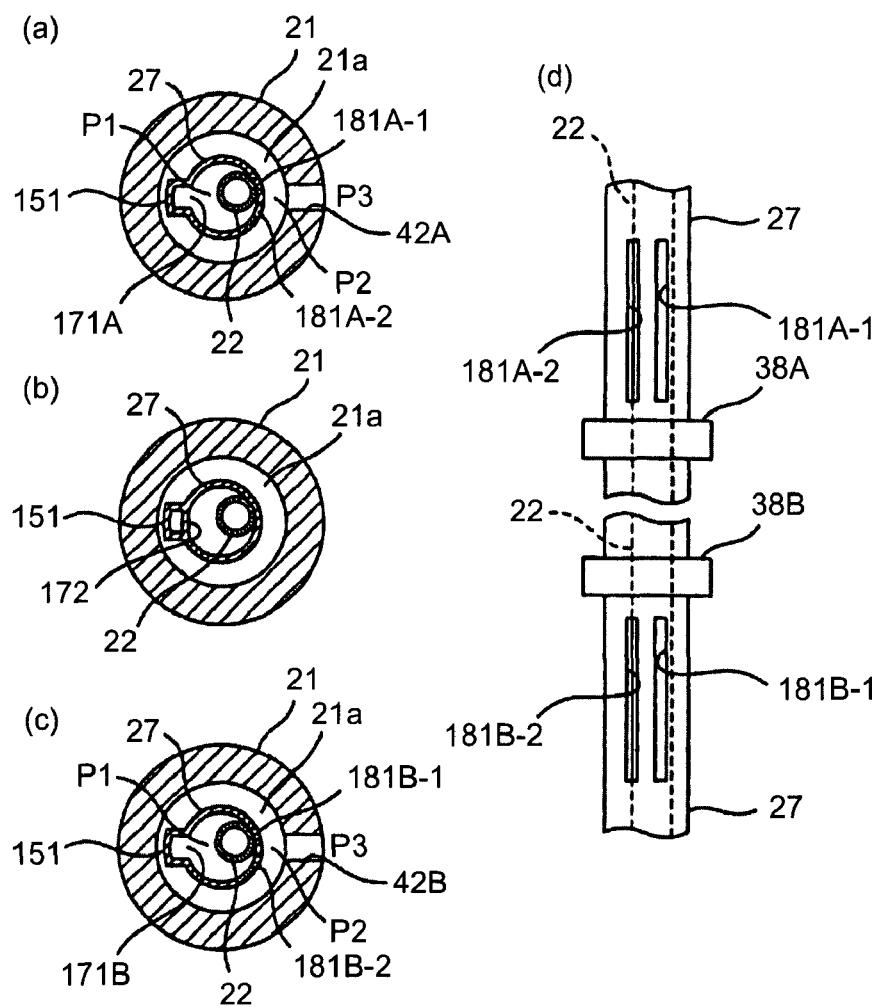
FIG. 29 is an enlarged fragmentary sectional view taken along the line O1-O1 of FIG. 28; an enlarged fragmentary sectional view taken along the line O-O2 of FIG. 28; an enlarged fragmentary sectional view taken along the line O3-O3 of FIG. 28; and an enlarged fragmentary view taken in the direction of the arrow O4 in FIG. 28, in which a guide tube is extracted from FIG. 28.

The other components in FIGS. 28 and 29 are the same as those in the nineteenth embodiment (see FIGS. 26 and 27).

As described above, with the structure for suppressing flow vibration of an instrumentation guide tube according to the twentieth embodiment, the upper holes 181A-1 and 181A-2 and the lower holes 181B-1 and 181B-2 are provided at the upper and the lower side surface of the guide tube 27 in the circumferential direction, and the thimble tube 22 is pressed against the inner circumferential surface of the guide tube 27, by the differential pressure between the coolant inside and outside any one upper hole and any one lower hole of the upper holes 181A-1 and 181A-2 and the lower holes 181B-1 and 181B-2. The coolant flowing into the guide tube 27 from the upper end of the guide tube 27 flows out to the outside from inside the guide tube 27 through an upper hole other than the one upper hole of the upper holes 181A-1 and 181A-2, and also flows out to the outside from inside the upper core support column 21 through the upper pressure adjustment hole 42A. The coolant flowing into the guide tube 27 from the lower end of the guide tube 27 flows out to the outside from inside the guide tube 27 through a lower hole other than the one lower hole of the lower holes 181B-1 and 181B-2, and also flows out to the outside from inside the upper core support column 21 through the lower pressure adjustment hole 42B. Accordingly, even if the thimble tube 22 is placed at the position inclined to one side in the guide tube 27, it is possible to press the thimble tube 22 against the inner circumferential surface of the guide tube 27, at one of the upper holes 181A-1 and 181A-2 and the lower holes 181B-1 and 181B-2.

Twenty-First Embodiment

Figure 30:
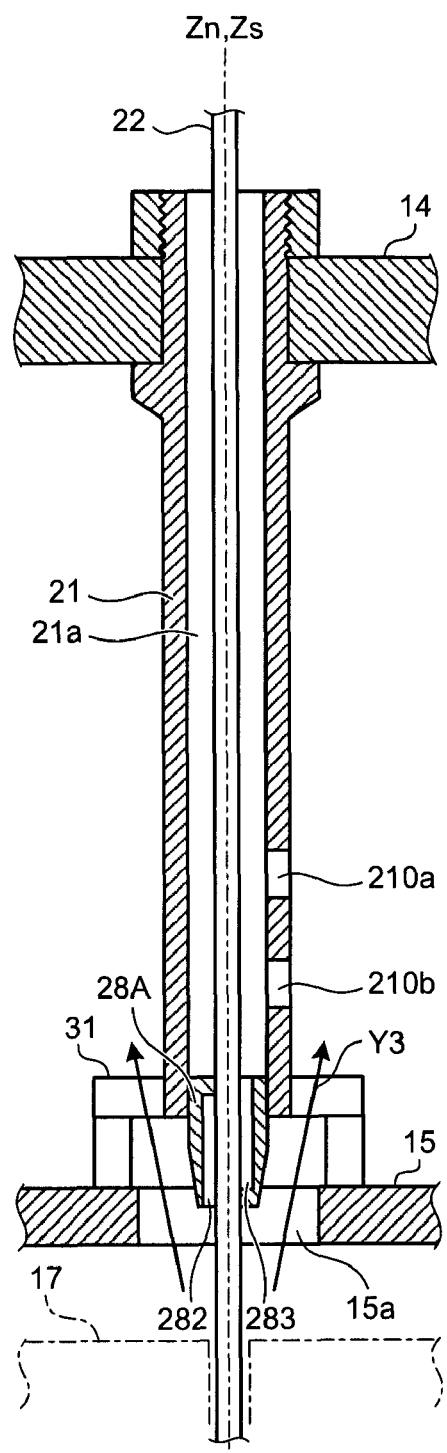
FIG. 30 is a schematic sectional view of a structure for suppressing flow vibration of an instrumentation guide tube according to a twenty-first embodiment of the present invention.
Figure 31:
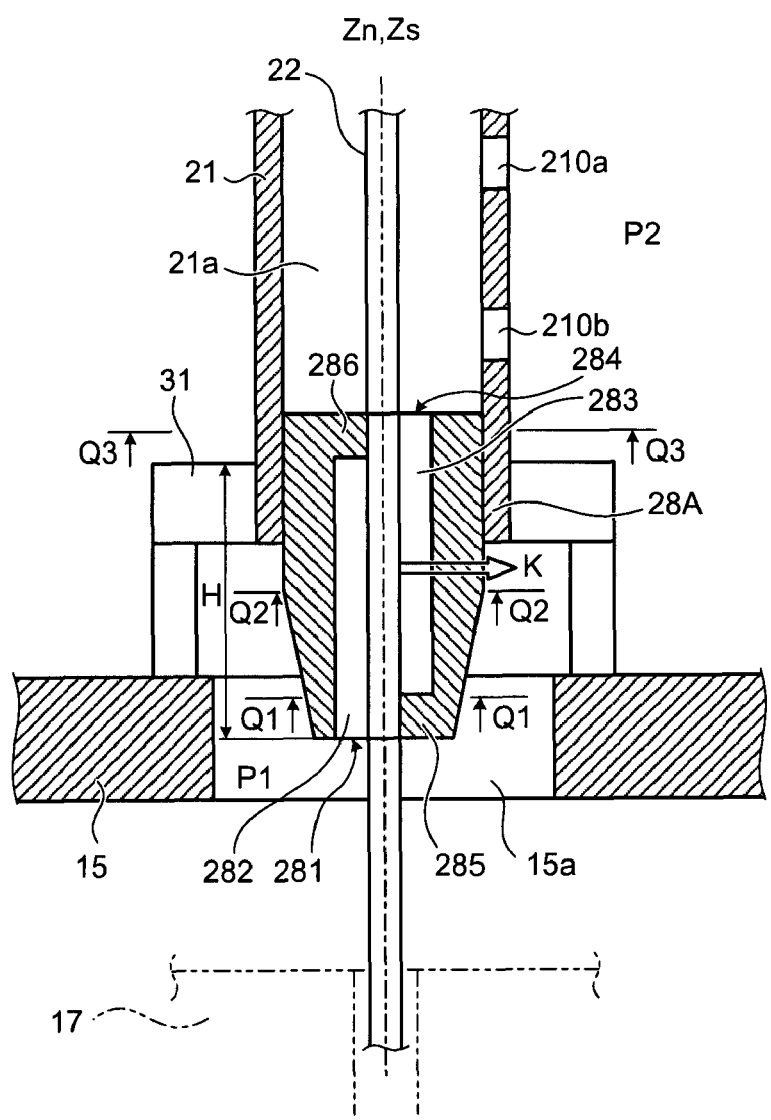
FIG. 31 is an enlarged view of a head nozzle of FIG. 30.
Figure 32A:
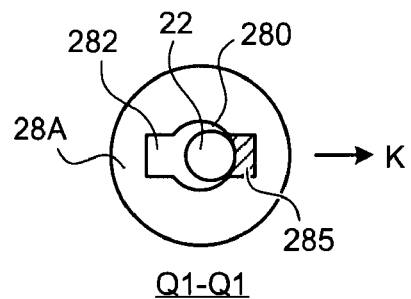
FIG. 32A is a fragmentary view taken along the line Q1-Q1 of FIG. 31.
Figure 32B:
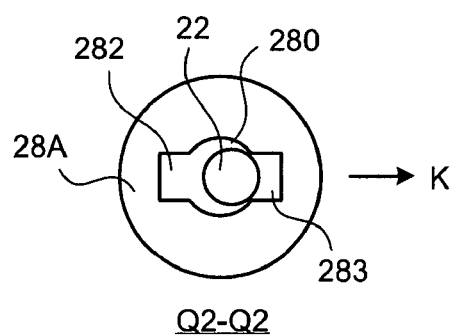
FIG. 32B is a fragmentary view taken along the line Q2-Q2 of FIG. 31.
Figure 32C:
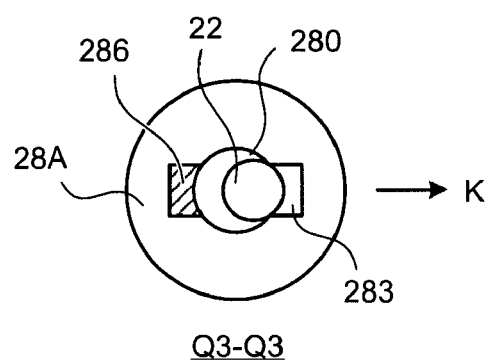
FIG. 32C is a fragmentary view taken along the line Q3-Q3 of FIG. 31.

FIG. 30 is a schematic sectional view of a structure for suppressing flow vibration of an instrumentation guide tube according to a twenty-first embodiment of the present invention. FIG. 31 is an enlarged view of a head nozzle of FIG. 30. FIG. 32A is a fragmentary view taken along the line Q1-Q1 of FIG. 31. FIG. 32B is a fragmentary view taken along the line Q2-Q2 of FIG. 31. FIG. 32C is a fragmentary view taken along the line Q3-Q3 of FIG. 31. Because the overall configuration of the reactor vessel is the same as that of the first embodiment (see FIG. 1), the illustrations and descriptions thereof will be omitted.

The structure for suppressing flow vibration of an instrumentation guide tube according to the present embodiment presses the thimble tube 22 against the inner circumference of a head nozzle 28A, by the differential pressure between the coolant at the opening portion of the head nozzle 28A mounted on the end on the core 17 side and the coolant outside side holes 210*a* and 210*b* provided at the side portion of the upper core support column 21.

As shown in FIG. 30, in the structure for suppressing flow vibration of an instrumentation guide tube according to the present embodiment, the upper core support column 21 includes a support column penetrating hole 21*a* that penetrates through the upper core support column 21 in the axis Zs direction, in other words through the upper core support column 21 in the longitudinal direction, and communicates with the opening portion 15*a* provided at the upper core plate 15. At the side portion of the upper core support column 21, the side holes 210*a* and 210*b* that make the support column penetrating hole 21*a* and the outside of the upper core support column 21 communicate with each other are provided. In the present embodiment, two side holes 210*a* and 210*b* are provided at the side portion of the upper core support column 21. However, the number of side holes is not limited thereto.

The lower end of the upper core support column 21, in other words, the end of the upper core support column 21 on the core 17 side is fixed to the leg unit 31. The head nozzle 28A is provided at the lower end of the upper core support column 21. The head nozzle 28A includes a head nozzle penetrating hole 280 (see FIGS. 32A to 32C) that penetrates through the head nozzle 28A in the axis Zn direction and communicates with the support column penetrating hole 21*a*. The head nozzle penetrating hole 280 inserts the thimble tube 22 inserted into the support column penetrating hole 21*a* therethrough, and guides the thimble tube 22 into the core 17. Accordingly, one end of the thimble tube 22 is inserted into the core 17.

As shown in FIGS. 31 and 32A to 32C, a coolant inlet 281 that introduces the coolant to the head nozzle penetrating hole 280 is provided at the head nozzle 28A on the core 17 side. The coolant inlet 281 of the head nozzle 28A communicates with the opening portion 15*a* of the upper core plate 15. The head nozzle 28A also includes a coolant outlet 284 that let the coolant introduced to the head nozzle penetrating hole 280 flow out to the support column penetrating hole 21*a*, at the head nozzle 28A on the upper core support column 21 side, and also on the side opposite to the axis Zn of the head nozzle 28A (in other words, axisymmetric position). The coolant outlet 284 is opened to the support column penetrating hole 21*a*.

An inlet side coolant passage 282 communicating with the head nozzle penetrating hole 280 and an outlet side coolant passage 283 communicating with the head nozzle penetrating hole 280 are formed in the head nozzle 28A. The coolant inlet 281 is an opening portion of the inlet side coolant passage 282 of the head nozzle 28A on the core 17 side. The coolant outlet 284 is an opening portion of the outlet side coolant passage 283 on the upper core support column 21 side. The inlet side coolant passage 282 is provided with an outlet side sealing unit 286 on the upper core support column 21 side. The outlet side coolant passage 283 is provided with an inlet side sealing unit 285 on the core 17 side.

The pressure P1 of the coolant on the core 17 side is higher than the pressure P2 of the coolant outside the upper core support column 21 interposing the upper core plate 15 therebetween. Accordingly, the coolant in the core 17 flows into the head nozzle penetrating hole 280 through the inlet side coolant passage 282 from the coolant inlet 281, and flows out to the outlet side coolant passage 283, due to the differential pressure between the coolant (coolant closer to the core 17 side than the opening portion of the head nozzle 28A) at the opening portion of the head nozzle 28A, in other words, the coolant inlet 281, and the coolant outside the side holes 210*a* and 210*b*. After flowing into the support column penetrating hole 21*a* from the coolant outlet 284 of the outlet side coolant passage 283, the coolant flows out to the outside of the upper core support column 21 from the side holes 210*a* and 210*b*.

The coolant on the core 17 side is prevented from flowing into the outlet side coolant passage 283 by the outlet side sealing unit 286. Accordingly, the coolant can be efficiently introduced into the inlet side coolant passage 282. The coolant in the inlet side coolant passage 282 is prevented from flowing into the support column penetrating hole 21*a* by the outlet side sealing unit 286. Consequently, the coolant in the inlet side coolant passage 282 can be efficiently introduced into the head nozzle penetrating hole 280.

The thimble tube 22 receives the pressing force towards the outlet side coolant passage 283 side, while the coolant flows into the head nozzle penetrating hole 280 through the inlet side coolant passage 282, and flows out to the outlet side coolant passage 283 (arrows K in FIGS. 31 and 32A to 32C). Accordingly, the thimble tube 22 is pressed against the inner circumference of the head nozzle 28A on the outlet side coolant passage 283 side, in other words, the inner circumference of the head nozzle penetrating hole 280. In this manner, in the present embodiment, the thimble tube 22 is pressed against the inner circumference of the head nozzle 28A on the outlet side coolant passage 283 side, by the differential pressure between the coolant on the opening portion side of the head nozzle 28A and the coolant outside the side holes 210*a* and 210*b*. Consequently, it is possible to suppress the flow vibration of the thimble tube 22, thereby preventing the thimble tube 22 from being worn out.

As shown in FIGS. 32A to 32C, in the present embodiment, the coolant inlet 281 and the coolant outlet 284 are provided on the sides opposite to the axis Zn of the head nozzle 28A (axisymmetric position). Accordingly, the inlet side coolant passage 282 and the outlet side coolant passage 283 are provided at the positions opposite to the axis Zn of the head nozzle 28A (axisymmetric position). By forming in this manner, the inlet side coolant passage 282 and the outlet side coolant passage 283 are arranged on the same straight line. Accordingly, it is possible to press the thimble tube 22 against the inner circumference of the head nozzle 28A on the outlet side coolant passage 283 side, by efficiently applying the pressure of the coolant to the thimble tube 22 in the head nozzle penetrating hole 280. As a result, it is possible to more reliably suppress the flow vibration of the thimble tube 22, thereby preventing the thimble tube 22 from being worn out.

As shown in FIG. 31, an area (pressure receiving area) where the thimble tube 22 receives the pressure of the coolant can be changed, by changing a distance H from the coolant inlet 281 to the outlet side sealing unit 286. Accordingly, an absolute value of the force that the thimble tube 22 receives from the coolant can be changed. In this manner, with the present embodiment, the pressing force applied to the thimble tube 22 can easily be changed.

[First Modification]

Figure 33A:
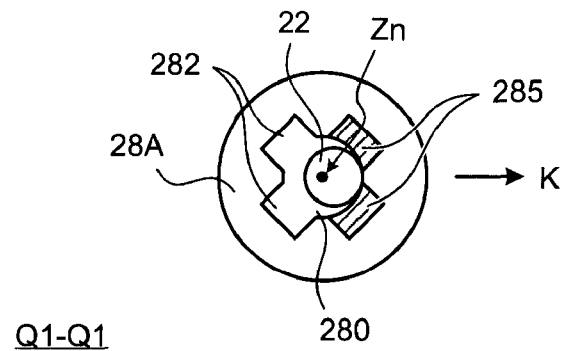
FIG. 33A is a schematic for explaining a structure for suppressing flow vibration of an instrumentation guide tube according to a first modification of the twenty-first embodiment.
Figure 33B:
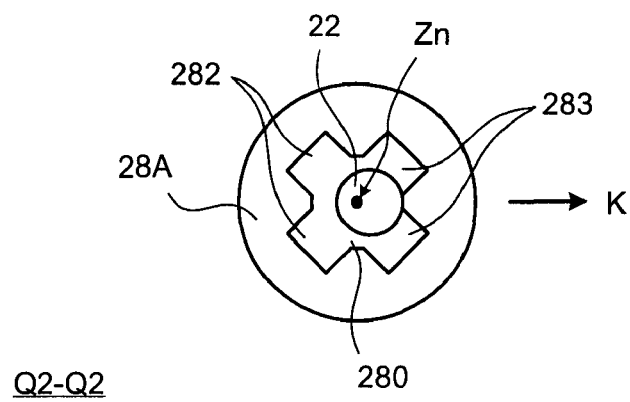
FIG. 33B is another schematic for explaining the structure for suppressing flow vibration of an instrumentation guide tube according to the first modification of the twenty-first embodiment.
Figure 33C:
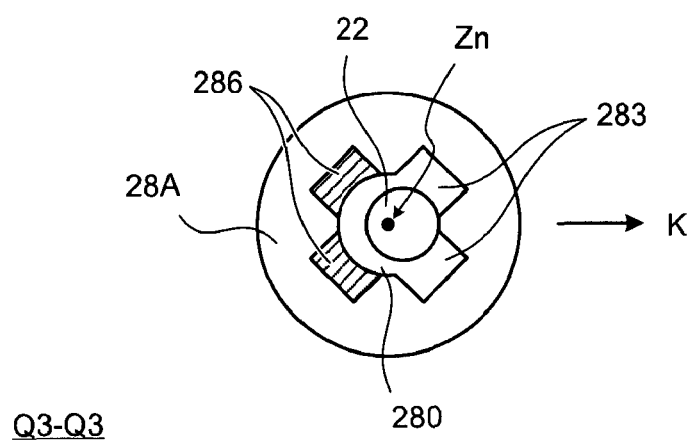
FIG. 33C is still another schematic for explaining the structure for suppressing flow vibration of an instrumentation guide tube according to the first modification of the twenty-first embodiment.

FIGS. 33A to 33C are schematics for explaining a structure for suppressing flow vibration of an instrumentation guide tube according to a first modification of the twenty-first embodiment. The structure for suppressing flow vibration of an instrumentation guide tube according to the present modification is substantially the same as that of the twenty-first embodiment. However, the present modification is different from the twenty-first embodiment in including the coolant inlet 281 and the inlet side coolant passage 282, and the coolant outlet 284 and the outlet side coolant passage 283 in plurality at the head nozzle 28A. Because the other components are the same as those in the twenty-first embodiment, the same reference numerals are given to the same parts, and their repeated detailed descriptions will be omitted.

As shown in FIG. 33A, the head nozzle 28A includes two inlet side coolant passages 282 and two coolant inlets 281 (see FIG. 31) that are opening portions of the inlet side coolant passages 282 on the core side. As shown in FIG. 33C, the head nozzle 28A also includes two outlet side coolant passages 283 and two coolant outlets 284 (see FIG. 31) that are opening portions of the outlet side coolant passages 283 at the support column penetrating hole 21a. Each outlet side sealing unit 286 is provided at the inlet side coolant passage 282 on the upper core support column 21 side. Each inlet side sealing unit 285 is provided at the outlet side coolant passage 283 on the core 17 side. In this manner, in the present modification, the head nozzle 28A includes a pair of the inlet side coolant passages 282 and a pair of the outlet side coolant passages 283.

The pair of inlet side coolant passages 282 and the pair of the outlet side coolant passages 283 are provided on the sides opposite to the axis Zn of the head nozzle 28A (axisymmetric position). The two inlet side coolant passages 282 are provided at the same side with respect to the plane that goes through the axis Zn of the head nozzle 28A, and the two outlet side coolant passages 283 are provided on the side opposite to the plane. Accordingly, the pressing force (force in the direction of the arrows K in FIGS. 33A to 33C) towards the outlet side coolant passages 283 from the inlet side coolant passages 282 can be applied to the thimble tube 22, by the coolant introduced into the head nozzle penetrating hole 280 from the inlet side coolant passages 282. Consequently, the thimble tube 22 in the head nozzle penetrating hole 280 can be pressed towards the outlet side coolant passages 283 side.

The structure for suppressing flow vibration of an instrumentation guide tube according to the present modification includes the coolant inlets 281 and the inlet side coolant passages 282, and the coolant outlets 284 and the outlet side coolant passages 283. Accordingly, the pressure receiving area of the thimble tube 22 can be increased, thereby increasing the pressing force that the thimble tube 22 receives from the coolant. As a result, the thimble tube 22 is pressed against the inner circumference of the head nozzle 28A, in other words, against the inner circumference of the head nozzle penetrating hole 280 with a larger force. Consequently, it is possible to more reliably suppress the flow vibration of the thimble tube 22, thereby preventing the thimble tube 22 from being worn out.

[Second Modification]

Figure 34:
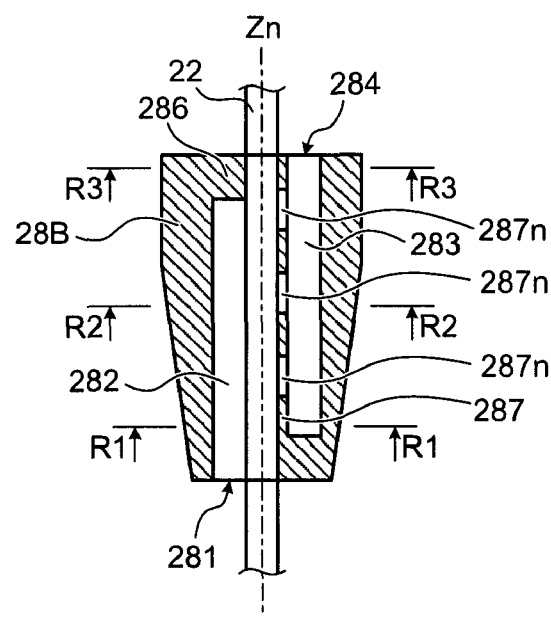
FIG. 34 is a schematic sectional view of a head nozzle included in the structure for suppressing flow vibration of an instrumentation guide tube according to the first modification of the twenty-first embodiment.
Figure 35A:
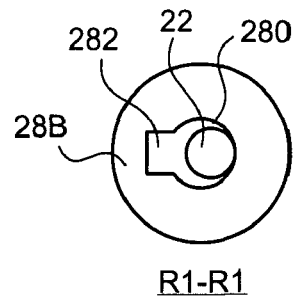
FIG. 35A is a fragmentary view taken along the line R1-R1 of FIG. 34.
Figure 35B:
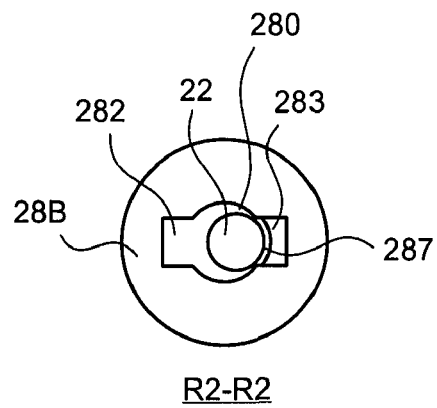
FIG. 35B is a fragmentary view taken along the line R2-R2 of FIG. 34.
Figure 35C:
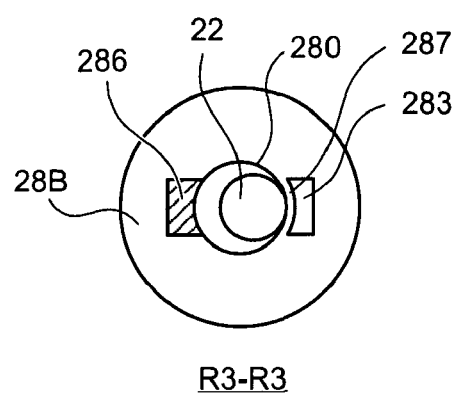
FIG. 35C is a fragmentary view taken along the line R3-R3 of FIG. 34.

FIG. 34 is a schematic sectional view of a head nozzle included in the structure for suppressing flow vibration of an instrumentation guide tube according to the first modification of the twenty-first embodiment. FIG. 35A is a fragmentary view taken along the line R1-R1 of FIG. 34. FIG. 35B is a fragmentary view taken along the line R2-R2 of FIG. 34. FIG. 35C is a fragmentary view taken along the line R3-R3 of FIG. 34.

The structure for suppressing flow vibration of an instrumentation guide tube according to the present modification is substantially the same as that of the twenty-first embodiment. However, the present modification is different from the twenty-first embodiment in including a partition member 287 between the head nozzle penetrating hole 280 and the outlet side coolant passage 283. Because the other components are the same as those in the twenty-first embodiment, the same reference numerals are given to the same parts, and their repeated detailed descriptions will be omitted.

As shown in FIGS. 34, 35B and 35C, the partition member 287 that separates the head nozzle penetrating hole 280 and the outlet side coolant passage 283 included in a head nozzle 28B is provided therebetween. The partition member 287 includes a plurality of partition member opening portions 287n that let the coolant flow into the outlet side coolant passage 283 from the head nozzle penetrating hole 280. Accordingly, the coolant flowing into the head nozzle penetrating hole 280 from the inlet side coolant passage 282 flows out to the outlet side coolant passage 283 through the partition member opening portions 287n, and flows out to the support column penetrating hole 21a from the coolant outlet 284.

With such a configuration, the pressing force towards the outlet side coolant passage 283 from the inlet side coolant passage 282 is applied to the thimble tube 22, by the coolant introduced into the head nozzle penetrating hole 280 from the inlet side coolant passage 282. Accordingly, the thimble tube 22 in the head nozzle penetrating hole 280 is pressed against the inner circumference of the head nozzle 28B, more specifically, against the partition member 287. Consequently, it is possible to suppress the flow vibration of the thimble tube 22, thereby preventing the thimble tube 22 from being worn out. In the present modification, because the thimble tube 22 is received at the surface of the partition member 287, it is possible to prevent local stress concentration of the thimble tube 22.

[Third Modification]

Figure 36:
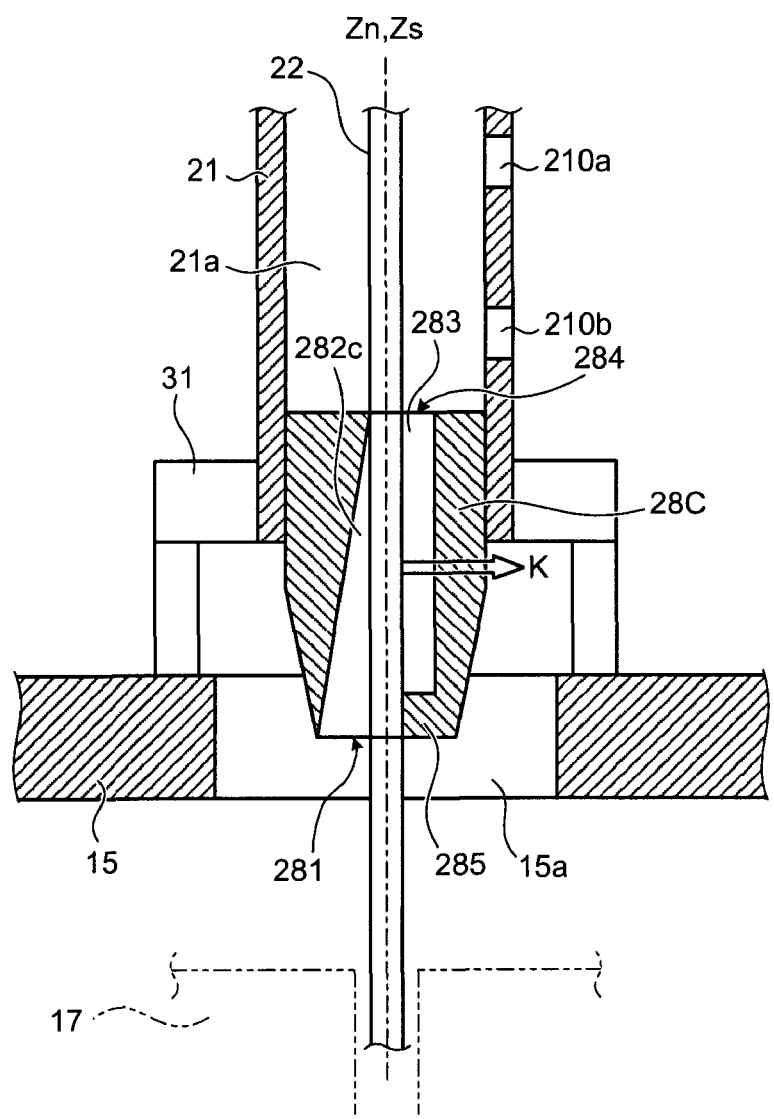
FIG. 36 is a schematic sectional view of a structure for suppressing flow vibration of an instrumentation guide tube according to a third modification of the twenty-first embodiment.

FIG. 36 is a schematic sectional view of a structure for suppressing flow vibration of an instrumentation guide tube according to a third modification of the twenty-first embodiment. The structure for suppressing flow vibration of an instrumentation guide tube according to the present modification is substantially the same as that of the twenty-first embodiment. However, the present modification is different from the twenty-first embodiment in forming an inlet side coolant passage 282c included in a head nozzle 28C, so that an opening area having a cross section perpendicular to the axis Zn of the head nozzle 28C gradually increases, towards the end of the head nozzle 28C on the core side from the upper core support column 21 side. Because the other components are the same as those in the twenty-first embodiment, the same reference numerals are given to the same parts, and their repeated detailed descriptions will be omitted.

As the inlet side coolant passage 282 (see FIG. 31) shown in the twenty-first embodiment, if the opening area of the cross section perpendicular to the axis Zn of the head nozzle 28C is constant, the pressure of the coolant in the inlet side coolant passage 282 is increased towards the outlet side sealing unit 286 side shown in FIG. 31. Accordingly, the pressing force applied to the thimble tube 22 is increased towards the outlet side sealing unit 286 side from the coolant inlet 281 side. Consequently, imbalance of the pressing force may occur.

In the present modification, the opening area having a cross section of the inlet side coolant passage 282c perpendicular to the axis Zn of the head nozzle 28C gradually increases towards the coolant inlet 281 side from the support column penetrating hole 21a of the upper core support column 21. Accordingly, the strength of the pressing force applied to the thimble tube 22 can be made approximately the same towards the outlet side sealing unit 286 side from the coolant inlet 281 side so that imbalance of the pressing force can be suppressed. As a result, it is possible to more stably suppress the flow vibration of the thimble tube 22, thereby preventing the thimble tube 22 from being worn out.

[Fourth Modification]

Figure 37:
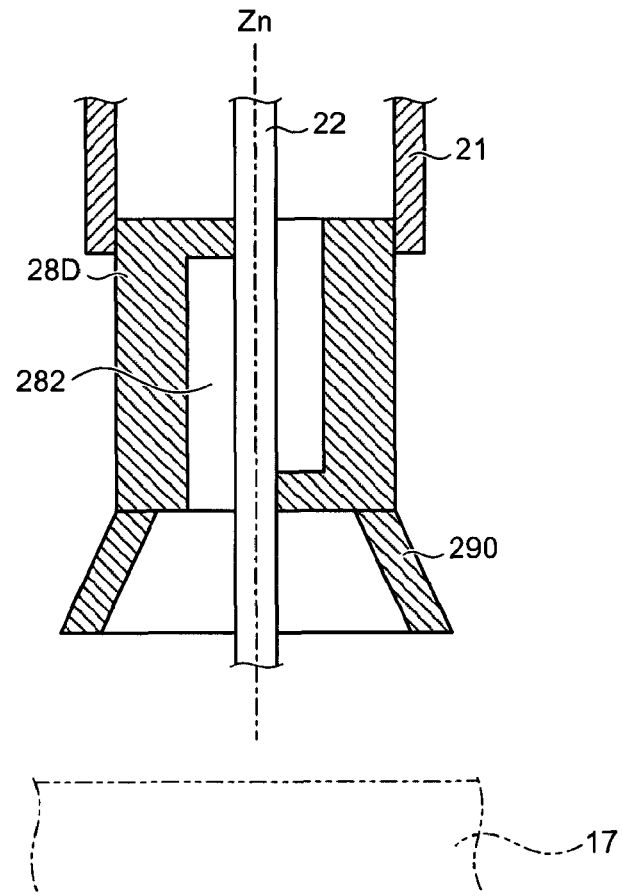
FIG. 37 is a schematic sectional view of a head nozzle included in a structure for suppressing flow vibration of an instrumentation guide tube according to a fourth modification of the twenty-first embodiment.

FIG. 37 is a schematic sectional view of a head nozzle included in a structure for suppressing flow vibration of an instrumentation guide tube according to a fourth modification of the twenty-first embodiment. The structure for suppressing flow vibration of an instrumentation guide tube according to the present modification is substantially the same as that of the twenty-first embodiment. However, the present modification is different from the twenty-first embodiment in forming an inner surface of a head nozzle 28D on the core side (core side head nozzle) 290, so that an opening area having a cross section perpendicular to the axis Zn of the head nozzle 28D gradually increases towards the end of the head nozzle 28D on the core 17 side from the upper core support column 21 side. Because the other components are the same as those in the twenty-first embodiment, the same reference numerals are given to the same parts, and their repeated detailed descriptions will be omitted.

By forming the head nozzle on the core side 290 as described above, the coolant from the core 17 is effectively supplied to the inlet side coolant passage 282 of the head nozzle 28D. Accordingly, the thimble tube 22 can be pressed against the inner circumference of the head nozzle 28D by the coolant more reliably. Consequently, it is possible to more reliably suppress the flow vibration of the thimble tube 22, thereby preventing the thimble tube 22 from being worn out.

Twenty-Second Embodiment

Figure 38:
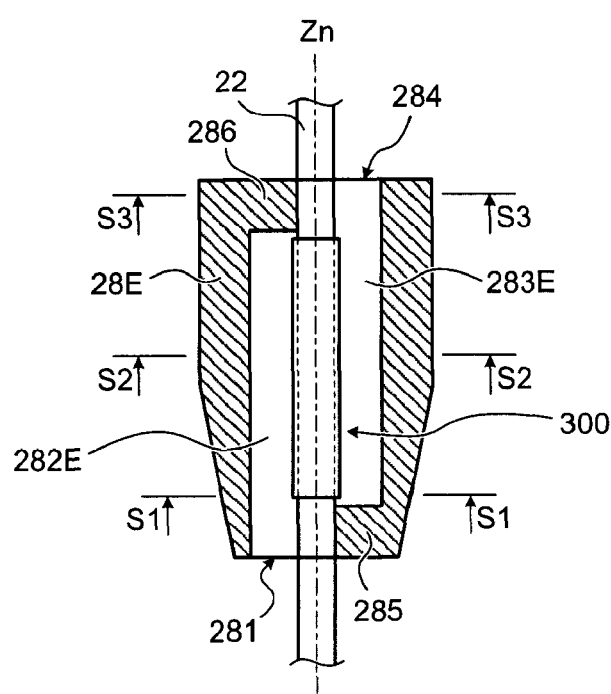
FIG. 38 is a schematic sectional view of a structure for suppressing flow vibration of an instrumentation guide tube according to a twenty-second embodiment of the present invention.
Figure 39A:
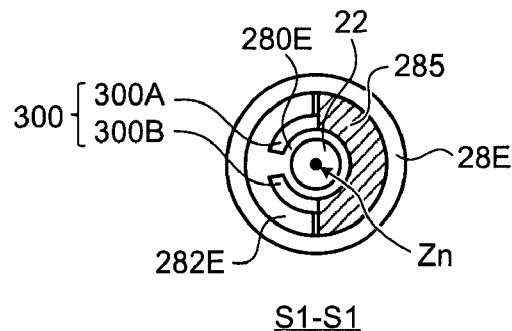
FIG. 39A is a fragmentary view taken along the line S1-S1 of FIG. 38.
Figure 39B:
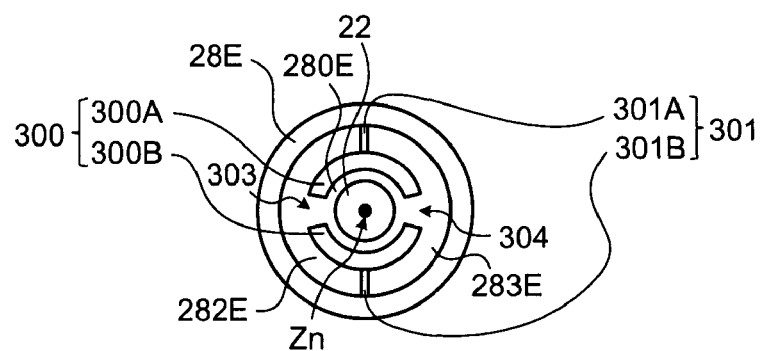
FIG. 39B is a fragmentary view taken along the line S2-S2 of FIG. 38.
Figure 39C:
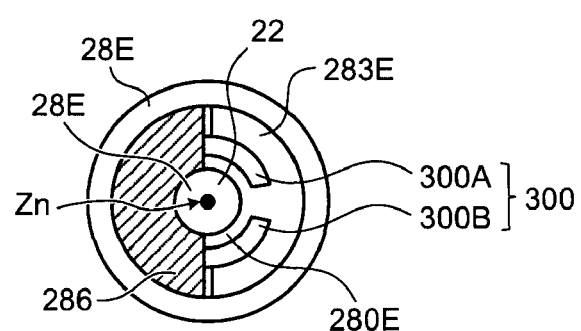
FIG. 39C is a fragmentary view taken along the line S3-S3 of FIG. 38.
Figure 40:
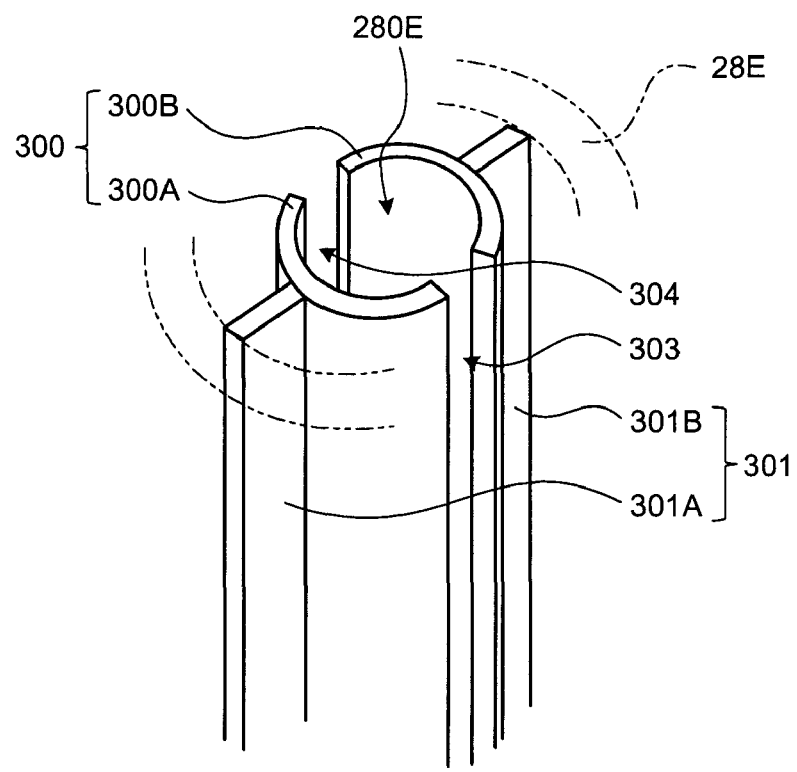
FIG. 40 is a perspective view of a support structure of a thimble tube included in the structure for suppressing flow vibration of an instrumentation guide tube according to the twenty-second embodiment of the present invention.

FIG. 38 is a schematic sectional view of a structure for suppressing flow vibration of an instrumentation guide tube according to a twenty-second embodiment of the present invention. FIG. 35A is a fragmentary view taken along the line S1-S1 of FIG. 38. FIG. 35B is a fragmentary view taken along the line S2-S2 of FIG. 38. FIG. 35C is a fragmentary view taken along the line S3-S3 of FIG. 38. FIG. 40 is a perspective view of a support structure of a thimble tube included in the structure for suppressing flow vibration of an instrumentation guide tube according to the twenty-second embodiment of the present invention.

The structure for suppressing flow vibration of an instrumentation guide tube according to the twenty-second embodiment is substantially the same as that of the twenty-first embodiment. However, the twenty-second embodiment is different from the twenty-first embodiment in including an instrumentation guide tube holder 300 arranged in a nozzle space formed in a head nozzle 28E, and a barrier 301 provided between the inner surface of the nozzle space and the instrumentation guide tube holder 300, and divides the nozzle space into the side of the coolant inlet 281 and the side of the coolant outlet 284. Because the other components are the same as those in the twenty-first embodiment, the same reference numerals are given to the same parts, and their repeated detailed descriptions will be omitted. Because the overall configuration of the reactor vessel is the same as that of the first embodiment (see FIG. 1), the illustrations and descriptions thereof will be omitted.

As shown in FIG. 38, the head nozzle 28E that forms the structure for suppressing flow vibration of an instrumentation guide tube according to the present embodiment includes the instrumentation guide tube holder 300 that holds the thimble tube 22, which is an instrumentation guide tube, therein. The nozzle space is provided outside the instrumentation guide tube holder 300 and the inside of the head nozzle 28E. In the present embodiment, an inlet side coolant passage 282E and an outlet side coolant passage 283E correspond to the nozzle space. The inlet side coolant passage 282E communicates with the coolant inlet 281, and the outlet side coolant passage 283E communicates with the coolant outlet 284.

As shown in FIGS. 35A to 35C and 40, the instrumentation guide tube holder 300 includes a first holder 300A and a second holder 300B. The first holder 300A and the second holder 300B are bent plates whose shapes having a cross-section perpendicular to the longitudinal direction are arcs. The instrumentation guide tube holder 300 is arranged in the nozzle space of the head nozzle 28E, so that the ends of the first holder 300A and the second holder 300B are opposed to each other, on the side in the longitudinal direction at a predetermined interval.

The barrier 301 that divides the nozzle space into the side of the coolant inlet 281 and the side of the coolant outlet 284 is provided between the inner surface of the head nozzle space and the instrumentation guide tube holder 300. The barrier 301 includes a first barrier 301A and a second barrier 301B, which are plate-shaped members. The first barrier 301A and the second barrier 301B are fixed to the first holder 300A and the second holder 300B, respectively, and also fixed to the inner surface of the nozzle space. Accordingly, the first barrier 301A and the second barrier 301B, in other words, the barrier 301, holds the first holder 300A and the second holder 300B, in other words, the instrumentation guide tube holder 300, in the nozzle space of the head nozzle 28E. As shown in FIGS. 35A to 35C and 40, the space surrounded by the first holder 300A and the second holder 300B is a head nozzle penetrating hole 280E, and the thimble tube 22 is inserted therethrough.

In the present embodiment, the instrumentation guide tube holder 300 and the barrier 301 are bonded and integrated by a bonding unit, such as by welding. The barrier 301 is bonded and integrated to the inner surface of the nozzle space of the head nozzle 28E by a bonding unit, such as by welding. In this manner, in the present embodiment, the instrumentation guide tube holder 300 and the barrier 301 are bonded and integrated to the head nozzle 28E, thereby forming a part of the head nozzle 28E.

A portion where the ends of the first holder 300A and the second holder 300B are opposed to each other, at one side in the longitudinal direction at a predetermined interval, is a coolant inflow port 303. A portion where the ends of the first holder 300A and the second holder 300B are opposed to each other, at the other side in the longitudinal direction at a predetermined interval, is a coolant outflow port 304. In this manner, the coolant inflow port 303 and the coolant outflow port 304 are provided at the outer circumferential portion of the instrumentation guide tube holder 300.

The coolant inflow port 303 communicates with the nozzle space on the coolant inlet 281 side divided by the barrier 301, in other words, the inlet side coolant passage 282E. The coolant outflow port 304 communicates with the nozzle space on the coolant outlet 284 side divided by the barrier 301, in other words, the outlet side coolant passage 283E.

As shown in FIGS. 38 and 35A to 35C, the outlet side sealing unit 286 is provided at the inlet side coolant passage 282E, on the upper core support column 21 side (see FIG. 30). The inlet side sealing unit 285 is provided at the outlet side coolant passage 283, on the core 17 side. The coolant on the core side is prevented from flowing into the outlet side coolant passage 283 by the outlet side sealing unit 286, and flows into the inlet side coolant passage 282E through the coolant inlet 281. At this time, because the inlet side coolant passage 282E and the outlet side cooling passage 283E are divided by the barrier 301, the coolant flowing into the inlet side coolant passage 282E is prevented from flowing into the outlet side coolant passage 283E. The coolant flowing into the inlet side coolant passage 282E flows into the inside of the instrumentation guide tube holder 300, in other words, in the head nozzle penetrating hole 280E, from the coolant inflow port 303.

The coolant flowing into the head nozzle penetrating hole 280 flows out to the outlet side coolant passage 283E from the coolant outflow port 304. At this time, the coolant applies the pressing force towards the coolant outflow port 304, to the thimble tube 22 inserted into the head nozzle penetrating hole 280E. Accordingly, the thimble tube 22 is pressed against the coolant outflow port 304, in other words, the longer side ends of the first holder 300A and the second holder 300B. Because the first holder 300A and the second holder 300B form a part of the head nozzle 28E, the thimble tube 22 is pressed against the inner circumference of the head nozzle 28E. Accordingly, with the present embodiment, it is possible to suppress the flow vibration of the thimble tube 22, thereby preventing the thimble tube 22 from being worn out.

Twenty-Third Embodiment

Figure 41:
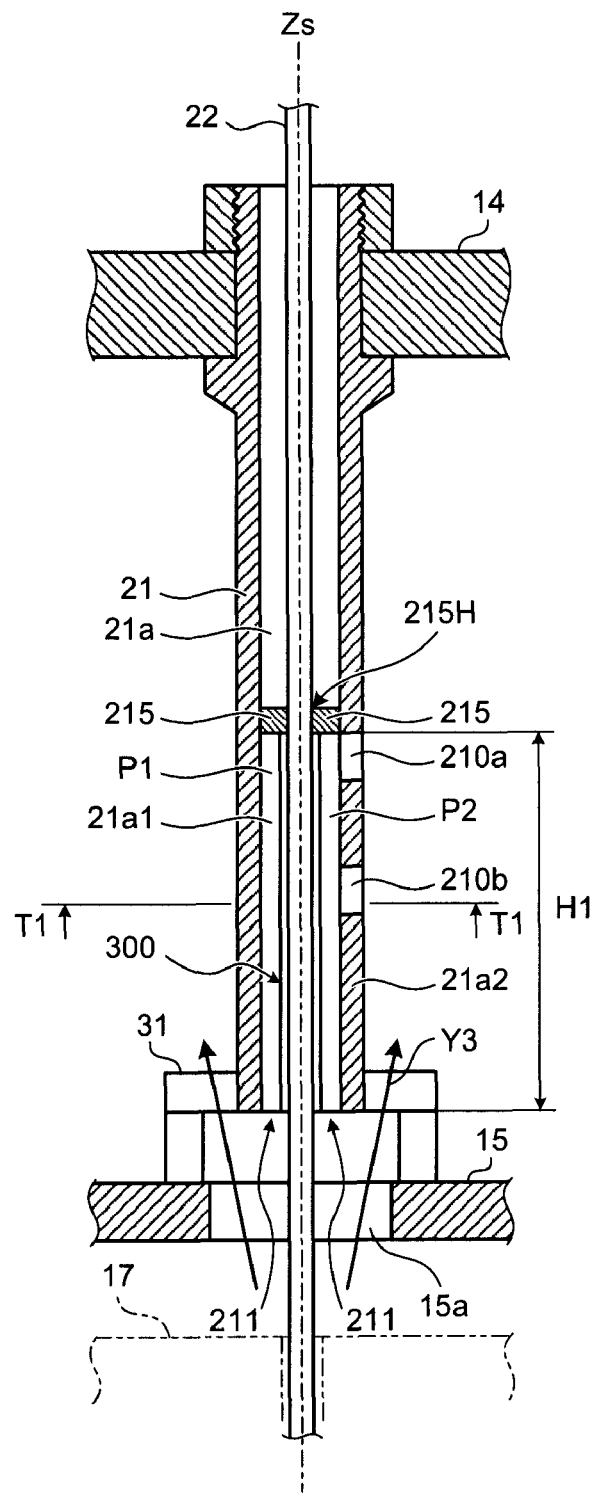
FIG. 41 is a schematic sectional view of a structure for suppressing flow vibration of an instrumentation guide tube according to a twenty-third embodiment of the present invention.
Figure 42:
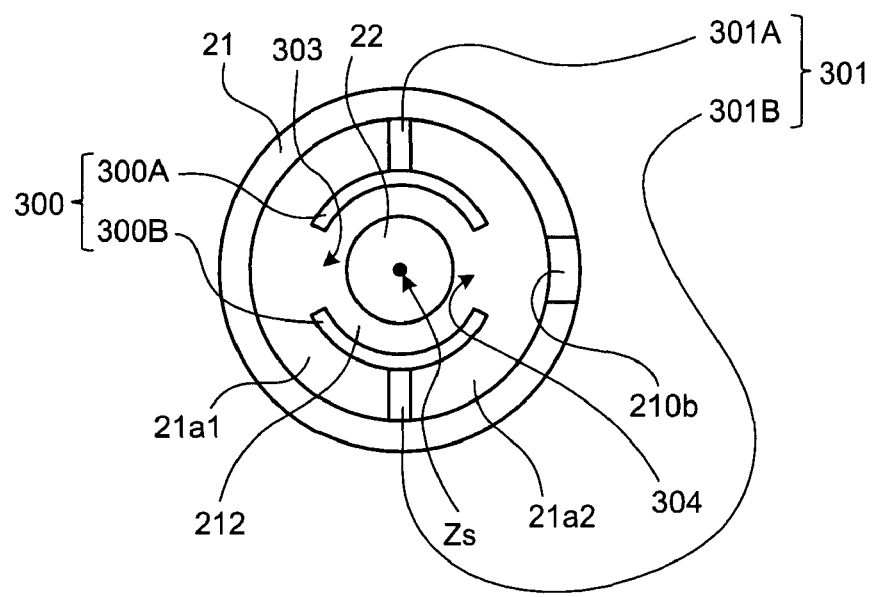
FIG. 42 is a fragmentary view taken along the line T1-T1 of FIG. 41.
Figure 43:
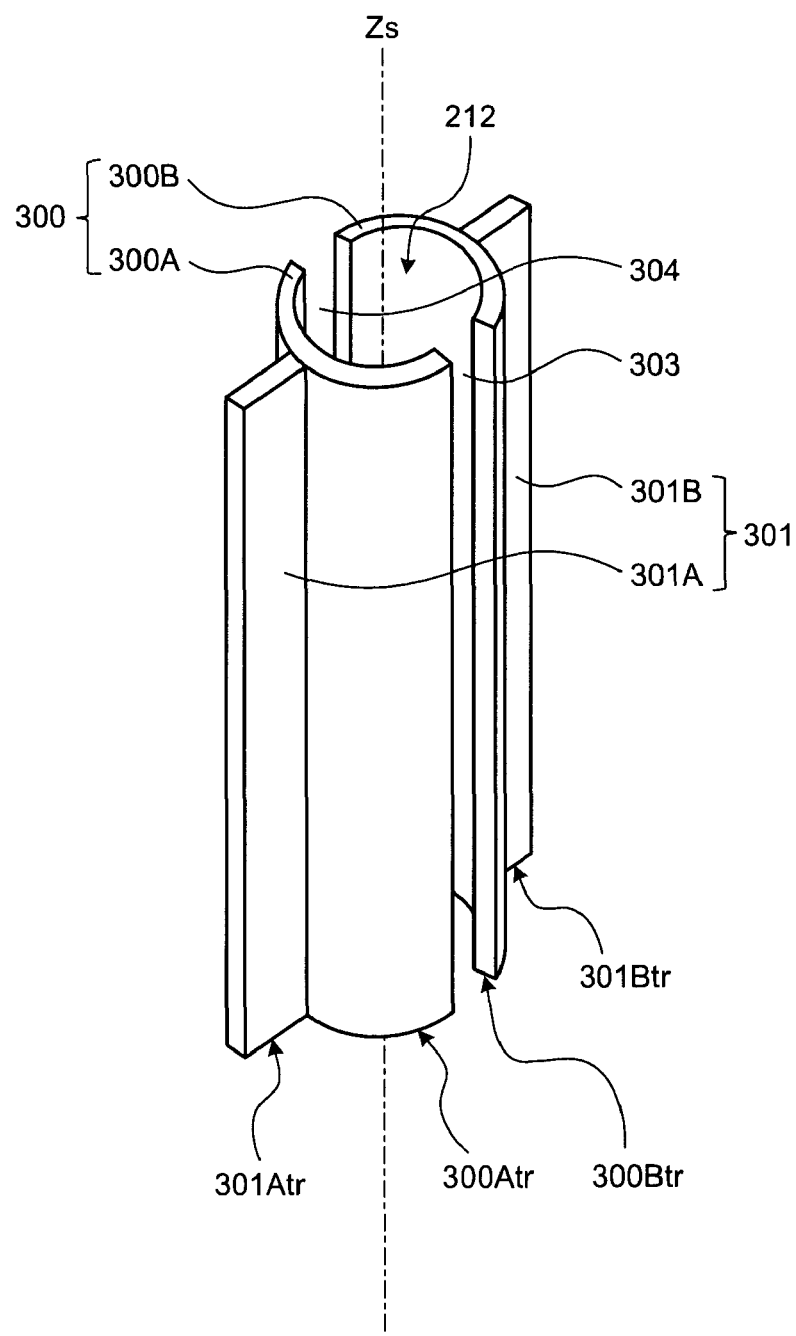
FIG. 43 is a perspective view of a support structure of a thimble tube included in the structure for suppressing flow vibration of an instrumentation guide tube according to the twenty-third embodiment of the present invention.

FIG. 41 is a schematic sectional view of a structure for suppressing flow vibration of an instrumentation guide tube according to a twenty-third embodiment of the present invention. FIG. 42 is a fragmentary view taken along the line T1-T1 of FIG. 41. FIG. 43 is a perspective view of a support structure of a thimble tube included in the structure for suppressing flow vibration of an instrumentation guide tube according to the twenty-third embodiment of the present invention.

The structure for suppressing flow vibration of an instrumentation guide tube according to the twenty-third embodiment is substantially the same as that of the twenty-first embodiment. However, the twenty-third embodiment is different from the twenty-first embodiment in arranging the instrumentation guide tube holder 300 through which the thimble tube 22 is inserted, in the support column penetrating hole 21a provided in the upper core support column 21, and pressing the thimble tube 22 against the instrumentation guide tube holder 300, by using the differential pressure between the coolant flowing in the support column penetrating hole 21a. Because the other components are the same as those in the twenty-first embodiment, the same reference numerals are given to the same parts, and their repeated detailed descriptions will be omitted. Because the overall configuration of the reactor vessel is the same as that of the first embodiment (see FIG. 1), the illustrations and descriptions thereof will be omitted.

As shown in FIG. 41, the upper core support column 21 that forms the structure for suppressing flow vibration of an instrumentation guide tube according to the present embodiment includes the instrumentation guide tube holder 300 that holds the thimble tube 22, which is an instrumentation guide tube, in the support column penetrating hole 21a. In the support column penetrating hole 21a, a coolant blocking member 215 arranged on the side closer to the upper core support plate 14 than the side holes 210a and 210b, and blocking the coolant flowing in the support column penetrating hole 21a is provided. An insertion hole 215H that inserts the thimble tube 22 therethrough is formed in the coolant blocking member 215, and an end of the thimble tube 22 inserted through the support column penetrating hole 21a is inserted into the core 17, after the thimble tube 22 is inserted through the insertion hole 215H.

As shown in FIGS. 42 and 43, the instrumentation guide tube holder 300 includes the first holder 300A and the second holder 300B. The first holder 300A and the second holder 300B are bent plates whose shapes having a cross-section perpendicular to the longitudinal direction are arcs. The instrumentation guide tube holder 300 is arranged in the support column penetrating hole 21a, so that the ends of the first holder 300A and the second holder 300B are opposed to each other, on the sides in the longitudinal direction at a predetermined interval.

The barrier 301 that divides the inside of the support column penetrating hole 21a into a space (second support column space) 21a2 on the side where the side holes 210a and 210b are provided, and a space (first support column space) 21a1 on the side where the side holes 210a and 210b are not provided, is provided between the inner surface of the support column penetrating hole 21a and the instrumentation guide tube holder 300. The barrier 301 includes the first barrier 301A and the second barrier 301B, which are plate-shaped members.

The instrumentation guide tube holder 300 and the barrier 301 are provided on the side closer to the core 17 than the coolant blocking member 215. In this manner, on the side closer to the core 17 than the coolant blocking member 215, the support column penetrating hole 21a includes the first support column space 21a1 and the second support column space 21a2.

The first barrier 301A and the second barrier 301B are fixed to the first holder 300A and the second holder 300B, respectively, and also fixed to the inner surface of the support column penetrating hole 21a. Accordingly, the first barrier 301A and the second barrier 301B, in other words, the barrier 301 holds the first holder 300A and the second holder 300B, in other words, the instrumentation guide tube holder 300 in the support column penetrating hole 21a. As shown in FIGS. 42 and 43, the thimble tube 22 is inserted through a space (holder space) 212 surrounded by the first holder 300A and the second holder 300B.

In the present embodiment, the instrumentation guide tube holder 300 and the barrier 301 are bonded and integrated by a bonding unit such as by welding. The barrier 301 is bonded and integrated to the inner surface of the support column penetrating hole 21a, by a bonding unit such as by welding. In this manner, in the present embodiment, the instrumentation guide tube holder 300 and the barrier 301 are bonded and integrated with the upper core support column 21, thereby forming a part of the upper core support column 21.

A portion where the ends of the first holder 300A and the second holder 300B are opposed to each other, at one side in the longitudinal direction at a predetermined interval, is the coolant inflow port 303. A portion where the ends of the first holder 300A and the second holder 300B are opposed to each other, at the other side in the longitudinal direction at a predetermined interval, is the coolant outflow port 304. In this manner, the coolant inflow port 303 and the coolant outflow port 304 are provided at the outer circumferential portion of the instrumentation guide tube holder 300.

The coolant inflow port 303 communicates with the first support column space 21a1 divided by the barrier 301. The coolant outflow port 304 communicates with the second support column space 21a2 divided by the barrier 301. The coolant on the core 17 side shown in FIG. 41, flows into the first support column space 21a1 and the second support column space 21a2 that form the support column penetrating hole 21a, from the opening portion of the end of the upper core support column 21 on the core 17 side.

Because the second support column space 21a2 is a space on the side where the side holes 210a and 210b are provided, the coolant therein flows out to the outside of the second support column space 21a2 from the side holes 210a and 210b. Consequently, the pressure of the coolant in the second support column space 21a2 becomes lower than the pressure of the coolant at the opening portion 15a of the upper core plate 15. Alternatively, because the first support column space 21a1 is a space on the side where the side holes 210a and the 210b are not provided, the pressure of the coolant therein is higher than the pressure of the coolant in the second support column space 21a2.

Accordingly, the coolant in the first support column space 21a1 flows into the holder space 212 of the instrumentation guide tube holder 300 through the coolant inflow port 303, and then flows out to the second support column space 21a2 from the coolant outflow port 304. The coolant then flows out to the outside of the second support column space 21a2 from the side holes 210a and 210b. During the procedure, the coolant applies the pressing force towards the coolant outflow port 304, to the thimble tube 22 inserted through the holder space 212 of the instrumentation guide tube holder 300. Consequently, the thimble tube 22 is pressed towards the coolant outflow port 304, in other words, against the inner circumference of the instrumentation guide tube holder 300, more specifically, against the longer side ends and the inner circumference sides of the first holder 300A and the second holder 300B. As a result, in the present embodiment, it is possible to suppress the flow vibration of the thimble tube 22, thereby preventing the thimble tube 22 from being worn out. Because the head nozzle 28 used in the twenty-first embodiment and the like is not necessary, thereby simplifying the structure for suppressing flow vibration of an instrumentation guide tube.

By changing a distance H1 from the end of the upper core support column 21 on the core 17 side to the coolant blocking member 215, the receiving area where the thimble tube 22 receives the pressure of the coolant can be changed. Accordingly, an absolute value of the force that the thimble tube 22 receives from the coolant can be changed. In this manner, with the present embodiment, the pressing force applied to the thimble tube 22 can easily be changed.

Because the coolant is blocked by the coolant blocking member 215, the pressure of the coolant is increased at the portion of the coolant blocking member 215 in the support column penetrating hole 21a, and the pressure of the coolant is decreased on the core 17 side, in other words, on the inlet side of the coolant. Accordingly, by adjusting the position of the coolant blocking member 215, the pressure of the coolant on the inlet side of the coolant can be increased. Consequently, it is possible to reduce the distance from the coolant blocking member 215 to the coolant inlet.

[First Modification]

Figure 44A:
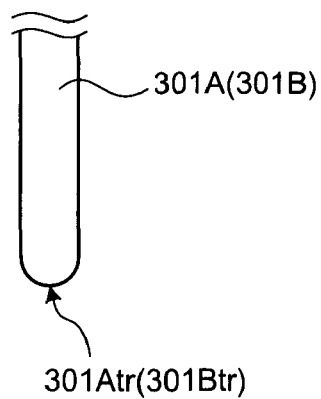
FIG. 44A is a schematic for explaining a structure for suppressing flow vibration of an instrumentation guide tube according to a first modification of the twenty-third embodiment.
Figure 44B:
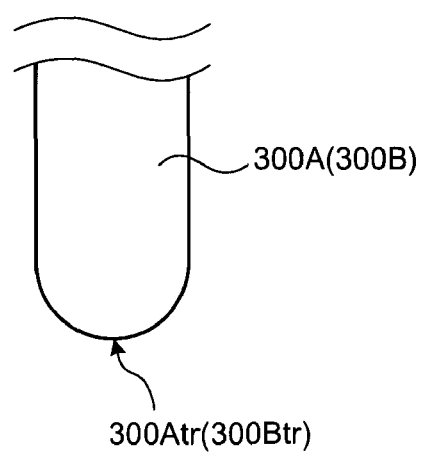
FIG. 44B is another schematic for explaining the structure for suppressing flow vibration of an instrumentation guide tube according to the first modification of the twenty-third embodiment.

FIGS. 44A and 44B are schematics for explaining a structure for suppressing flow vibration of an instrumentation guide tube according to a first modification of the twenty-third embodiment. The structure for suppressing flow vibration of an instrumentation guide tube according to the present modification is substantially the same as that of the twenty-third embodiment. However, the present modification is different from the twenty-third embodiment in forming, by a curved surface, at least one of ends 301Atr, 301Btr of the barrier 301 and ends 300Atr, 300Btr of the instrumentation guide tube holder 300 on the core side, in other words, on the side where the coolant flows into the support column penetrating hole 21a of the upper core support column 21. Because the other components are the same as those in the twenty-third embodiment, the same reference numerals are given to the same parts, and their repeated detailed descriptions will be omitted.

As shown in FIG. 44A, the end 301Atr or 301Btr (see FIGS. 43 and 44A) of the barrier 301 on the core 17 side (see FIG. 41) is formed by a curved surface. More preferably, the end 301Atr or 301Btr is a streamline. As shown in FIG. 44B, the end 300Atr or 300Btr (see FIGS. 43 and 44B) of the instrumentation guide tube holder 300 on the core 17 side (see FIG. 41) is a curved surface. More preferably, the end 300Atr or 300Btr is a streamline.

In this manner, the coolant that flows into the support column penetrating hole 21a (first support column space 21a1 and second support column space 21a2) can be prevented from being removed, at the ends 301Atr, 301Btr of the barrier 301 and at the ends 300Atr, 300Btr of the instrumentation guide tube holder 300. Accordingly, it is possible to suppress the flow vibration of the thimble tube 22 more effectively.

[Second Modification]

Figure 45:
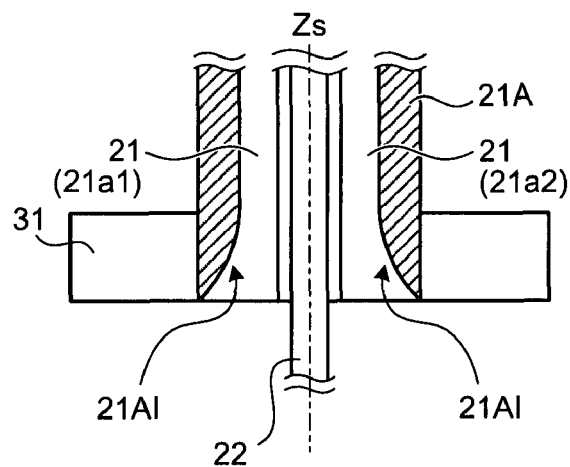
FIG. 45 is a schematic for explaining a structure for suppressing flow vibration of an instrumentation guide tube according to a second modification of the twenty-third embodiment.

FIG. 45 is a schematic for explaining a structure for suppressing flow vibration of an instrumentation guide tube according to a second modification of the twenty-third embodiment. The structure for suppressing flow vibration of an instrumentation guide tube according to the present modification is substantially the same as that of the twenty-third embodiment. However, the present modification is different from the twenty-third embodiment in forming an inner surface 21AI of the support column penetrating hole 21a at an upper core support column 21A on the core side, in a bell-mouth shape. Because the other components are the same as those in the twenty-third embodiment, the same reference numerals are given to the same parts, and their repeated detailed descriptions will be omitted. In the present modification, the support column penetrating hole 21a on the core side includes the first support column space 21a1 and the second support column space 21a2.

As shown in FIG. 45, the inner surface 21A1 of the support column penetrating hole 21a at the upper core support column 21A on the core side, is formed in a bell-mouth shape. In other words, in the inner surface 21AI of the support column penetrating hole 21a, an opening area having a cross-section perpendicular to the axis Zs of the upper core support column 21 increases towards the core. Accordingly, the coolant that flows into the support column penetrating hole 21a can be prevented from being removed, at the end of the upper core support column 21 on the core side. Consequently, it is possible to suppress the flow vibration of the thimble tube 22 more effectively.

[Third Modification]

Figure 46:
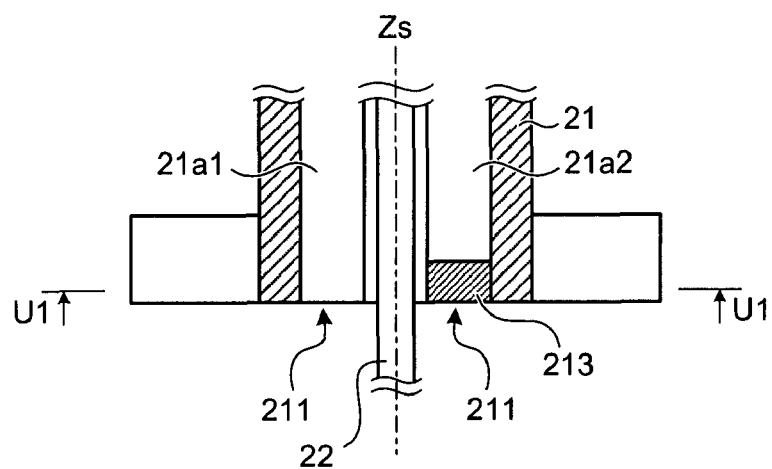
FIG. 46 is a schematic sectional view of a structure for suppressing flow vibration of an instrumentation guide tube according to a third modification of the twenty-third embodiment.
Figure 47:
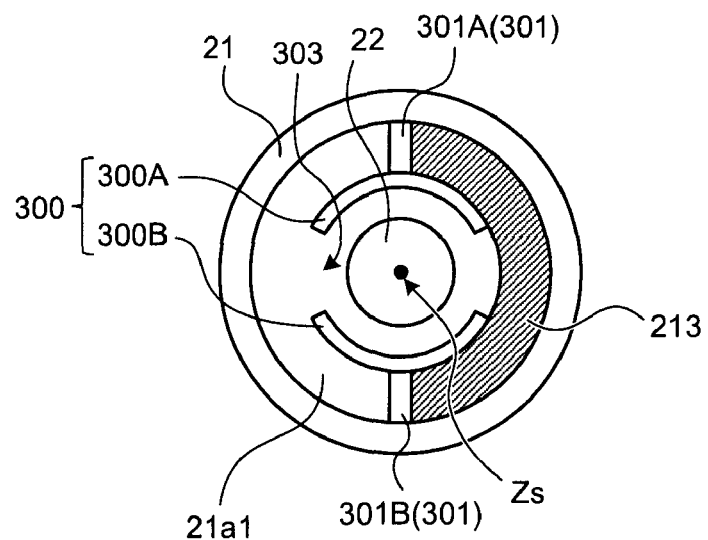
FIG. 47 is a fragmentary view taken along the line U1-U1 of FIG. 46.

FIG. 46 is a schematic sectional view of a structure for suppressing flow vibration of an instrumentation guide tube according to a third modification of the twenty-third embodiment. FIG. 47 is a fragmentary view taken along the line U1-U1 of FIG. 46. The structure for suppressing flow vibration of an instrumentation guide tube according to the present modification is substantially the same as that of the twenty-third embodiment. However, the present modification is different from the twenty-third embodiment in including a closure member 213 that blocks the second support column space 21a2, at the second support column space 21a2 that forms the support column penetrating hole 21a of the upper core support column 21, on the core side. Because the other components are the same as those in the twenty-third embodiment, the same reference numerals are given to the same parts, and their repeated detailed descriptions will be omitted.

The upper core support column 21 includes the closure member 213 that blocks the second support column space 21a2, in the space divided by the barrier 301 formed by the first barrier 301A and the second barrier 301B, on the side where the side holes 210a and 210b are provided, in other words, at the second support column space 21a2 on the core side. Because the closure member 213 prevents the coolant from flowing into the second support column space 21a2, it is possible to further reduce the pressure of the coolant in the second support column space 21a2. As a result, the thimble tube 22 is pressed against the inner circumference of the instrumentation guide tube holder 300, more specifically, against the longer side ends and the inner circumferential sides of the first holder 300A and the second holder 300B, with a larger pressing force. As a result, in the present modification, it is possible to suppress the flow vibration of the thimble tube 22 more effectively, thereby preventing the thimble tube 22 from being worn out.

[Fourth Modification]

Figure 48:
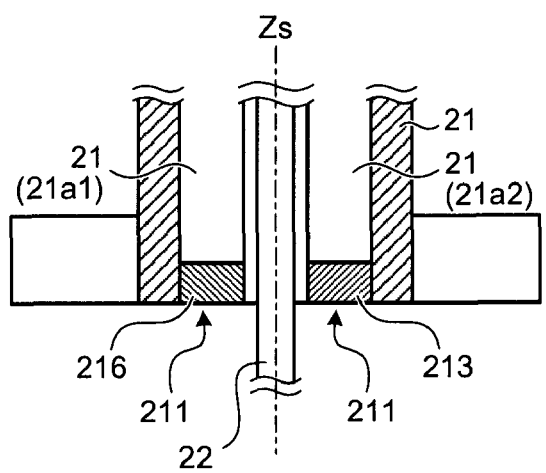
FIG. 48 is a schematic sectional view of a structure for suppressing flow vibration of an instrumentation guide tube according to a fourth modification of the twenty-third embodiment.
Figure 49A:
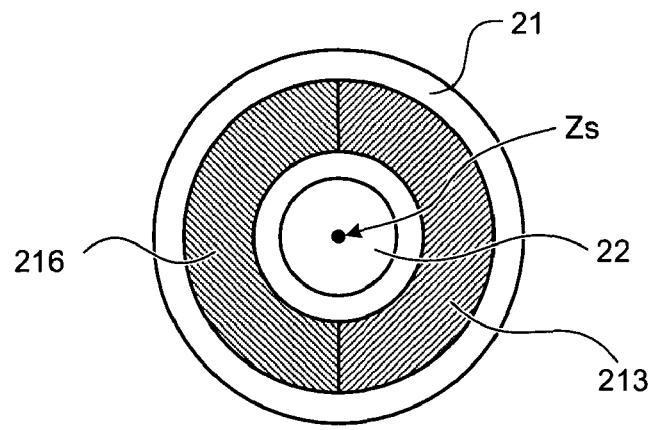
FIG. 49A is a plan view of the structure for suppressing flow vibration of an instrumentation guide tube according to the fourth modification of the twenty-third embodiment, viewed from a core side.
Figure 49B:
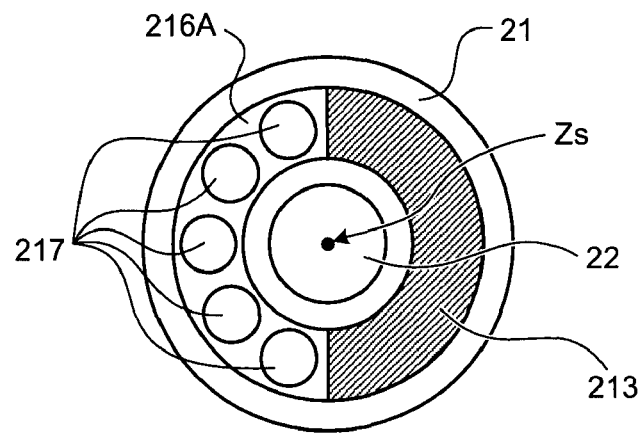
FIG. 49B is another plan view of the structure for suppressing flow vibration of an instrumentation guide tube according to the fourth modification of the twenty-third embodiment, viewed from the core side.

FIG. 48 is a schematic sectional view of a structure for suppressing flow vibration of an instrumentation guide tube according to a fourth modification of the twenty-third embodiment. FIGS. 49A and 49B are plan views of the structure for suppressing flow vibration of an instrumentation guide tube according to the fourth modification of the twenty-third embodiment, viewed from the core side. The structure for suppressing flow vibration of an instrumentation guide tube according to the present modification is substantially the same as that of the third modification of the twenty-third embodiment. However, the present modification is different from the third modification of the twenty-third embodiment in including a coolant rectifying unit that rectifies the coolant flowing into the support column penetrating hole 21a, at the support column penetrating hole 21a on the core side. Because the other components are the same as those in the third modification of the twenty-third embodiment, the same reference numerals are given to the same parts, and their repeated detailed descriptions will be omitted.

In the present modification, the closure member 213 that blocks the second support column space 21a2 is provided at the second support column space 21a2 that forms the support column penetrating hole 21a on the core side. A porous plate 216 is also provided at the first support column space 21a1 that forms the support column penetrating hole 21a on the core side, as a coolant rectifying unit that rectifies the coolant flowing into the first support column space 21a1. As shown in FIG. 49B, a porous plate 216A pierced with a plurality of coolant passing holes 217 may be used as the coolant rectifying unit. Because the coolant flows into the first support column space 21a1 after being rectified by the porous plate 216 or the porous plate 216A, the generation of eddy current in the first support column space 21a1 can be suppressed. As a result, it is possible to suppress the flow vibration of the thimble tube 22 more effectively. A metal mesh or a honeycomb material may also be used as the coolant rectifying unit, instead of the porous plate 216 and the like.

[Fifth Modification]

Figure 50:
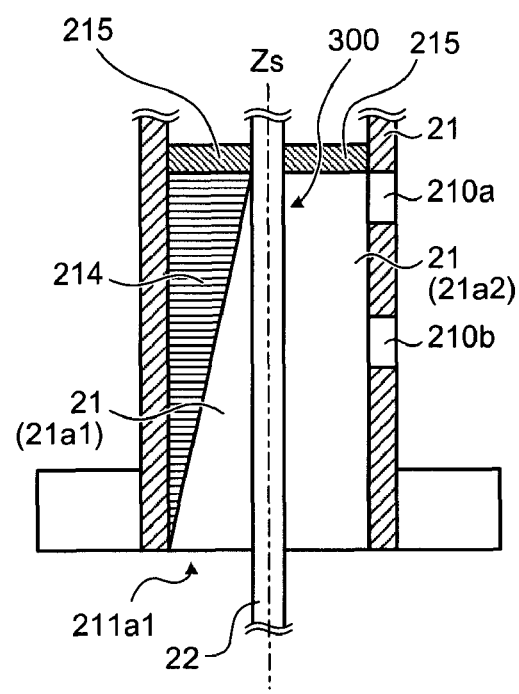
FIG. 50 is a schematic sectional view of a structure for suppressing flow vibration of an instrumentation guide tube according to a fifth modification of the twenty-third embodiment.
Figure 51:
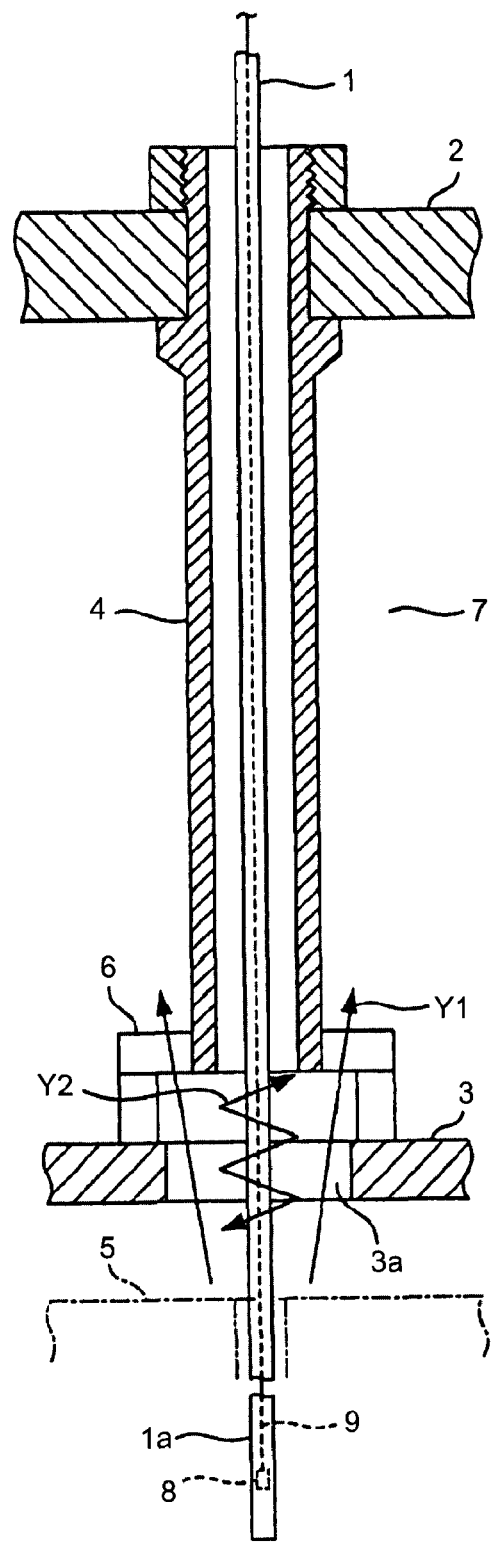
FIG. 51 is a schematic of an inserted state of an instrumentation guide tube, when a top insertion method is employed.

FIG. 50 is a schematic sectional view of a structure for suppressing flow vibration of an instrumentation guide tube according to a fifth modification of the twenty-third embodiment. The structure for suppressing flow vibration of an instrumentation guide tube according to the present modification is substantially the same as that of the twenty-third embodiment. However, the present modification is different from the twenty-third embodiment in forming the inner surface of the support column penetrating hole 21a, so that an opening area having a cross section perpendicular to the axis Zs of the upper core support column 21 gradually increases towards the end of the upper core support column 21 on the core side. Because the other components are the same as those in the twenty-third embodiment, the same reference numerals are given to the same parts, and their repeated detailed descriptions will be omitted.

In the present modification, the support column penetrating hole 21a on the core side includes the first support column space 21a1 and the second support column space 21a2. In the present modification, a spacer 214 whose cross section that passes through the axis Zs of the upper core support column 21 is substantially triangular is provided in the first support column space 21a1 that is a space on the side where the side holes 210a and 210b are not provided. Accordingly, the first support column space 21a1 is formed so that the opening area having a cross-section perpendicular to the axis Zs of the upper core support column 21 gradually increases towards the end of the upper core support column 21 on the core side.

Accordingly, the strength of the pressing force applied to the thimble tube 22 can be made approximately the same towards the coolant blocking member 215, from an opening portion 211a1 of the first support column space 21a1 on the core side. Accordingly, it is possible to prevent imbalance of pressing force. As a result, it is possible to suppress the flow vibration of the thimble tube 22 more stably, thereby preventing the thimble tube 22 from being worn out.

The components of the embodiments can be arbitrarily combined. For example, the plugs 51A and 51B in the third embodiment may be combined with the components in the other embodiments.

In the embodiments, the holes (upper hole and lower hole) against which the thimble tube is pressed are provided at the upper portion and the lower portion of the guide tube. However, it is not limited thereto, and if a lower hole is provided at least at the lower portion of the guide tube, it is possible to effectively suppress the flow vibration of the thimble tube generated at the lower end side of the guide tube.

INDUSTRIAL APPLICABILITY

The present invention relates to the structure for suppressing flow vibration of an instrumentation guide tube inserted into the core, and advantageously applicable to suppress the flow vibration of the instrumentation guide tube in the top insertion method.

The invention claimed is:

1. A structure for suppressing flow induced vibration in a nuclear reactor vessel comprising:
    a guide tube provided inside a hollow upper core support column interposed between an upper core support plate and an upper core plate in a reactor vessel;
    a head nozzle provided at a lower end of the upper core support column; and
    an instrumentation tube disposed inside the guide tube, wherein
    a lower hole is provided at a lower portion of a side surface of the guide tube, and
    the instrumentation tube is disposed to contact with an inner circumferential surface of the side surface of the guide tube on which the lower hole is provided, such that the instrumentation tube is pressed against the side surface by a differential pressure between coolant inside and outside the lower hole.

2. The structure for suppressing flow induced vibration according to claim 1, wherein
    a pressure adjustment hole is provided at a side surface of the upper core support column
    for allowing coolant flowing into the guide tube from a lower end of the guide tube to flow out to outside from inside the guide tube through a gap between the instrumentation tube and the lower hole, and then to flow out to outside from inside the upper core support column through the pressure adjustment hole.

3. A structure for suppressing flow induced vibration in a nuclear reactor vessel comprising:
- a guide tube provided inside a hollow upper core support column interposed between an upper core support plate and an upper core plate in a reactor vessel;
- a head nozzle provided at a lower end of the upper core support column; and
- an instrumentation tube disposed inside the guide tube, wherein
- an upper hole and a lower hole are provided at two portions, namely an upper portion and a lower portion, of a side surface of the guide tube, and
- the instrumentation tube is disposed to contact with an inner circumferential surface of the side surface of the guide tube on which the upper hole and the lower hole are provided, such that the instrumentation tube is pressed against the side surface by a differential pressure between coolant inside and outside the upper hole and the lower hole.

4. The structure for suppressing flow induced vibration according to claim 3, wherein
- an upper pressure adjustment hole and a lower pressure adjustment hole are provided at two positions, namely, an upper portion and a lower portion, of a side surface of the upper core support column
- for allowing the coolant flowing into the guide tube from an upper end of the guide tube to flow out to outside from inside the guide tube through a gap between the instrumentation tube and the upper hole, and also to flow out to outside from inside the upper core support column through the upper pressure adjustment hole, and
- for allowing coolant flowing into the guide tube from a lower end of the guide tube to flow out to outside from the inside of the guide tube through a gap between the instrumentation tube and the lower hole, and also to flow out to outside from inside the upper core support column through the lower pressure adjustment hole.

5. The structure for suppressing flow induced vibration according to claim 3, wherein
- the upper hole and the lower hole are formed in slits extending in an axis direction of the guide tube, and includes expanded portions expanded in oval shapes at middle portions of the slits.

* * * * *